United States Patent
Johnson et al.

(10) Patent No.: US 10,247,872 B2
(45) Date of Patent: Apr. 2, 2019

(54) DUAL-SIDED FILM WITH SPLIT LIGHT SPREADING STRUCTURES

(71) Applicant: 3M INNOVATIVE PROPERTIES COMPANY, St. Paul, MN (US)

(72) Inventors: Nicholas A. Johnson, Saint Paul, MN (US); Michael J. Sykora, New Richmond, WI (US); Michael E. Lauters, Hudson, WI (US); John A. Wheatley, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/728,353

(22) Filed: Oct. 9, 2017

(65) Prior Publication Data

US 2018/0031757 A1 Feb. 1, 2018

Related U.S. Application Data

(63) Continuation of application No. 13/850,277, filed on Mar. 25, 2013, now Pat. No. 9,784,902.

(51) Int. Cl.
*F21V 8/00* (2006.01)
*F21V 5/02* (2006.01)
(Continued)

(52) U.S. Cl.
CPC .............. *G02B 6/0053* (2013.01); *F21V 5/02* (2013.01); *G02B 5/021* (2013.01); *G02B 5/0278* (2013.01);
(Continued)

(58) Field of Classification Search
CPC ........... F21V 5/02; F21V 5/002; G02B 3/005; G02B 3/0068; G02B 5/021; G02B 5/045;
(Continued)

(56) References Cited

U.S. PATENT DOCUMENTS

| 3,213,753 A | 10/1965 | Rogers |
| 4,765,701 A * | 8/1988 | Cheslak ............... G02B 6/0008 362/560 |

(Continued)

FOREIGN PATENT DOCUMENTS

| CN | 201434914 Y | 3/2010 |
| JP | H05-015836 A | 1/1993 |

(Continued)

OTHER PUBLICATIONS

International Search Report for International Application No. PCT/US2014/031655, dated Jun. 23, 2014, 4 pages.
(Continued)

*Primary Examiner* — Hargobind S Sawhney
(74) *Attorney, Agent, or Firm* — Michael Stem

(57) ABSTRACT

Dual-sided optical films have extended split spreading structures formed on one major surface, and extended prisms formed on an opposite major surface. One portion of each split spreading structure has a low light spreading characteristic, and another portion has a high light spreading characteristic. For each split spreading structure, the low light spreading portion may be disposed alongside the high light spreading portion. The split spreading structures may be arranged in a one-to-one correspondence with the prisms. Light that enters a given prism from one inclined surface thereof can be associated primarily with light transmitted through the low light spreading portion of the split spreading structure, and light that enters the given prism from the other inclined surface thereof can be associated primarily with light transmitted through the high light spreading portion.

8 Claims, 30 Drawing Sheets

(51) Int. Cl.
   *G02B 5/02* (2006.01)
   *G02B 5/04* (2006.01)
   *G02B 3/00* (2006.01)

(52) U.S. Cl.
   CPC .............. *G02B 5/045* (2013.01); *G02B 3/005* (2013.01); *G02B 3/0068* (2013.01)

(58) Field of Classification Search
   CPC .. G02B 6/0051; G02B 6/0053; G02B 3/0278; G02B 5/0215; G02B 5/0221; G02B 5/0231; G02B 5/1814; G02B 6/0018; G02B 6/0038; G02B 5/3025; G02B 6/00011; G02B 6/005; G02B 6/0061; G02F 1/133526; G02F 1/133615; G02F 2001/133607
   See application file for complete search history.

(56) References Cited

U.S. PATENT DOCUMENTS

| | | |
|---|---|---|
| 5,035,486 A | 7/1991 | Inokuchi |
| 5,600,455 A | 2/1997 | Ishikawa et al. |
| 5,661,599 A | 8/1997 | Borner |
| 5,825,436 A | 10/1998 | Knight |
| 5,852,512 A | 12/1998 | Chikazawa |
| 5,877,829 A | 3/1999 | Okamoto |
| 6,211,930 B1 | 4/2001 | Sautter |
| 6,310,722 B1 | 10/2001 | Baek |
| 6,608,722 B2 | 8/2003 | Cowan |
| 6,798,574 B2 | 9/2004 | Kim |
| 6,825,985 B2 | 11/2004 | Brown |
| 7,165,959 B2 | 1/2007 | Humlicek |
| 7,210,836 B2 | 5/2007 | Sasagawa |
| 7,382,537 B2 | 6/2008 | Lin |
| 7,530,721 B2 | 5/2009 | Mi et al. |
| 7,619,824 B2 | 11/2009 | Poulsen |
| 7,750,982 B2 | 7/2010 | Nelson |
| 7,866,868 B2 | 1/2011 | Shiau et al. |
| 7,887,221 B2 | 2/2011 | Lor |
| 7,969,666 B2 | 6/2011 | Chen |
| 8,035,771 B2 | 10/2011 | Brott |
| 8,068,187 B2 | 11/2011 | Huizinga |
| 8,184,235 B2 | 5/2012 | Choi |
| 8,274,626 B2 | 9/2012 | Choi |
| 8,339,333 B2 | 12/2012 | Casner |
| 8,602,605 B2 | 12/2013 | Park et al. |
| 8,794,780 B2 | 8/2014 | Ikuta |
| 8,814,391 B2 | 8/2014 | Koh et al. |
| 2005/0052750 A1 | 3/2005 | King |
| 2005/0270645 A1 | 12/2005 | Cossairt |
| 2005/0276071 A1 | 12/2005 | Sasagawa |
| 2007/0139765 A1 | 6/2007 | Daniel |
| 2007/0165422 A1* | 7/2007 | Iwasaki ................. G02B 6/002 362/615 |
| 2007/0211493 A1 | 9/2007 | Fang et al. |
| 2007/0242479 A1 | 10/2007 | Ohta |
| 2007/0268590 A1 | 11/2007 | Schwerdtner |
| 2009/0067156 A1 | 3/2009 | Bonnett et al. |
| 2009/0091668 A1 | 4/2009 | Kristoffersen |
| 2009/0141895 A1 | 6/2009 | Anderson |
| 2009/0219432 A1 | 9/2009 | Palum |
| 2009/0237576 A1 | 9/2009 | Nelson |
| 2010/0007821 A1 | 1/2010 | Choi |
| 2010/0014188 A1 | 1/2010 | Timm et al. |
| 2010/0046200 A1 | 2/2010 | Kuo |
| 2010/0066960 A1 | 3/2010 | Smith |
| 2010/0091226 A1 | 4/2010 | Takatani |
| 2010/0205667 A1 | 8/2010 | Anderson |
| 2010/0208349 A1 | 8/2010 | Beer |
| 2010/0328778 A1 | 12/2010 | Mimura |
| 2011/0085108 A1 | 4/2011 | Park et al. |
| 2011/0149391 A1 | 6/2011 | Brott |
| 2012/0154450 A1 | 6/2012 | Aho |
| 2012/0236403 A1 | 9/2012 | Sykora |
| 2012/0299985 A1 | 11/2012 | Ichihashi et al. |
| 2013/0039077 A1 | 2/2013 | Edmonds |

FOREIGN PATENT DOCUMENTS

| | | |
|---|---|---|
| JP | H06-222202 A | 8/1994 |
| JP | 2002-341109 | 11/2002 |
| JP | 2003-337382 A | 11/2003 |
| JP | 2005-266293 | 9/2005 |
| JP | 2007-041431 A | 2/2007 |
| JP | 2008-304700 | 12/2008 |
| JP | 2011-028019 A | 2/2011 |
| JP | 2012-103290 | 5/2012 |
| KR | 1020090065834 A | 6/2009 |
| WO | WO 2009-153701 | 12/2009 |
| WO | WO 2010-120422 | 10/2010 |
| WO | WO 2010-120468 | 10/2010 |
| WO | WO 2010-120864 | 10/2010 |
| WO | WO 2011-084303 | 7/2011 |
| WO | WO 2011-088161 | 7/2011 |
| WO | WO 2012-033583 | 3/2012 |
| WO | WO 2012-054320 | 4/2012 |
| WO | WO 2013-012858 | 1/2013 |
| WO | WO 2013-048847 | 4/2013 |
| WO | WO 2013-049088 | 4/2013 |

OTHER PUBLICATIONS

Sykora, U.S. Appl. No. 13/850,276, Dual-Sided Film with Compound Prisms. filed Mar. 25, 2013.

* cited by examiner

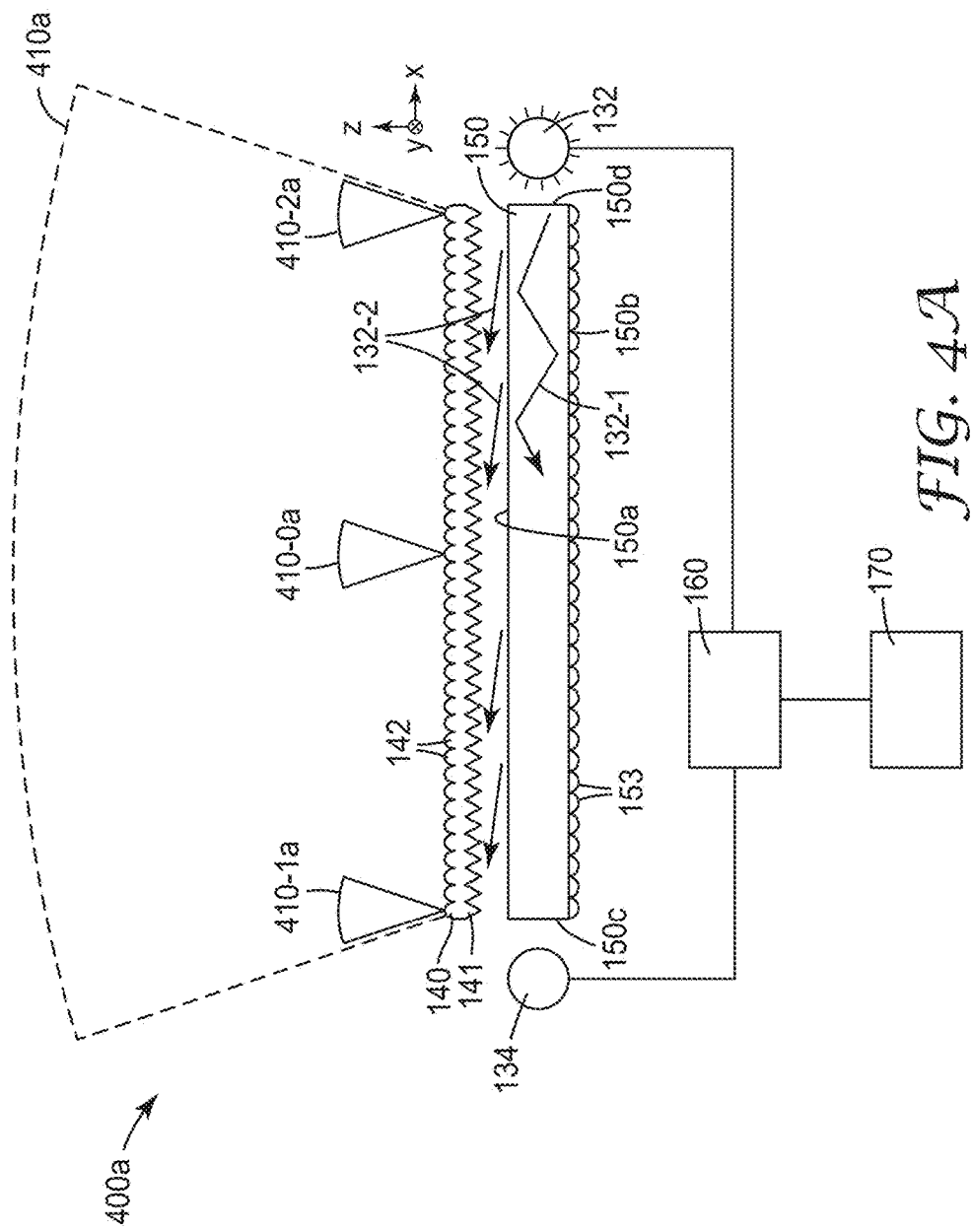

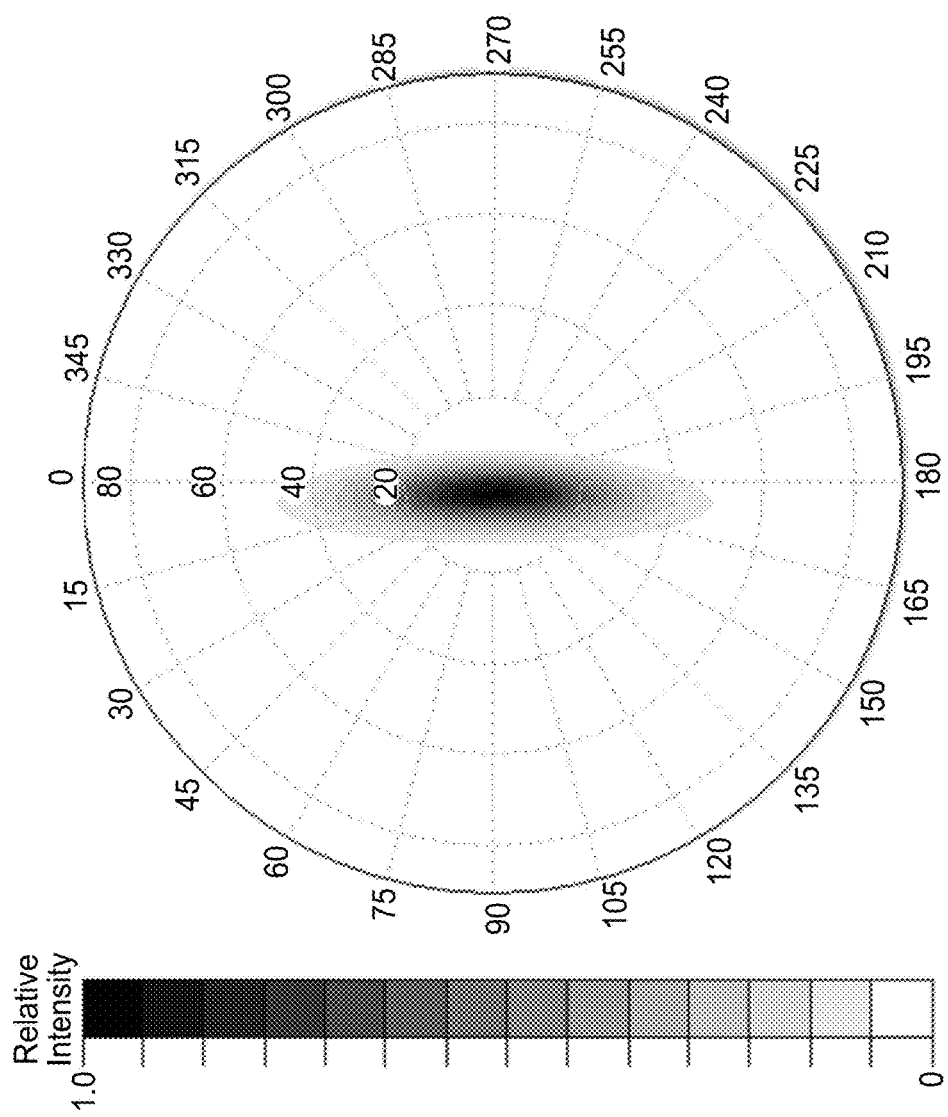

DUAL-SIDED FILM WITH SPLIT LIGHT SPREADING STRUCTURES

FIELD OF THE INVENTION

This invention relates generally to microstructured optical films, particularly to such films in which the opposed major surfaces are both structured, as well as articles and systems that incorporate such films, and methods pertaining to such films.

BACKGROUND

Optical films that have structured surfaces on opposed major surfaces thereof, referred to herein as dual-sided optical films, are known. In some such films, one structured surface has lenticular features formed therein and the other structured surface has prismatic features formed therein. There is a one-to-one correspondence of prismatic features to lenticular features, and individual prismatic features are elongated and extend parallel to each other and to individual lenticular features, which are also elongated. Such films have been disclosed for use as optical light redirecting films in autostereoscopic 3D display systems. See for example U.S. Pat. No. 8,035,771 (Brott et al.) and U.S. Pat. No. 8,068,187 (Huizinga et al.), and patent application publications US 2005/0052750 (King et al.), US 2011/0149391 (Brott et al.), and US 2012/0236403 (Sykora et al.).

BRIEF SUMMARY

We have developed a new family of dual-sided optical films in which structures formed on one side of the optical film are split into one portion that has a low light spreading characteristic, disposed alongside another portion that has a high light spreading characteristic. One low light spreading portion in combination with an adjacent high light spreading portion may be referred to as a split spreading structure. The high light spreading characteristic may be associated with a surface that is roughened and/or curved (e.g. a lenslet or portion thereof), and the low light spreading characteristic may be associated with a surface that is smooth, and in some cases the surface may also be flat while in other cases the surface may be curved. The split spreading structures may be extended or elongated, and combined with extended or elongated (e.g. linear) prismatic features in the structured surface on the opposite side of the optical film, e.g. in a one-to-one correspondence of prismatic features to split spreading structures. Light that enters a given prismatic feature from one inclined surface thereof can be associated primarily with light transmitted through the low light spreading portion of its associated split spreading structure, and light that enters the given prismatic feature from the other inclined surface thereof can be associated primarily with light transmitted through the high light spreading portion of the structure. When combined with a suitable light guide and light sources, such an optical film can be used to provide unique optical systems, including a display system having a selective privacy capability that is electronically switchable, and a luminaire system having a selective spotlight capability that is electronically switchable.

The present application further discloses, inter alia, dual-sided optical films having opposed first and second structured surfaces, with a plurality of extended prisms formed on the first structured surface, and a plurality of extended split spreading structures formed on the second structured surface, each split spreading structure having a high spreading portion disposed alongside a low spreading portion, and the prisms and the split spreading structures being arranged in a one-to-one correspondence of prisms to split spreading structures.

Each prism may have on one side thereof a first inclined surface and on another side thereof a second inclined surface, and the high spreading portion of a given split spreading structure may be associated primarily with light transmitted through the first inclined surface of its associated prism. The low spreading portion of the given split spreading structure may be associated primarily with light transmitted through the second inclined surface of the associated prism.

For each of the split spreading structures, the low spreading portion may have a smooth surface characteristic and the high spreading portion may have a roughened surface characteristic. Each of the split spreading structures may comprise a curved segment of the second structured surface, and the low and high spreading portions of each split spreading structure may comprise smooth and roughened portions respectively of the curved segment.

For each split spreading structure, the high spreading portion may be a roughened portion and the low spreading portion may be a lenslet. For each split spreading structure, the high spreading portion may be a lenslet and the low spreading portion may be a flat. The lenslet of each split spreading structure may be a diverging lenslet. The lenslet of each split spreading structure may alternately be a converging lenslet.

The split spreading structures may extend along respective elongation axes that are parallel to each other, and, for each of the split spreading structures, the low and high spreading portions may meet along a boundary that is parallel to the elongation axis in plan view. The prisms may extend along respective first elongation axes that are parallel to each other, and the split spreading structures may extend along respective second elongation axes that are parallel to each other, and the first elongation axes may be parallel to the second elongation axes.

The optical film may define a reference plane, the prisms may have respective prism optical axes, and each prism optical axis may be perpendicular to the reference plane. Alternatively, a plurality of the prism optical axes may be tilted with respect to a normal axis perpendicular to the reference plane. Furthermore, each split spreading structure may have a spreading structure optical axis, and each spreading structure optical axis may be perpendicular to the reference plane, or a plurality of the spreading structure optical axes may be tilted with respect to a normal axis perpendicular to the reference plane.

An optical system may comprise any such dual-sided optical film, and a light guide having a major surface adapted to emit light preferentially at oblique angles, where the optical film is disposed proximate the light guide and oriented so that light emitted from the major surface of the light guide enters the optical film through the first structured surface.

We also disclose optical systems that include a light guide having a major surface adapted to emit light, a first and second light source configured to inject light into the light guide along different first and second respective directions, and a dual-sided optical film. The optical film has opposed first and second structured surfaces, and is disposed proximate the light guide and oriented so that light emitted from the major surface of the light guide is deviated by and passes through the optical film to provide an output beam as a function of which of the first and second light sources are energized. The output beam is a wide output beam when the first light source is energized and the second light source is not energized, and the output beam is a narrow output beam when the second light source is energized and the first light source is not energized.

The wide output beam may have a beam width (FWHM) of at least 40 degrees in a given plane of observation, and the narrow output beam may have a beam width (FWHM) of no more than 30 degrees in the given plane of observation. The narrow output beam may be subsumed by, i.e., entirely contained within, the wide output beam in the plane of observation. The optical film may have a first structured surface facing the light guide and a second structured surface opposed to the first structured surface. A plurality of extended prisms may be formed on the first structured surface, and a plurality of extended split spreading structures may be formed on the second structured surface, each split spreading structure having a high spreading portion disposed alongside a low spreading portion, and the prisms and the split spreading structures may be arranged in a one-to-one correspondence of prisms to split spreading structures.

The system may also include a switch coupled to the first and second light sources. The system may comprise a display, and the switch may provide the display with a switchable privacy/sharing function. The system may comprise a luminaire, task light, or similar lighting device, and the switch may provide the device with a switchable spotlight function.

We also disclose display systems that include a display panel, a backlight disposed behind the display panel, the backlight including one or more first light sources and one or more second light sources, and a switch coupled to the one or more first light sources and to the one or more second light sources to selectively energize such light sources. The backlight may be configured to provide a first output light beam when the one or more first light sources are ON and the one or more second light sources are OFF, and may further be configured to provide a second output light beam when the one or more first light sources are OFF and the one or more second light sources are ON. The first output light beam may have a wider angular spread than the second output light beam, such that the switch provides the display system with a switchable privacy/sharing function.

The backlight may include a dual-sided optical film having opposed first and second structured surfaces, the optical film comprising: a plurality of extended prisms formed on the first structured surface; and a plurality of extended split spreading structures formed on the second structured surface, each split spreading structure having a high spreading portion disposed alongside a low spreading portion. The prisms and the split spreading structures may be arranged in a one-to-one correspondence of prisms to split spreading structures. The backlight may include a light guide.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 2A is a view of the light guide of FIG. 2 in combination with collimated light sources, illustrating how a light guide can be effectively subdivided or partitioned as a function of which light sources on a given side of the light guide are turned ON;

FIG. 4A is a schematic side view of the lighting system of FIG. 3 but with the opposite light source energized, this light source producing a narrow output beam emerging from the dual-sided optical film;

FIGS. 28A and 28B are polar iso-candela graphs of the modeled wide and narrow angle output beams of FIG. 27, respectively.

In the figures, like reference numerals designate like elements.

DETAILED DESCRIPTION OF ILLUSTRATIVE EMBODIMENTS

Figure 1A:
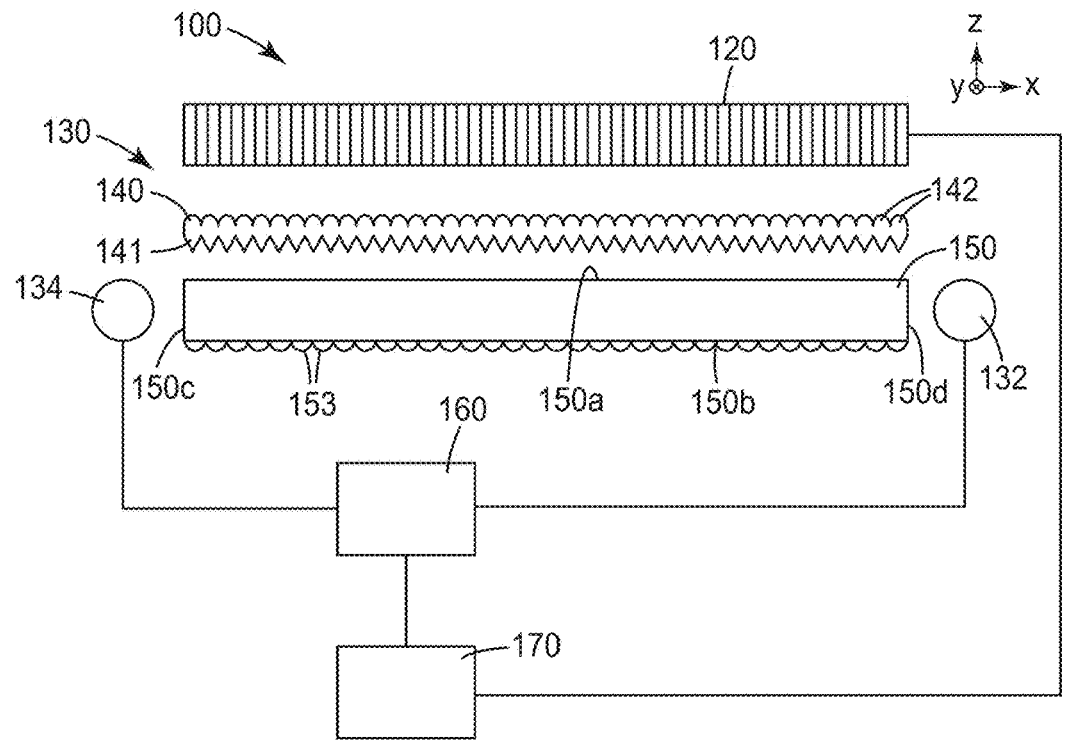
FIG. 1A is a schematic side view of an illustrative display system that includes a dual-sided optical film.

An optical system 100 capable of utilizing the unique properties of the disclosed dual-sided optical films is shown in FIG. 1A. In this case, the optical system 100 is a display system, but other devices and applications, including ambient lighting devices such as luminaires or task lights, are also contemplated. The system 100 is shown in relation to a Cartesian x-y-z coordinate system so that directions and orientations of selected features can be more easily discussed. The system 100 includes a display panel 120, e.g., a liquid crystal display (LCD) panel, and a backlight 130 positioned to provide light to the display panel 120. The backlight 130 includes one or more light guides 150, one or more first light sources 134, and one or more second light sources 132. The backlight 130 also includes a dual-sided optical film 140, details of which are discussed further below. The x-y plane of the coordinate system is assumed to lie parallel to the plane of the film 140, which is also typically parallel to the plane of the light guide 150 and display panel 120.

The light sources 132, 134 are disposed on opposite ends of the light guide, and inject light into the light guide from opposite directions. Each of the light sources may emit light that is nominally white and of a desired hue or color temperature. Alternatively, each light source may emit colored light, e.g., light perceived to be red, green, blue, or another known non-white color, and/or may emit ultraviolet and/or infrared (including near infrared) light. The light sources may also be or comprise clusters of individual light emitting devices, some or all of which may emit non-white colored light, but the combination of light from the individual devices may produce nominally white light, e.g. from the summation of red, green, and blue light. Light sources on opposite ends of the light guide may emit light of different white or non-white colors, or they emit light of the same colors. The light sources 132, 134 can be of any known design or type, e.g., one or both may be or comprise cold cathode fluorescent lamps (CCFLs), and one or both may be or comprise one or more inorganic solid state light sources such as light emitting diodes (LEDs) or laser diodes, and one or both may be or comprise one or more organic solid state light sources such as organic light emitting diodes (OLEDs). The round shapes used to represent the light sources in the drawings are merely schematic, and should not be construed to exclude LED(s), or any other suitable type of light source. The light sources 132, 134 are preferably electronically controllable such that either one can be energized to an ON state (producing maximum or otherwise significant light output) while keeping the other one in an OFF state (producing little or no light output), or both can be in the ON state at the same time if desired, and both may be turned OFF during non-use. In many cases, the light sources 132, 134 do not need to satisfy any particular requirement with regard to switching speed. For example, although either or both light sources 132, 134 may be capable of repetitively transitioning between the OFF state and the ON state at a rate that is imperceptible to the human eye (e.g., at least 30 or 60 Hz), such a capability is not necessary in many embodiments. (For flicker-free operation, transition rates may be in a range from 50 to 70 Hz, or more; for two-sided operation, transition rates may be in a range from 100 to 140 Hz (or more) for the display panel (if any) and the light sources.) Thus, light sources that have much slower characteristic transition times between the ON and OFF states can also be used.

The light guide 150 includes a first light input side 150c adjacent to the first light source 134 and an opposing second light input side 150d adjacent to the second light source 132. A first light guide major surface 150b extends between the first side 150c and second side 150d. A second light guide major surface 150a, opposite the first major surface 150b, extends between the first side 150c and the second side 150d. The major surfaces 150b, 150a of the light guide 150 may be substantially parallel to each other, or they may be non-parallel such that the light guide 150 is wedge-shaped. Light may be reflected or emitted from either surface 150b, 150a of the light guide 150, but in general light is emitted from surface 150a and is reflected from surface 150b. In some cases, a highly reflective surface may be provided on or adjacent to the first surface 150b to assist in re-directing light out through the second surface 150a. Light extraction features 153, e.g., shallow prisms, lenticular features, white dots, haze coatings, and/or other features, may be disposed on one or both major surfaces 150b, 150a of the light guide 150. Exemplary light extraction features for the light guide are discussed below in connection with FIG. 2. The light extraction features 153 are typically selected so that light emitted from the major surface 150a propagates preferentially at highly oblique angles in air as measured in the x-z plane, rather than propagating at normal or near-normal propagation directions that are parallel to, or deviate only slightly from, the z-axis (again as measured in the x-z plane). For example, the light emitted from the surface 150a into air may have a peak intensity direction that makes an angle relative to the surface normal (z-axis) of 60 degrees or more, or 70 degrees or more, or 80 degrees or more, where the peak intensity direction refers to the direction along which the intensity distribution of the output beam in the x-z plane is a maximum.

The light guide 150 may have a solid form, i.e., it may have an entirely solid interior between the first and second major surfaces 150a, 150b. The solid material may be or comprise any suitable light-transmissive material, such as glass, acrylic, polyester, or other suitable polymer or non-polymer materials. Alternatively, the light guide 150 may be hollow, i.e., its interior may be air or another gas, or vacuum.

If hollow, the light guide 150 is provided with optical films or similar components on opposite sides thereof to provide the first and second major surfaces 150a, 150b. Hollow light guides may also be partitioned or subdivided into multiple light guides. Whether solid or hollow, the light guide 150 may be substantially planar, or it may be non-planar, e.g., undulating or curved, and the curvature may be slight (close to planar) or great, including cases where the light guide curves in on itself to form a complete or partial tube. Such tubes may have any desired cross-sectional shape, including curved shapes such as a circle or ellipse, or polygonal shapes such as a square, rectangle, or triangle, or combinations of any such shapes, A hollow tubular light guide may in this regard be made from a single piece of optical film or similar component(s) that turns in on itself to form a hollow tube, in which case the first and second major surfaces of the light guide may both be construed to be provided by such optical film or component(s). The curvature may be only in the x-z plane, or only in the y-z plane, or in both planes. Although the light guide and dual-sided film may be non-planar, for simplicity they are shown in the figures as being planar; in the former case one may interpret the figures as showing a small enough portion of the light guide and/or optical film such that it appears to be planar. Whether solid or hollow, depending on the material(s) of construction and their respective thicknesses, the light guide may be physically rigid, or it may be flexible. A flexible light guide or optical film may be flexed or otherwise manipulated to change its shape from planar to curved or vice versa, or from curved in one plane to curved in an orthogonal plane.

Figure 1B:
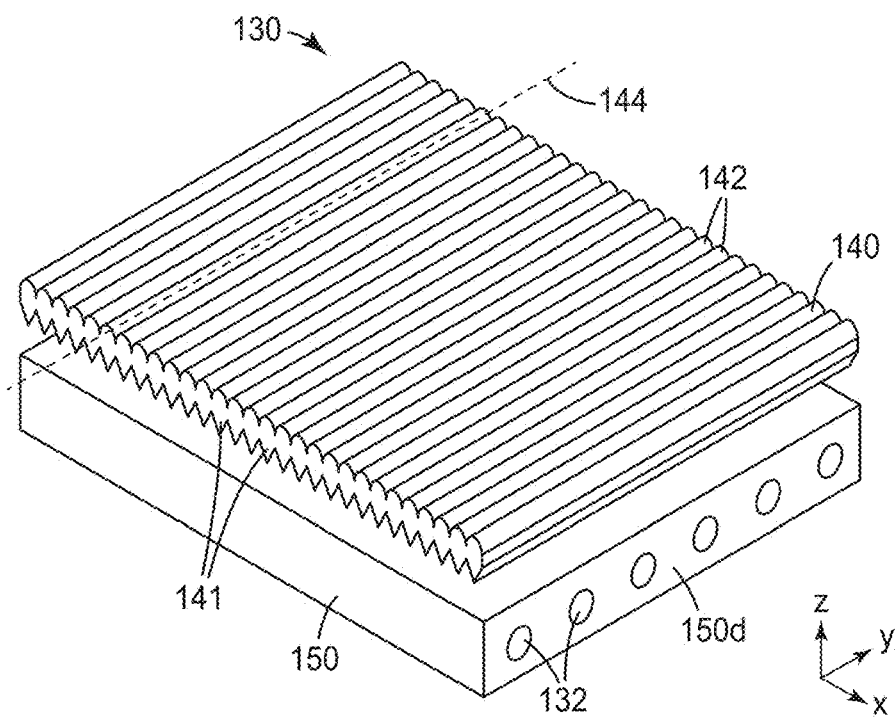
FIG. 1B is a schematic perspective view of a lighting system that may serve as the backlight in the display system of FIG. 1A, or that may be used in other applications.

The dual-sided optical film 140 is disposed between the display panel 120 and the light guide 150. The film 140 has opposed structured surfaces. On the structured surface that is oriented away from the light guide 150, split spreading structures 142 are formed. The split spreading structures 142 are depicted in FIGS. 1A and 1B as contiguous extended lenslets, finer details of which are omitted from the drawing for simplicity but described further below. Split spreading structures of alternative design are also described below.

Prisms 141 are formed on the opposite structured surface of the film 140, which is oriented towards the light guide 150. In this orientation, light emitted from the major surface 150a of the light guide 150 is incident on the prisms 141, which help to deviate the incident light. The incident light is deviated by and passes through the film 140 to provide an output light beam that emerges from the film 140. As described further below, the properties of the output beam are strongly influenced by which of the light sources 132, 134 is in an ON state. When one light source is ON, the output beam may be a wide angle beam. When the opposite light source is ON, the output beam may be a narrow angle beam.

Both the prisms 141 and the split spreading structures 142 are typically linear, or, in cases where one or both are not precisely linear (e.g. not straight), they are otherwise extended or elongated along a particular in-plane axis. Thus, the split spreading structures 142 may extend along respective spreading structure axes that are parallel to each other. One such axis is shown in FIG. 1B as axis 144, which is assumed to be parallel to the y-axis. The prisms 141 may extend along respective prism axes that are parallel to each other. The spreading structure axes of elongation are typically parallel to the prism axes of elongation. Perfect parallelism is not required, and axes that deviate slightly from perfect parallelism may also be considered to be parallel; however, misalignment results in different amounts of registration between a given prism/split spreading structure pair at different places along their length on the working surface of the dual-sided film—and such differences in the degree of registration (regardless of whether the degree of registration is tailored to have precise alignment, or intentional misalignment, of the relevant vertices or other reference points, as discussed below) are desirably about 1 micron or less. In some cases, extraction features 153 on the major surface 150b of the light guide may be linear or elongated along axes that are parallel to the elongation axes of the split spreading structures and prisms of the film 140; alternatively, such elongated extraction features 153 may be oriented at other angles.

In the film 140 or pertinent portion thereof, there is a one-to-one correspondence of prisms 141 to split spreading structures 142. Thus, for each prism 141 there is a unique split spreading structure 142 with which the given prism primarily interacts, and vice versa. One, some, or all of the split spreading structures 142 may be in substantial registration with their respective prisms 141. Alternatively, the film 140 may be designed to incorporate a deliberate misalignment or misregistration of some or all of the split spreading structure(s) relative to their respective prism(s). Related to alignment or misalignment of the prisms and split spreading structures is the center-to-center spacings or pitches of these elements. In the case of a display system, the pitch of the split spreading structures 142 and the pitch of the prisms 141 may be selected to reduce or eliminate Moire patterns with respect to periodic features in the display panel 120. The pitch of the split spreading structures 142 and the pitch of the prisms 141 can also be determined based upon manufacturability. As LCD panels are manufactured with different pixel pitches, it can be desirable to change the pitch of the optical film to accommodate the different pixel pitches of the LCD panel. Useful pitch ranges for the respective elements on the structured surface of the optical film 140 is about 10 microns to about 140 microns, for example, but this should not be interpreted in an unduly limiting way.

The system 100 can have any useful shape or configuration. In many embodiments, the display panel 120, the light guide 150, and/or the dual-sided optical film 140 can have a square or rectangular shape. In some embodiments, however, any or all of these elements may have more than four sides and/or a curved shape.

A switchable driving element 160 is electrically connected to the first and second light sources 132, 134. This element may contain a suitable electrical power supply, e.g. one or more voltage sources and/or current sources, capable of energizing one or both of the light sources 132, 134. The power supply may be a single power supply module or element, or a group or network of power supply elements, e.g., one power supply element for each light source. The driving element 160 may also contain a switch that is coupled to the power supply and to the electrical supply lines that connect to the light sources. The switch may be a single transistor or other switching element, or a group or network of switching modules or elements. The switch and power supply within the driving element 160 may be configured to have several operational modes. These modes may include two, three, or all of: a mode in which only the first light source 134 is ON; a mode in which only the second light source 132 is ON; a mode in which both the first and second light sources are ON; and a mode in which neither of the first and second light sources are ON (i.e., both are OFF).

A controller 170 couples to the switchable driving element 160 and to the display panel 120. The controller 170 may control or direct the driving element into one of its operational modes so as to selectively energize the light sources. Coupling between the controller 170 and the driving element 160 may be wired, or wireless, or some combination of wired and wireless. For example, a user may employ a mobile phone or other mobile wireless device to activate the driving element 160, and the mobile phone or other wireless device may be considered to be part of the controller 170. The controller 170 may also control the display panel 120 so that it displays a desired image or series of images. Image information may be provided from the controller 170 to the display panel 120 in any known manner. The image may be a still image, sequence of images, video stream, and/or rendered computer graphics, for example.

We describe in more detail below how the dual-sided optical film 140 can provide the backlight with the capability to produce a wide angle output beam or a narrow angle output beam, depending on which light sources the driving element 160 energizes. The wide angle output beam allows for viewing of the image by observers that may be widely dispersed in angle or position relative to the backlight 130. This may be considered to be a "public viewing mode" or "sharing mode" of operation of the optical system 100, since the display may be viewable by not only a single user but by a group of individuals substantially angularly separated from each other. The narrow angle output beam only allows viewing of the image by observers that are more narrowly dispersed in angle or position (compared to the wide angle output beam) relative to the backlight 130. This may be considered to be a "private viewing mode" or "non-sharing mode" of operation of the optical system, since the display may not be easily or readily viewable by individuals other than a single primary user. The display of system 100 can thus be said to have a selective privacy or selective sharing capability that is electronically switchable. By removing the display panel 120 and making any other suitable adaptations, the system 100 can be readily converted to a luminaire system having a selective spotlight capability that is electronically switchable.

FIG. 1B is a schematic perspective view of the back light 130 showing the light guide 150, the optical film 140, and the second light sources 132. Like elements between FIGS. 1A and 1B have like reference numerals, and need not be further discussed. The optical film 140 includes split spreading structures 142 oriented away from the light guide 150 and prisms 141 with prism peaks oriented toward the light guide 150. The axis of elongation 144 of the split spreading structures, which may also correspond to the axis of elongation of the prisms 141, is shown to be parallel to the y-axis. In the case of the prisms 141, the elongation axis runs parallel to the vertex of the prism. The film 140 is shown to be adjacent the light guide 150 but spaced slightly apart. The film 140 may also be mounted or held so that it is in contact with the light guide 150, e.g. the film 140 may rest upon the light guide 150, while still substantially maintaining an air/polymer interface at the facets or inclined side surfaces of the prisms 141 (with a physically thin but optically thick layer of air) so that their refractive characteristics can be preserved. Alternatively, a low refractive index bonding material may be used between the prisms 141 and the light guide 150 to bond the film 140 to the light guide. In this regard, nanovoided materials having an ultra low index (ULI) of refraction are known that can come somewhat close in refractive index to air, and that can be used for this purpose. See e.g. patent application publications WO 2010/120864 (Hao et al.) and WO 2011/088161 (Wolk et al.), which discuss ULI materials whose refractive index (n) is in a range from about n≈1.15 to n≈1.35. See also patent application publications WO 2010/120422 (Kolb et al.), WO 2010/120468 (Kolb et al.), WO 2012/054320 (Coggio et al.), and US 2010/0208349 (Beer et al.). Air gap spacing techniques, e.g. wherein an array of microreplicated posts is used to bond the two components together while substantially maintaining an air gap between them, may also be used. See e.g. patent application publication US 2013/0039077 (Edmonds et al.).

The disclosed dual-sided optical films and associated components may be provided in a variety of forms and configurations. In some cases, the dual-sided optical film may be packaged, sold, or used by itself, e.g. in piece, sheet, or roll form. In other cases, the dual-sided optical film may be packaged, sold, or used with a light guide whose output beam characteristics are tailored for use with the dual-sided film. In such cases, the dual-sided film may be bonded to the light guide as discussed above, or they may not be bonded to each other. In some cases, the dual-sided optical film may be packaged, sold, or used with both a light guide that is tailored for use with the dual-sided film, and one or more LED(s) or other light source(s) that are adapted to inject light into the light guide, e.g., from opposite ends thereof as shown generally in FIG. 1A. The dual-sided film, the light guide, and the light source(s) may be bonded, attached, or otherwise held in proximity to each other to form a lighting module, which may be large or small, rigid or flexible, and substantially flat/planar or non-flat/non-planar, and which may be used by itself or in combination with other components. A lighting system that includes a dual-sided optical film, a light guide, and one or more light source(s) may be adapted for any desired end use, e.g., a display, a backlight, a luminaire, a task light, or a general-purpose lighting module.

Figure 2:
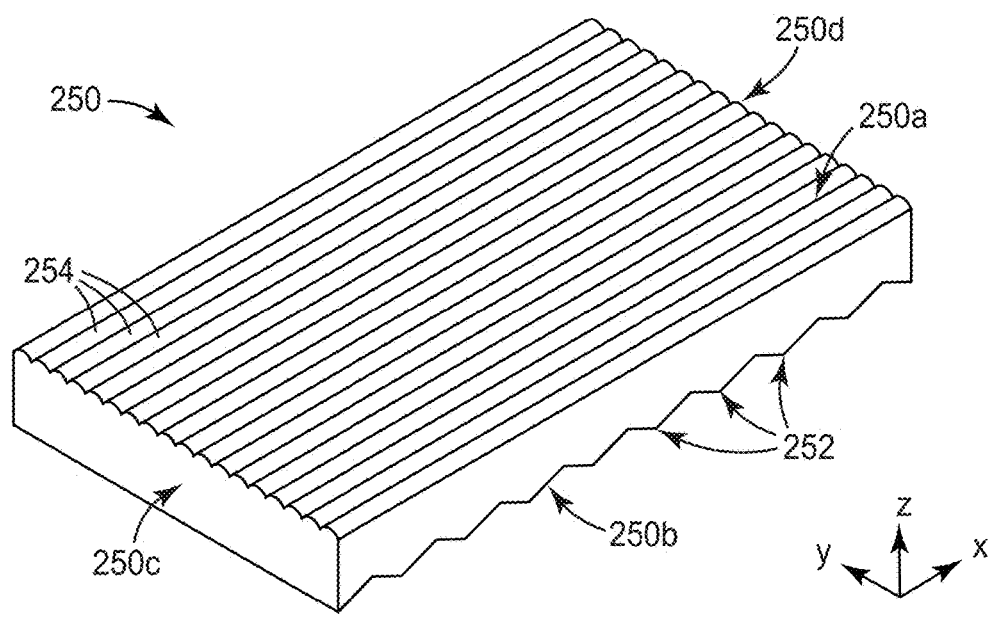
FIG. 2 is a schematic perspective view of a light guide, which shows in exaggerated fashion exemplary surface structure on the two major surfaces of the light guide.

FIG. 2 shows a schematic perspective view of an exemplary light guide 250 that may be suitable for use with some or all of the disclosed dual-sided optical films. The light guide 250 may be substituted for the light guide 150 in FIG. 1A, and the properties, options, and alternatives discussed in connection with the light guide 150 will be understood to apply equally to the light guide 250. Cartesian x-y-z coordinates are provided in FIG. 2 in a manner consistent with the coordinates of FIGS. 1A and 1B. FIG. 2 shows in exaggerated fashion exemplary surface structure on the two major surfaces of the light guide 250, but other orientations of the structured surface(s) relative to the edges or boundaries of the light guide can be used. The light guide 250 includes a first major surface 250a from which light is extracted towards a dual-sided optical film, a second major surface 250b opposite the first major surface, and side surfaces 250d, 250c which may serve as light injection surfaces for the first and second light sources as discussed elsewhere herein. For example, one light source may be positioned along the side surface 250c to provide a first oblique light beam emitted from the light guide 250, and a similar light source can be positioned along the side surface 250d to provide a second oblique light beam emitted from the light guide 250. An oblique light beam in this regard refers to a light beam whose intensity distribution in the x-z plane has a peak intensity direction of 60 degrees or more, or 70 degrees or more, or 80 degrees or more relative to the surface normal (z-axis), as discussed above.

The rear major surface 250b of the light guide is preferably machined, molded, or otherwise formed to provide a linear array of shallow prism structures 252. These prism structures are elongated along axes parallel to the y-axis, and are designed to reflect an appropriate portion of the light propagating along the length of the light guide (along the x-axis) so that the reflected light can refract out of the front major surface 250a into air (or a tangible material of suitably low refractive index) at a suitably oblique angle, and onward to the dual-sided optical film. In many cases, it is desirable for the reflected light to be extracted from the front major surface 250a relatively uniformly along the length of the light guide 250. The surface 250b may be coated with a reflective film such as aluminum, or it may have no such reflective coating. In the absence of any such reflective coating, a separate back reflector may be provided proximate the surface 250b to reflect any downward-propagating light that passes through the light guide so that such light is reflected back into and through the light guide. The prism structures 252 typically have a depth that is shallow relative to the overall thickness of the light guide, and a width or pitch that is small relative to the length of the light guide. The prism structures 252 have apex angles that are typically much greater than the apex angles of prisms used in the disclosed dual-sided optical films. The light guide may be made of any transparent optical material, typically with low scattering such as polycarbonate, or an acrylic polymer such as Spartech Polycast material. In one exemplary embodiment, the light guide may be made of acrylic material, such as cell-cast acrylic, and may have an overall thickness of 1.4 mm and a length of 140 mm along the x-axis, and the prisms may have a depth of 2.9 micrometers and a width of 81.6 micrometers, corresponding to a prism apex angle of about 172 degrees. The reader will understand that these values are merely exemplary, and should not be construed as unduly limiting.

The front major surface 250a of the light guide may be machined, molded, or otherwise formed to provide a linear array of lenticular structures or features 254 that are parallel to each other and to a lenticular elongation axis. In contrast to the elongation axis of the prism structures 252, the lenticular elongation axis is typically parallel to the x-axis. The lenticular structures 254 may be shaped and oriented to enhance angular spreading in the y-z plane for light that passes out of the light guide through the front major surface, and, if desired, to limit spatial spreading along the y-axis for light that remains in the light guide by reflection from the front major surface. In some cases, the lenticular structures 254 may have a depth that is shallow relative to the overall thickness of the light guide, and a width or pitch that is small relative to the width of the light guide. In some cases, the lenticular structures may be relatively strongly curved, while in other cases they may be more weakly curved. In one embodiment, the light guide may be made of cell-cast acrylic and may have an overall thickness of 0.76 mm, a length of 141 mm along the x-axis, and a width of 66 mm along the y-axis, and the lenticular structures 254 may each have a radius of 35.6 micrometers, a depth of 32.8 micrometers, and a width 323 of 72.6 mm, for example. In this embodiment, the prism structures 252 may have a depth of 2.9 micrometers, a width of 81.6 micrometers, and a prism apex angle of about 172 degrees. Again, the reader will understand that these embodiments are merely exemplary, and should not be construed as unduly limiting; for example, structures other than lenticular structures may be used on the front major surface of the light guide.

As mentioned above, the lenticular structures 254 may be shaped and oriented to limit spatial spreading along the y-axis for light that remains in the light guide by reflection from the front major surface. Limited spatial spreading along the y-axis can also be achieved, or enhanced, with light sources that are collimated (including substantially collimated) in the plane of the light guide, i.e., the x-y plane.

Figure 2A:
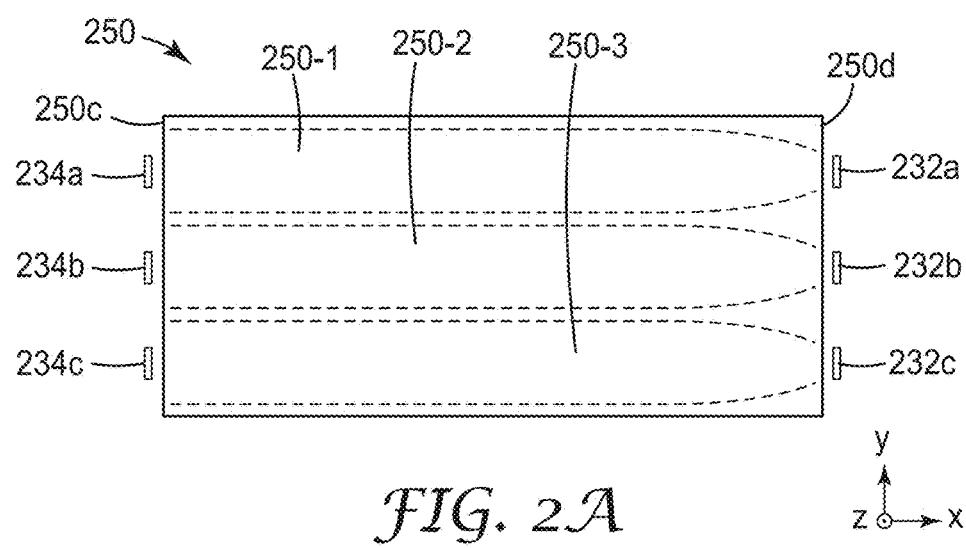

Such a light source may be a relatively small area LED die or dies in combination with one or more collimating lenses, mirrors, or the like. FIG. 2A shows the light guide 250 of FIG. 2 in combination with light sources 232a, 232b, 232c arranged along side surface 250d, and light sources 234a, 234b, 234c arranged along side surface 250c. These light sources may be substantially collimated, or the lenticular structures 254 may be shaped to limit spatial spreading of light along the y-axis, or both. In the figure, the light sources 232a, 232b, 232c are shown as being ON, and the other light sources are OFF. Due to the collimation of the light sources, the shape of the lenticular structures 254, or both, the light sources 232a, 232b, 232c illuminate respective stripes or bands 250-1, 250-2, 250-3 of the light guide 250. The bands may be distinct, with little or no overlap as shown in the figure, or they may overlap to some extent. Each of the light sources may be independently addressable, such that the light guide can be effectively subdivided or partitioned as a function of which light sources on each side of the light guide are turned ON. For example, only one of the bands 250-1, 250-2, 250-3 may be illuminated, or only two may be illuminated, or all of the bands may be illuminated. Light sources 234a, 234b, 234c, which are located on the opposite side of the light guide, may be aligned with their counterpart light sources at side surface 250d such that they illuminate the same respective bands 250-1, 250-2, 250-3; alternately, the light sources 234a, 234b, 234c may be shifted or staggered along the y-direction relative to the light sources at side surface 250d, such that they illuminate other bands which may or may not overlap with each other in similar fashion to bands 250-1, 250-2, 250-3. The light sources 232a, 232b, 232c, 234a, 234b, 234c may all emit white light, or light of a non-white color or wavelength, or the light sources may emit different colors. A given portion of the light guide 250, such as any of the bands 250-1, 250-2, 250-3, may thus function as an independent light guide, and may emit three different output beams as a function of whether only its associated light source(s) at one side surface (e.g. surface 250d) is ON, or whether only its associated light source(s) at the opposite side surface (e.g. surface 250c) is ON, or whether both such light sources are ON. When a dual-sided optical film is used with such a light guide, the spatially banded or striped output capability of the light guide is substantially transferred to the dual-sided optical film, such that, by energizing the appropriate light source(s), a wide angle output beam can emerge from the dual-sided optical film over all (all stripes or bands), or only a portion (at least one but less than all stripes or bands), or none (no stripes or bands) of its output surface, and a narrow angle output beam can also emerge at the same time from the dual-sided optical film over all, or only a portion, or none of its output surface.

Figure 3:
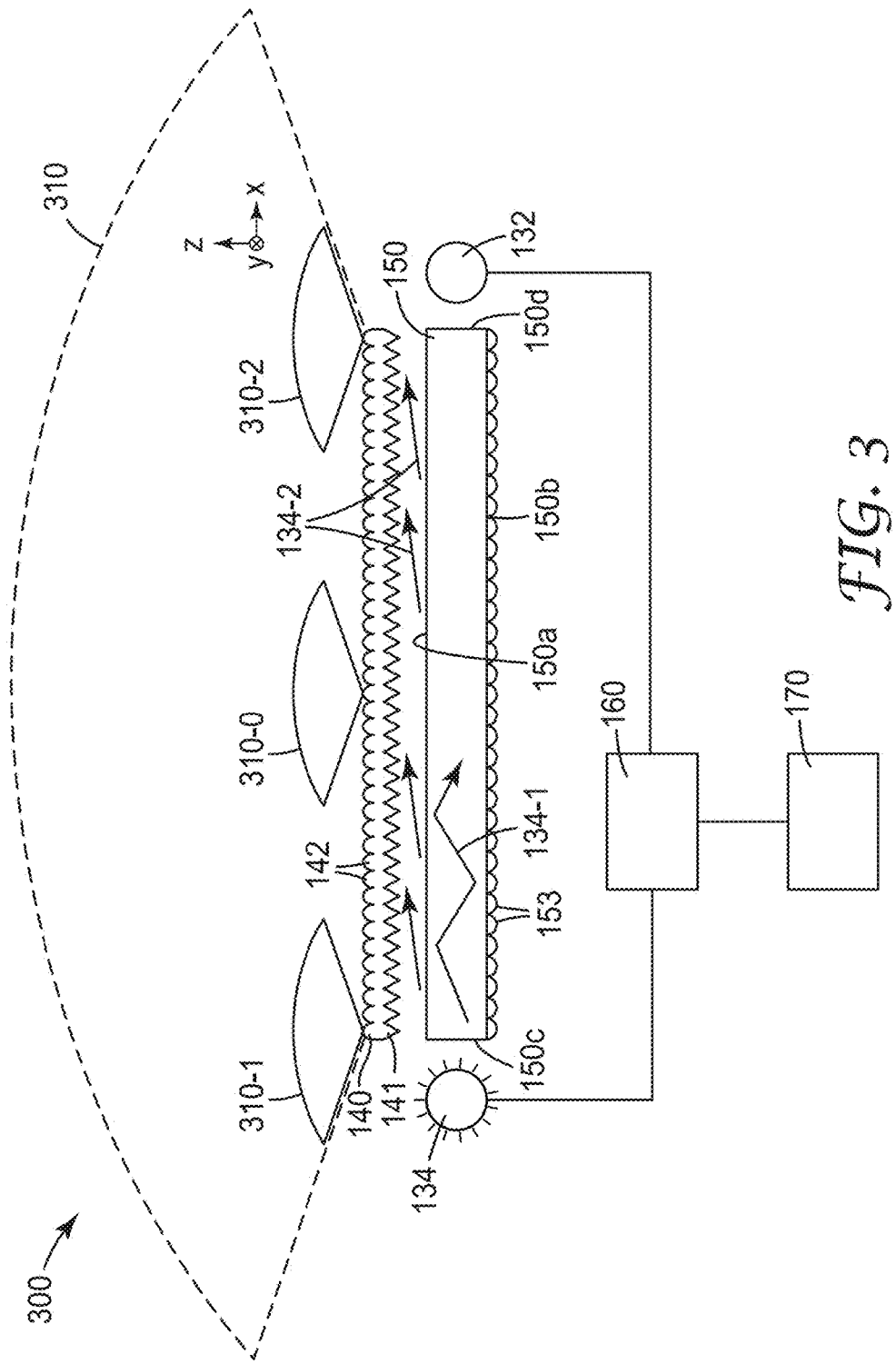
FIG. 3 is a schematic side view of a lighting system such as that of FIG. 1B, with one light source energized, this light source producing a wide output beam emerging from the dual-sided optical film.

Turning now to FIG. 3, we see there a schematic side view of a lighting system 300 in the context of a coordinate system that is consistent with that of FIGS. 1A, 1B, and 2. System 300 may be the same as or similar to the backlight 130 of FIGS. 1A and 1B, except that the controller 170 in FIG. 3 is not coupled to any display panel, and the light guide 150 of FIG. 3 may have a design substantially as described in connection with light guide 250 of FIG. 2. Other than this, like elements are labeled with like reference numbers, and need not be discussed further. Furthermore, in FIG. 3, only the light source 134 is energized (ON), and the light source 132 is not energized (OFF). Due to the characteristics of the light guide 150, the characteristics of the optical film 140, and the interaction between the light guide and the optical film, light from the light source 134 produces a first output beam 310 emerging from the dual-sided optical film, the first output beam 310 having a relatively wide angular spread in the x-z plane.

Light from the energized light source 134 enters the light guide 150 through the first side 150c. This light travels along the light guide 150 generally in the positive x-direction, the light reflecting from the major surfaces 150a, 150b to provide a first guided light beam 134-1. As the beam 134-1 propagates, some of the light is refracted or otherwise extracted from the major surface 150a to provide an oblique light beam 134-2, represented by obliquely oriented arrows representing a direction of maximum light intensity in the x-z plane. The oblique light beam 134-2 is typically emitted over substantially the entire surface area of the major surface 150a, i.e., not only in the geometric center of the major surface 150a but also at or near its edges and at intermediate positions in between, as indicated by the multiple oblique arrows. The oblique light beam 134-2 has a direction of maximum light intensity that is most closely aligned with the positive x-direction. The direction of maximum light intensity of the beam 134-2 may deviate from the positive x-direction by, for example, 30 degrees or less, or 20 degrees or less, or 15 degrees or less, or 10 degrees or less.

Because of the directionality of the oblique light beam 134-2, light from the light source 134 enters the dual-sided optical film 140 predominantly through only one facet or inclined side surface of each of the prisms 141 on the lower structured surface of the film 140. The upper structured surface of the film 140 is then designed so that such light is directed primarily to the high spreading portions of the associated split spreading structures 142, as described in more detail below. As a result, light emerges from the film 140 as the wide/first output beam 310. The wide output beam 310 arises from the summation of individual output beams or "beamlets" emitted from each split spreading structure 142 across the film 140. Three such representative beamlets are illustrated in FIG. 3: a beamlet 310-0 emitted at or near the geometric center of the film 140, a beamlet 310-1 emitted at or near a first end or edge of the film 140, and a beamlet 310-2 emitted at or near a second end or edge of the film 140. In the illustrated embodiment, the angular spreads of the individual beams or beamlets are nominally the same as the angular spread of the overall output beam 310, i.e., the beamlets each have a wide angular spread. The wide angular spread is "wide" relative to the (narrower) angular spread of the output beam produced by the opposite light source; in many cases, the wide angular spread may have a full angular width at half maximum of the intensity distribution in the x-z plane of at least 50 degrees. In other embodiments, the angular spread of the individual beams or beamlets may differ somewhat from that of the overall output beam 310.

If the first light source 134 is turned OFF and the second light source 132 is turned ON, the system 300 produces a second, narrower output beam. We show two possible different cases of such a narrower output beam in FIGS. 4A and 4B. These two different cases assume different designs or embodiments of the dual-sided optical film 140, as explained further below, but in each case the optical film 140 produces the relatively wider output beam 310 when only the first light source 134 is turned ON, as shown in FIG. 3.

In one case, the film 140 may be designed to produce a second output beam as shown in FIG. 4A, the second output beam being narrower than the first output beam of FIG. 3. In FIG. 4A, a lighting system 400a is shown in the context of a coordinate system consistent with that of FIG. 3. The system 400a may be the same as or similar to the lighting system 300, except that the light source 134 is not energized (OFF), and the light source 132 is energized (ON). Due to the characteristics of the light guide 150, the characteristics of the optical film 140, and the interaction between the light guide and the optical film, light from the light source 132 produces a second output beam 410a emerging from the dual-sided optical film, the second output beam 410a having a relatively narrow angular spread in the x-z plane.

Light from the energized light source 132 enters the light guide 150 through the second side 150d. This light travels along the light guide 150 generally in the negative x-direction, the light reflecting from the major surfaces 150a, 150b to provide a first guided light beam 132-1. As the beam 132-1 propagates, some of the light is refracted or otherwise extracted from the major surface 150a to provide an oblique light beam 132-2, represented by obliquely oriented arrows representing a direction of maximum light intensity in the x-z plane. The oblique light beam 132-2 is typically emitted over substantially the entire surface area of the major surface 150a, i.e., not only in the geometric center of the major surface 150a but also at or near its edges and at intermediate positions in between, as indicated by the multiple oblique arrows. The oblique light beam 132-2 has a direction of maximum light intensity that is most closely aligned with the negative x-direction. The direction of maximum light intensity of the beam 132-2 may deviate from the negative x-direction by, for example, 30 degrees or less, or 20 degrees or less, or 15 degrees or less, or 10 degrees or less.

Figure 4B:
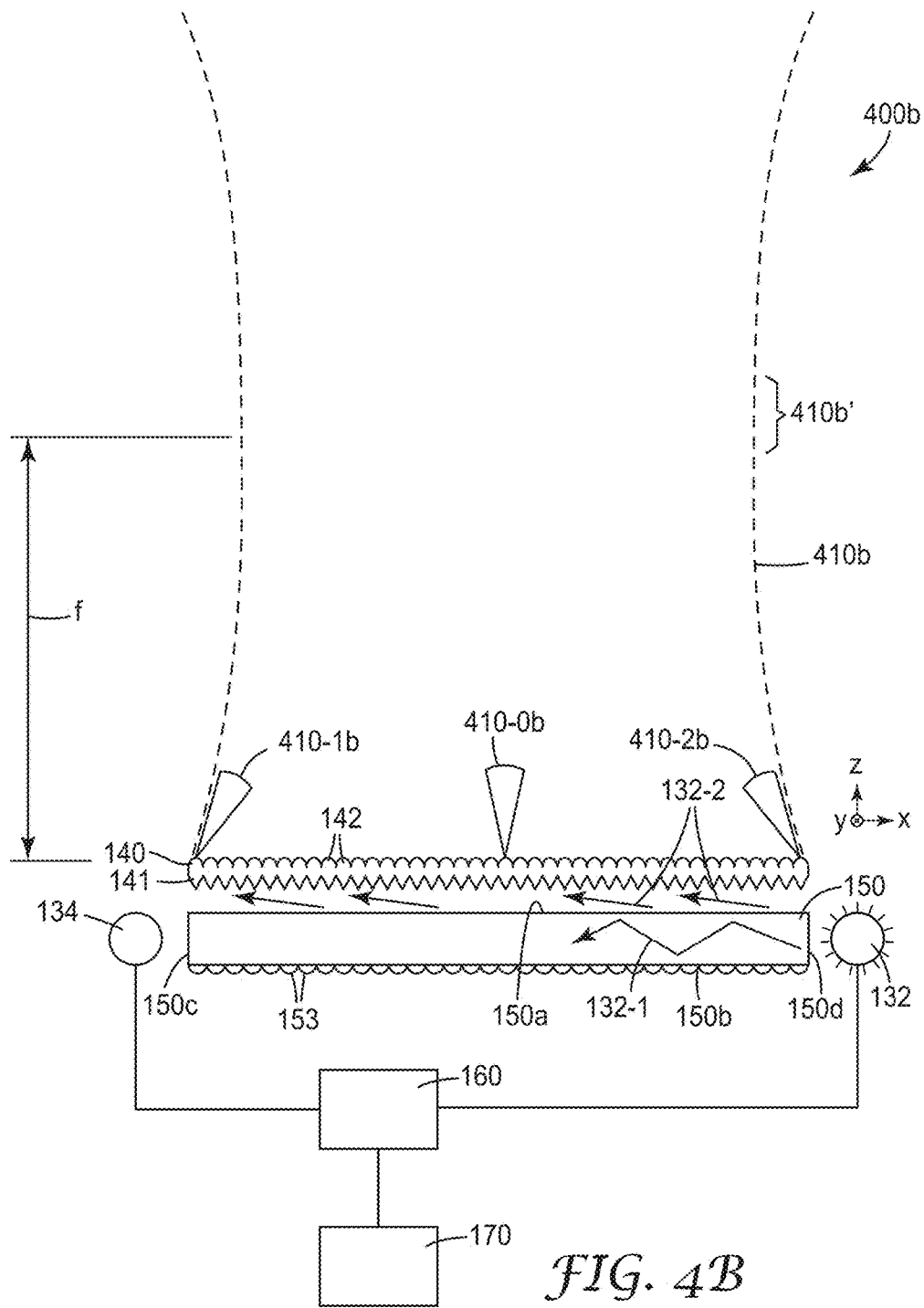
FIG. 4B is a schematic side view of a lighting system similar to FIG. 4A but where the dual-sided optical film is modified to produce a modified narrow output beam, which has a beam waist.

Because of the directionality of the oblique light beam 132-2, light from the light source 132 enters the dual-sided optical film 140 predominantly through only one facet or inclined side surface of each of the prisms 141 on the lower structured surface of the film 140, this facet or inclined surface being the opposite of the facet/surface used in connection with FIG. 3. The upper structured surface of the film 140 is then designed so that such light is directed primarily to the low spreading portions of the associated split spreading structures 142, as described in more detail below. As a result, light emerges from the film 140 as the narrow/second output beam 410a. The narrow output beam 410a arises from the summation of individual output beams or "beamlets" emitted from each split spreading structure 142 across the film 140. Three such representative beamlets are illustrated in FIG. 4A: a beamlet 410-0a emitted at or near the geometric center of the film 140, a beamlet 410-1a emitted at or near a first end or edge of the film 140, and a beamlet 410-2a emitted at or near a second end or edge of the film 140. In the illustrated embodiment, the angular spreads of the individual beams or beamlets are nominally the same as the angular spread of the overall output beam 410a, i.e., the beamlets each have a narrow angular spread. Such angular spreads are said to be "narrow" because they are narrower than the respective angular spreads of the respective output beams produced when the opposite light source is solely energized; in many cases, the narrow angular spread may have a full angular width at half maximum (FWHM) that is at least 25 degrees less than that of the wide output beam. The beamlets 410-0a, 410-1a, 410-2a are all oriented in substantially the same direction. This results in the second output beam 410a being diverging as it emerges from the film 140. An alternative arrangement is shown in FIG. 4B.

As mentioned above, FIG. 4B depicts an alternative embodiment to that of FIG. 4A, but that is also compatible with FIG. 3. In other words, one embodiment of the dual-sided optical film 140 may produce the wide angle output beam of FIG. 3 when only the first light source 134 is ON and the narrow angle output beam of FIG. 4A when only the second light source 132 is ON, while a different embodiment of the dual-sided optical film 140 may produce the wide angle output beam of FIG. 3 when only the first light source 134 is ON and the narrow angle output beam of FIG. 4B when only the second light source 132 is ON.

Thus, in this alternative case, the film 140 is designed to produce a second output beam as shown in FIG. 4B, the second output beam being narrower than the first output beam of FIG. 3. In FIG. 4B, a lighting system 400b is shown in the context of a coordinate system consistent with that of FIG. 3. The system 400b may be the same as or similar to the lighting system 300, except that the light source 134 is not energized (OFF), and the light source 132 is energized (ON). Due to the characteristics of the light guide 150, the characteristics of the optical film 140, and the interaction between the light guide and the optical film, light from the light source 132 produces a second output beam 410b emerging from the dual-sided optical film, the second output beam 410b having a relatively narrow angular spread in the x-z plane.

Just as in FIG. 4A, light from the energized light source 132 enters the light guide 150 through the second side 150d. This light travels along the light guide 150 generally in the negative x-direction, the light reflecting from the major surfaces 150a, 150b to provide a first guided light beam 132-1. As the beam 132-1 propagates, some of the light is refracted or otherwise extracted from the major surface 150a to provide an oblique light beam 132-2, represented by obliquely oriented arrows representing a direction of maximum light intensity in the x-z plane. The oblique light beam 132-2 is typically emitted over substantially the entire surface area of the major surface 150a, i.e., not only in the geometric center of the major surface 150a but also at or near its edges and at intermediate positions in between, as indicated by the multiple oblique arrows. The oblique light beam 132-2 has a direction of maximum light intensity that is most closely aligned with the negative x-direction. The direction of maximum light intensity of the beam 132-2 may deviate from the negative x-direction by, for example, 30 degrees or less, or 20 degrees or less, or 15 degrees or less, or 10 degrees or less.

Because of the directionality of the oblique light beam 132-2, light from the light source 132 enters the dual-sided optical film 140 predominantly through only one facet or inclined side surface of each of the prisms 141 on the lower structured surface of the film 140, this facet or inclined surface being the opposite of the facet/surface used in connection with FIG. 3. The upper structured surface of the film 140 is then designed so that such light is directed primarily to the low spreading portions of the associated split spreading structures 142, as described in more detail below. As a result, light emerges from the film 140 as the narrow/second output beam 410b. The narrow output beam 410b arises from the summation of individual output beams or "beamlets" emitted from each split spreading structure 142 across the film 140. Three such representative beamlets are illustrated in FIG. 4B: a beamlet 410-0b emitted at or near the geometric center of the film 140, a beamlet 410-1b emitted at or near a first end or edge of the film 140, and a beamlet 410-2b emitted at or near a second end or edge of the film 140. In the illustrated embodiment, the angular spreads of the individual beams or beamlets (in the x-z plane) are each smaller than the angular spread of the overall output beam 410b, e.g., the difference between the angular spread of an individual beamlet and that of the overall output beam may be 2 or 3 degrees or more. Each individual beamlet may have an angular spread in the x-z plane of 30 degrees or less. The beamlets 410-0*b*, 410-1*b*, 410-2*b* are oriented in different directions as shown, which results in the second output beam 410*b* being converging as it emerges from the film 140. The second beam 410*b* achieves a minimum beam width (for the light distribution in the x-z plane) at a beam waist 410*b'*, beyond which the beam 410*b* diverges. The beam waist 410*b'* can be compared to the focal point of a lens, and we may define a distance f as the axial distance from the film 140 to the beam waist 410*b'*. We can tailor the distance f by controlling the spread angles and the tilt angles of the beamlets produced by the low spreading portions of the split spreading structures. Such beam control is discussed further below.

We will now discuss several exemplary dual-sided optical film designs that can be used in any of the optical systems discussed herein. In general, such films have opposed first and second structured surfaces, the first structured surface having a plurality of extended prisms formed therein, and the second structured surface having a plurality of extended split spreading structures formed therein. Each split spreading structure has a high spreading portion disposed alongside a low spreading portion. The prisms and the split spreading structures are arranged in a one-to-one correspondence of prisms to split spreading structures.

The structured surfaces of the films can be made using any known microreplication techniques, e.g. by embossing or thermoforming a polymer film, or using continuous cast-and-cure methods. In the latter case, a curable polymer material or polymer precursor material may be applied between a transparent carrier film and a suitably configured structured surface tool. The material is then cured and separated from the tool to provide a layer that is bonded to the carrier film and has the desired microstructured topography. One such layer can be applied on one side of the carrier film to form the prisms (see e.g. prisms 141 in FIG. 3), and another such layer can be applied on the opposite side of the carrier film to form the split spreading structures (see e.g. split spreading structures 142 in FIG. 3). In some cases, increased surface roughness is used to distinguish the high spreading portion from the low spreading portion of each split spreading structure, and in such cases, known surface roughening techniques can be used to selectively roughen portions of the structured surface to define the high spreading portions. The roughening technique(s) may be applied to portions of a tool, such that portions having increased surface roughness are produced immediately after separation of the film from the tool. Alternatively or in addition, the selective roughening technique(s) may be applied to a surface before or after microreplication, or in some cases instead of microreplication. To the extent microreplication techniques and/or roughening techniques are used in the fabrication of the film, they are desirably employed in such a manner that the relative positions of elements on opposite structured surfaces of the film, e.g. a given split spreading structure and a given prism, may be controlled, and so that the axial distance between them can also be controlled e.g. by appropriate selection of film thicknesses and coating thicknesses. Reference is made to patent application publication US 2005/0052750 (King et al.), which describes among other things how microreplicated structures can be made in alignment on opposite sides of an article.

The structured surfaces of the disclosed dual-sided optical films, as well as the structured surfaces of the disclosed light guides, can alternatively or in addition be made using known additive manufacturing techniques, sometimes referred to as three-dimensional printing or 3D printing.

Figure 5:
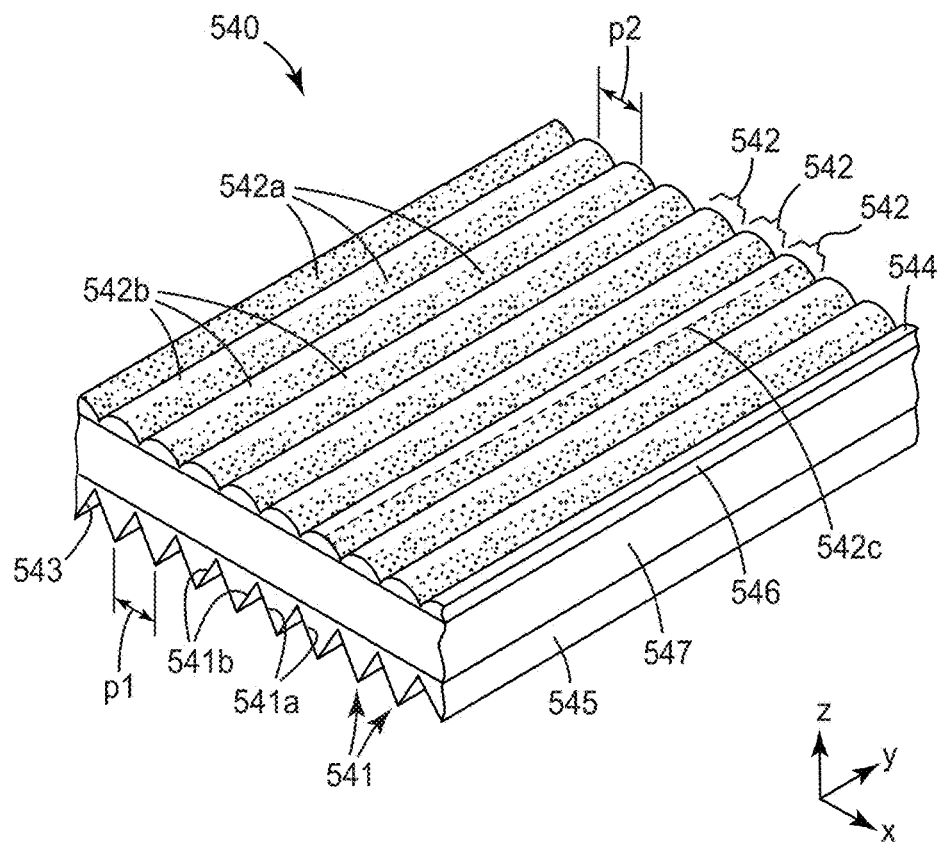
FIG. 5 is a schematic perspective view of a portion of an exemplary dual-sided optical film.

FIG. 5 is a schematic view of a portion of one exemplary dual-sided optical film 540. This film has opposed first and second structured surfaces 543, 544. The film 540 is shown in relation to a Cartesian x-y-z coordinate system which is consistent with the coordinates in the previous figures. The first structured surface 543 has a plurality of prisms 541 formed therein. The prisms 541 each extend along an elongation axis parallel to the y-axis. The second structured surface 544 has a plurality of split spreading structures 542 formed therein. These too extend along elongation axes that are parallel to the y-axis. The film 540 is shown to include three constituent layers or elements 545, 546, 547, although more or fewer layers are also contemplated. The layer 547 may be a carrier film, and layers 545, 547 may be layers that are bonded to the carrier film e.g. using a casting-and-curing procedure or other suitable procedure. The film 540 and its constituent layers are assumed to comprise substantially transparent materials of high optical transmission and low absorption throughout the visible spectrum, although in some cases the film 540, or one or more of its constituent layers, may include dye(s), pigment(s), and/or other absorptive agent(s) to provide colored and/or grayscale tint(s) to the film 540. Exemplary materials for use in the film are light-transmissive polymer materials, however, other suitable light-transmissive materials may also be used. The film and/or some or all of its constituent components may have a refractive index for visible wavelengths in a range from 1.4 to 1.7, or from 1.5 to 1.7 (e.g. a refractive index of 1.67 for the carrier film and 1.51 for resin that forms layers 546 and/or 545), but these ranges should be considered exemplary and not unduly limiting.

Each prism 541 on the structured surface 543 generally has two inclined side surfaces or facets 541*a*, 541*b*. Some adjacent pairs of these inclined surfaces intersect to form prism vertices, while others intersect to form edges or boundaries for each prism 541. Both the vertices and the edges/boundaries are shown in FIG. 5 as being pointed or v-shaped; however, non-pointed and non-v-shaped profiles, e.g., truncated profiles, can also be used. The inclined surfaces 541*a*, 541*b* are typically flat, but surfaces that are somewhat curved or otherwise non-flat can also be used. Each prism 541 can be characterized by a vertex angle, even if the vertex is not sharp. Typical vertex angles are in a range from 50 to 90 degrees, e.g., 63.5 degrees, but this should not be construed as unduly limiting. Regardless of the vertex angle, the vertex is often fairly sharp, e.g., having a radius of curvature of no more than 5, or 3, or 2, or 1. The prisms 541 may collectively be characterized by a pitch p1. The pitch may be measured center-to-center, as shown, or from edge-to-edge of adjacent prisms. The pitch is typically uniform over the extent of the structured surface 543, but in some cases it may not be uniform.

Each split spreading structure 542 on the structured surface 544 has a high spreading portion 542*a* and a low spreading portion 542*b* disposed alongside each other. In the figure, the high spreading portions are shown shaded to indicate a roughened surface in comparison to the smoother surface of the low spreading portion 542*b*. Each split spreading structure 542 is shown as a curved segment or lenslet of the structured surface 544. However, due to the selective roughening associated with the high spreading portions 542*a*, each curved segment as a whole responds to light in a more complex fashion than a conventional lenslet. For each split spreading structure, the high spreading portion 542*a* and the low spreading portion 542*b* meet along a boundary that is parallel to the axis of elongation of the split spreading structure. One such boundary 542*c* is labeled in FIG. 5, the boundary 542c being parallel to the y-axis. In some embodiments the boundary may undulate in the y-z plane; thus, more generally, the boundary between the high spreading portion and the low spreading portion may be said to be parallel to the elongation axis in plan view. The boundary 542c may be characterized by a transition between the high and low spreading portions that is sharp and abrupt, or, alternatively, slow and gradual. The split spreading structures 542 may collectively be characterized by a pitch p2. The pitch may be measured center-to-center, as shown, or from edge-to-edge of adjacent split spreading structures. The pitch is typically uniform over the extent of the structured surface 543, but in some cases it may not be uniform. The pitch p2 may equal p1, whereupon the degree of registration of the split spreading structures 542 to the prisms 541 remains constant or substantially constant over the relevant area of the film 540 along the x-axis. Alternatively, p2 may be slightly greater than or less than p1, whereupon the degree of registration of the structures 542 to the prisms 541 changes over the relevant area of the film 540 along the x-axis.

Figure 6:
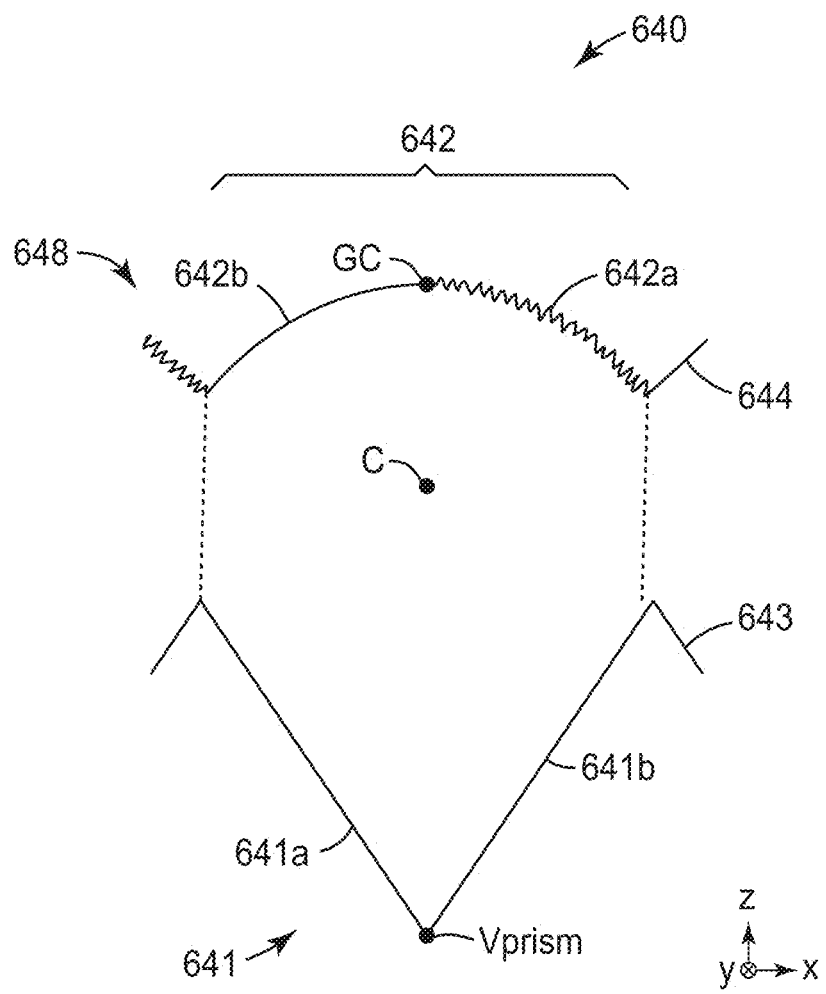
FIG. 6 is a schematic side view of a portion of a dual-sided optical film having the same or similar design as that of FIG. 5, this view showing one prism/split spreading structure pair.

In FIG. 6 we show a schematic view of a portion of a dual-sided optical film 640 which may be the same as, or similar to, the film 540 of FIG. 5. The view of FIG. 6 is enlarged compared to that of FIG. 5 to allow closer inspection of a single prism/split spreading structure pair, labeled 648, which is assumed to be immersed in air. The Cartesian coordinate system of FIG. 6 is consistent with the coordinates in FIG. 5 and the previous figures. The film 640 is shown to be unitary, but it may alternatively have the layered construction of FIG. 5, or a different layered construction. The film 640 has a first structured surface 643 with a plurality of prisms 641 formed therein. The surface 643 and prism 641 may be the same as the respective structured surface 543 and prism 541 discussed above. In that regard, the prism 641 has two inclined side surfaces or facets 641a, 641b, which may be the same as respective inclined surfaces 541a, 541b discussed above. The surfaces 641a, 641b intersect to form a prism vertex Vprism, which vertex may be a line or ridge extending parallel to the y-axis.

The film 640 also has a second structured surface 644 with a plurality of split spreading structures 642 formed therein. The surface 644 and split spreading structure 642 may be the same as the respective structured surface 544 and split spreading structure 542 discussed above. The split spreading structure 642 thus has a high spreading portion 642a, which may be the same as portion 542a discussed above, disposed alongside a low spreading portion 642b, which may be the same as portion 542b discussed above. The figure indicates that the high spreading portion 642a has a roughened surface characteristic relative to low spreading portion 642b. Taken together, the portions 642a, 642b can be considered to form a single curved segment or lenslet. The outer edges of the curved segment (which also correspond to the edges of the split spreading structure 642) and the outer edges of the prism 641 are shown connected by dashed vertical line segments, which may be considered to mark the boundaries of the prism/split spreading structure pair 648. A geometrical center of the curved segment (also corresponding to its vertex) is labeled GC, and a center of curvature of the curved segment is labeled C. The geometric center for each split spreading structure refers to a point on the structured surface half way between the opposed edges or boundaries of the split spreading structure as a whole; in FIG. 6 such edges or boundaries are the terminal ends of the curved segment. In FIG. 6, the geometric center is disposed at the boundary between the high spreading portion 642a and the low spreading portion 642b, but in alternative embodiments the high spreading portion may be enlarged and the low spreading portion reduced, or vice versa, such that the geometric center of the split spreading structure lies within the high spreading portion, or within the low spreading portion. The geometrical center GC and the prism vertex Vprism may be used as reference points with which to characterize the degree of alignment (or misalignment) of the prism 641 relative to the split spreading structure 642. If the curved segment has a uniform curvature, the center of curvature C (typically a line parallel to the y-axis) is the center of curvature for the entire curved segment, including both the vertex and the outer edges. The curved segment may alternatively have a nonuniform curvature, in which case the center of curvature C is applicable to only the vertex, and other portions of the curved segment would have different centers of curvature.

Figure 6A:
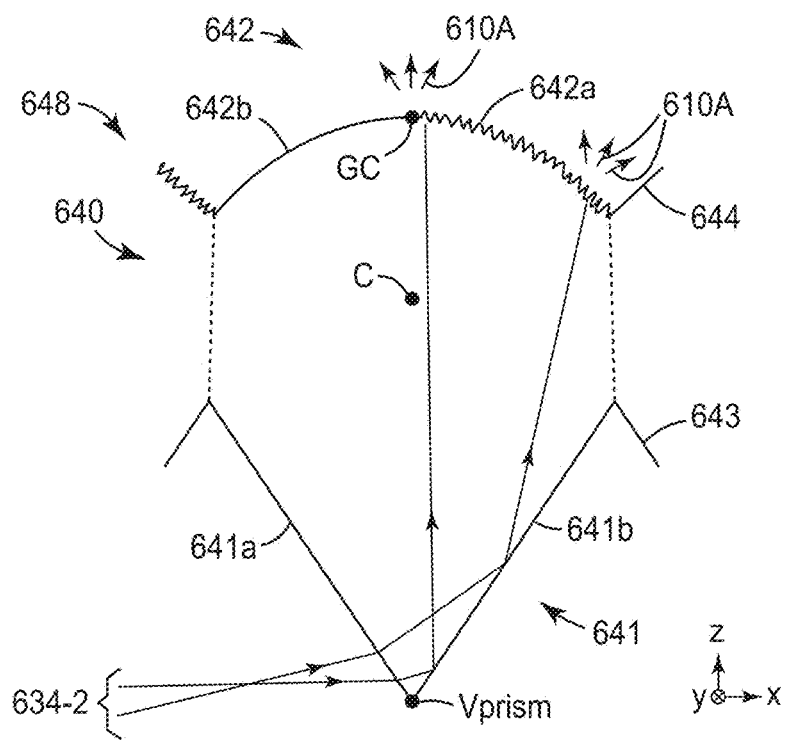
FIG. 6A is a schematic side view of the film portion of FIG. 6, with light rays added to show how oblique light entering a first inclined surface of the prism are primarily directed to a high spreading portion of the split spreading structure.
Figure 6B:
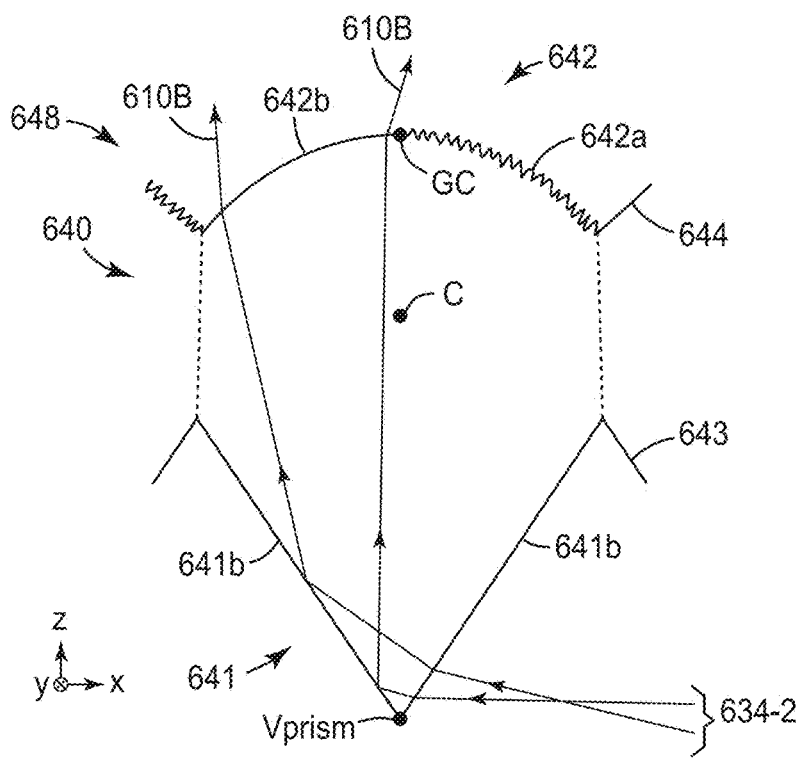
FIG. 6B is a schematic side view of the film portion of FIG. 6, with light rays added to show how oblique light entering a second inclined surface of the prism are primarily directed to a low spreading portion of the split spreading structure.

FIGS. 6A and 6B reproduce the prism/split spreading structure pair 648 of FIG. 6, but superimpose on it light rays that are indicative of its operation in a mode that produces a wide angle output beam (see e.g. FIG. 3) and a mode that produces a narrow angle output beam (see e.g. FIG. 4A or 4B). Items having the same reference number as in FIG. 6 refer to the same respective elements, and need no further discussion.

In FIG. 6A, incident light rays 634-2 impinge on the structured surface 643 of the film 640 along a direction aligned most closely with the positive x-direction. This is analogous to FIG. 3. The incident light rays 634-2 are fairly representative of the oblique light beam 134-2 (see FIG. 3). The light rays 634-2 may for example represent light rays propagating in the x-z plane and making an angle of about 20±10 degrees relative to the x-axis. The light rays 634-2 enter the first inclined side surface 641a of the prism 641. The light rays thereafter propagate through the film as generally depicted in the figure. In an exemplary embodiment, the refractive index of the film 640 may be 1.67 (for a central carrier film portion) and 1.51 (for the prism and split spreading structure portions); the prism apex angle may be about 60 degrees; the radius of curvature of the curved segment may be uniform or non-uniform, and may be about 40 microns; and the distance between the geometrical center GC of the split spreading structure and the prism vertex Vprism may be about 110 microns. The foregoing values are merely representative of a particular embodiment and should not be interpreted in an unduly limiting way. Using these assumptions, the oblique light rays 634-2 will tend to propagate through the film 640 as depicted generally in the figure, and emerge from the film 640 as an output beam represented by the light rays 610A. The light rays 610A provide a wide output beam similar to the wide output beam 310 (FIG. 3), or any of its individual beamlets. The film 640 directs the obliquely incident light rays 634-2 primarily to the high spreading portion 642a of the split spreading structure 642. This is so even though some of the incident rays may be directed to the low spreading portion 642b, and even though some of the incident light rays may be directed to portions of the structured surface 644 that lie outside the bounds of the particular prism/split spreading structure pair 648.

FIG. 6B is for the opposite case, i.e., for the mode that produces a narrow angle output beam. Thus, incident light rays 632-2 impinge on the structured surface 643 of the film 640 along a direction aligned most closely with the negative x-direction. This is analogous to FIG. 4A or 4B. The incident light rays 632-2 are fairly representative of the oblique light beam 132-2 (see FIGS. 4A, 4B). The light rays 632-2 may for example represent light rays propagating in the x-z plane and making an angle of about 20±10 degrees relative to the (negative) x-axis. The light rays 632-2 enter the second inclined side surface 641b of the prism 641. The light rays thereafter propagate through the film as generally depicted in FIG. 6B, assuming the same design features as in FIG. 6A. The light rays 632-2 thus emerge from the film 640 as an output beam represented by the light rays 610B. The light rays 610B provide a narrow output beam similar to the narrow output beam 410a (FIG. 4A) or 410b (FIG. 4B), or any of their individual beamlets. The film 640 directs the obliquely incident light rays 632-2 primarily to the low spreading portion 642b of the split spreading structure 642. This is so even though some of the incident rays may be directed to the high spreading portion 642a, and even though some of the incident light rays may be directed to portions of the structured surface 644 that lie outside the bounds of the particular prism/split spreading structure pair 648.

An exemplary dual-sided optical film of an alternative design is shown in FIGS. 7, 8, 8A, and 8B. This film may be composed of the same or similar materials as those discussed above, and can be made with manufacturing techniques and design features that are the same as or similar to those discussed above.

Figure 7:
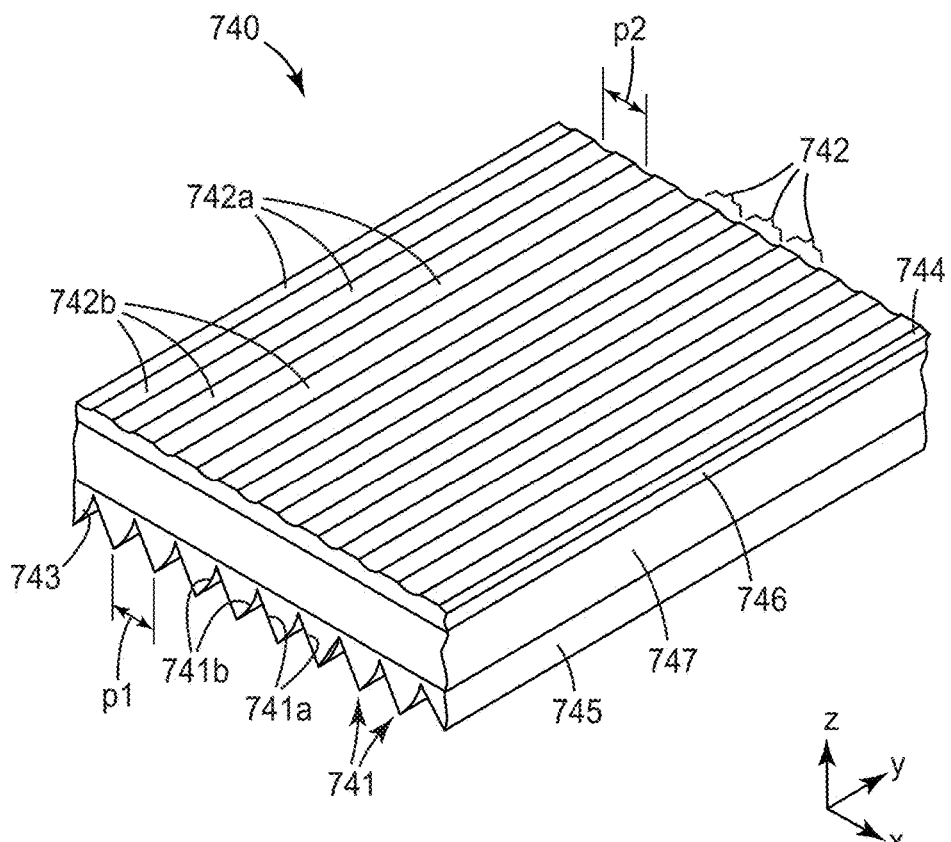
FIG. 7 is a schematic perspective view of a portion of another exemplary dual-sided optical film.

FIG. 7 shows a dual-sided optical film 740. This film has opposed first and second structured surfaces 743, 744, and is shown in relation to a Cartesian x-y-z coordinate system consistent with the previous figures. The first structured surface 743 has a plurality of prisms 741 formed therein. The prisms 741 each extend along an elongation axis parallel to the y-axis. The second structured surface 744 has a plurality of split spreading structures 742 formed therein. These too extend along elongation axes that are parallel to the y-axis. The film 740 has three constituent layers or elements 745, 746, 747, but more or fewer layers are contemplated.

Each prism 741 on the structured surface 743 generally has two inclined side surfaces or facets 741a, 741b. Some adjacent pairs of these inclined surfaces intersect to form prism vertices, while others intersect to form edges or boundaries for each prism 741. Both the vertices and the edges/boundaries are shown in FIG. 7 as being pointed or v-shaped; however, non-pointed and non-v-shaped profiles, e.g., truncated profiles, can also be used. First inclined surfaces 741a are substantially flat, while second inclined surfaces 741b have a gentle curvature in the x-z plane. In alternative embodiments, both surfaces may be flat, or both may be curved. The prisms 741 are characterized by a pitch p1, which may be the same as or different from the pitch p1 from previously described embodiments.

Each split spreading structure 742 on the structured surface 744 has a high spreading portion 742a and a low spreading portion 742b disposed alongside each other. In the embodiment of FIG. 7, both the high spreading portion 742a and the low spreading portion 742b may be characterized by smooth surfaces. However, the high spreading portion 742a is highly curved in the x-z plane relative to the low spreading portion 742b, which may be substantially flat as shown. For each split spreading structure, the high spreading portion 742a and the low spreading portion 742b meet along a boundary that is parallel to the axis of elongation of the split spreading structure, i.e., parallel to the y-axis. The boundary may be abrupt or gradual. The split spreading structures 742 are characterized by a pitch p2, which may be the same as or different from the pitch p2 from previously described embodiments.

Figure 8:
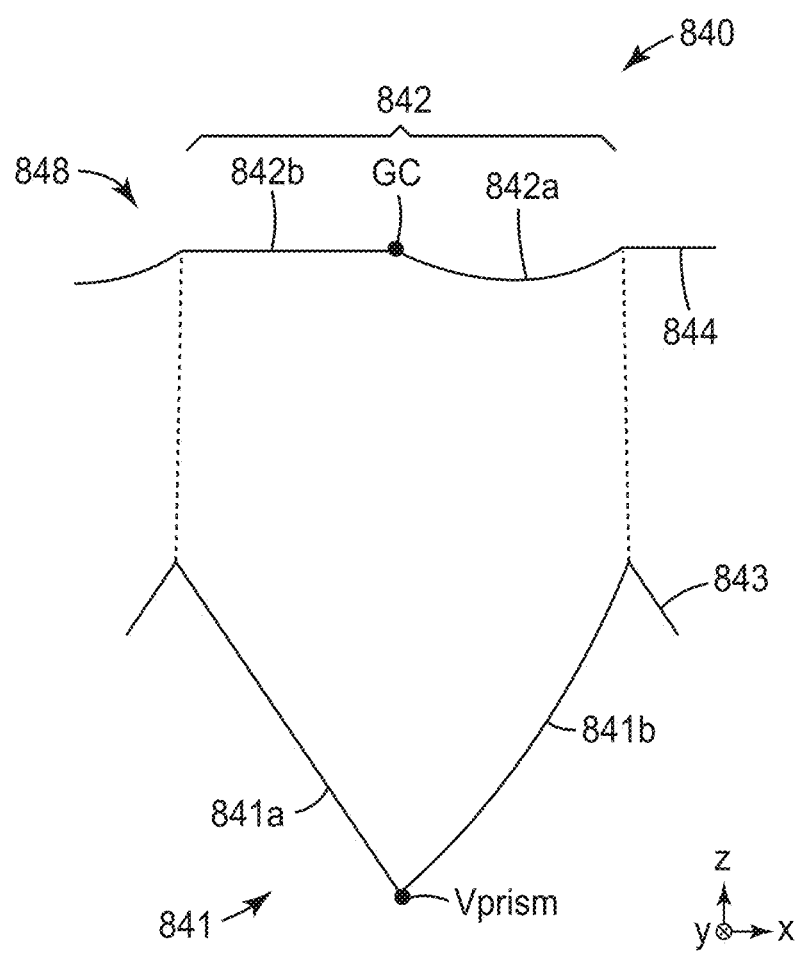
FIG. 8 is a schematic side view of a portion of a dual-sided optical film having the same or similar design as that of FIG. 7, this view showing one prism/split spreading structure pair.

In FIG. 8 we show a schematic view of a portion of a dual-sided optical film 840 which may be the same as, or similar to, the film 740 of FIG. 7. The view of FIG. 8 is enlarged compared to that of FIG. 7 to allow closer inspection of a single prism/split spreading structure pair, labeled 848, which is assumed to be immersed in air. The Cartesian coordinate system of FIG. 8 is consistent with the coordinates in FIG. 7 and the previous figures. The film 840 is shown to be unitary, but it may alternatively have the layered construction of FIG. 7, or a different layered construction. The film 840 has a first structured surface 843 with a plurality of prisms 841 formed therein. The surface 843 and prism 841 may be the same as the respective structured surface 743 and prism 741 discussed above. In that regard, the prism 841 has two inclined side surfaces or facets 841a, 841b, which may be the same as respective inclined surfaces 741a, 741b discussed above. The surfaces 841a, 841b intersect to form a prism vertex Vprism, which vertex may be a line or ridge extending parallel to the y-axis.

The film 840 also has a second structured surface 844 with a plurality of split spreading structures 842 formed therein. The surface 844 and split spreading structure 842 may be the same as the respective structured surface 744 and split spreading structure 742 discussed above. The split spreading structure 842 thus has a high spreading portion 842a, which may be the same as portion 742a discussed above, disposed alongside a low spreading portion 842b, which may be the same as portion 742b discussed above. The high spreading portion 842a has a highly curved surface in the x-z plane relative to low spreading portion 842b. The high spreading portion 842a is a lenslet which is diverging or concave. The outer edges of the split spreading structure 842 and the outer edges of the prism 841 are shown connected by dashed vertical line segments, which may be considered to mark the boundaries of the prism/split spreading structure pair 848. A geometrical center (from the standpoint of the x-z plane) of the split spreading structure 842 is labeled GC. The geometrical center GC and the prism vertex Vprism may be used as reference points with which to characterize the degree of alignment (or misalignment) of the prism 841 relative to the split spreading structure 842.

Figure 8A:
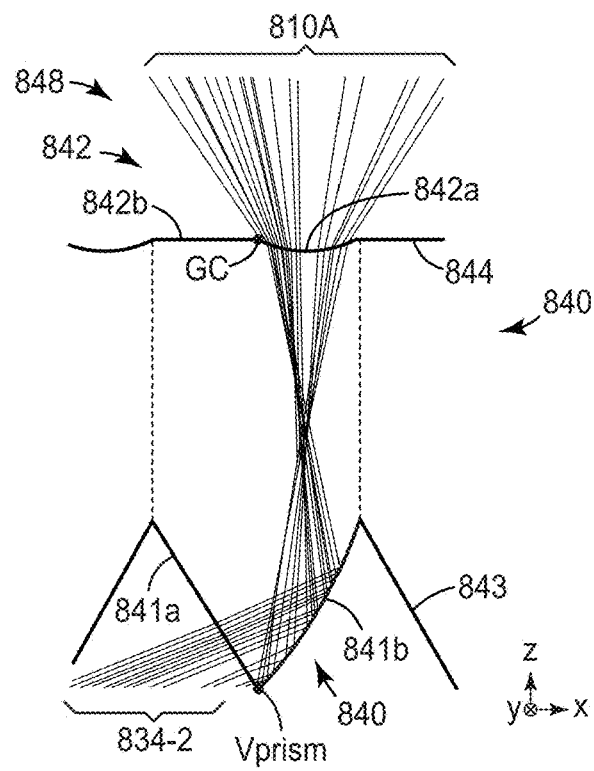
FIG. 8A is a schematic side view of the film portion of FIG. 8, with light rays added to show how oblique light entering a first inclined surface of the prism are primarily directed to a high spreading portion of the split spreading structure.
Figure 8B:
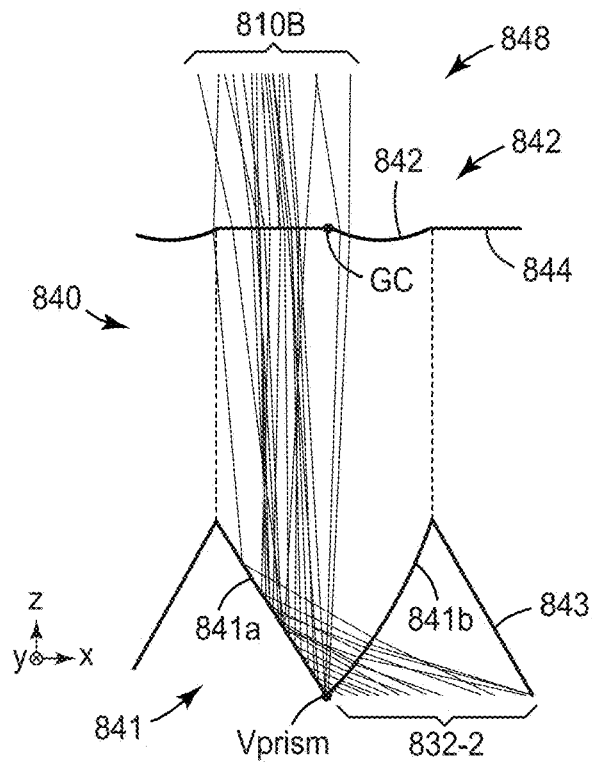
FIG. 8B is a schematic side view of the film portion of FIG. 8, with light rays added to show how oblique light entering a second inclined surface of the prism are primarily directed to a low spreading portion of the split spreading structure.

FIGS. 8A and 8B reproduce the prism/split spreading structure pair 848 of FIG. 8, but superimpose on it light rays that are indicative of its operation in a mode that produces a wide angle output beam (see e.g. FIG. 3) and a mode that produces a narrow angle output beam (see e.g. FIG. 4A or 4B). Items having the same reference number as in FIG. 8 refer to the same respective elements, and need no further discussion.

In FIG. 8A, incident light rays 834-2 impinge on the structured surface 843 of the film 840 along a direction aligned most closely with the positive x-direction. This is analogous to FIG. 3. The incident light rays 834-2 are fairly representative of the oblique light beam 134-2 (see FIG. 3). The light rays 834-2 were modeled as light rays propagating in the x-z plane and making an angle of 18±10 degrees relative to the x-axis. The light rays 834-2 enter the first inclined side surface 841a of the prism 841. Optical modeling was used to determine how the light rays would thereafter propagate through the film. The modeling assumed: the refractive index of the film 840 was 1.67 (for a central carrier film portion) and 1.51 (for the prism and split spreading structure portions); the prism apex angle was about 63.5 degrees; the radius of curvature of the prism surface 841b was 160 microns; the radius of curvature of the high spreading portion 842a was 30 microns; and the distance between the geometrical center GC and the prism vertex Vprism was 113 microns. Using these assumptions, the optical modeling computed the trajectories of the light rays 834-2 through the film 840, and the results are shown as the light rays 810A. Inspection of FIG. 8A reveals that the light rays 810A provide a wide output beam similar to the wide output beam 310 (FIG. 3), or any of its individual beamlets. The output beam of rays 810A is made wider by the fact that the second inclined surfaces 841b are curved; this curvature works in concert with the curvature of the high spreading portions 842a to provide more light spreading than if the inclined surfaces 841b were flat, in similar fashion to the operation of a compound lens. Inspection of FIG. 8A further reveals that the film 840 directs the obliquely incident light rays 834-2 primarily to the high spreading portion 842a of the split spreading structure 842. This is so even though some of the incident rays are directed to the low spreading portion 842b, and even though some of the incident light rays are directed to portions of the structured surface 844 that lie outside the bounds of the particular prism/split spreading structure pair 848.

FIG. 8B is for the opposite case, i.e., for the mode that produces a narrow angle output beam. Thus, incident light rays 832-2 impinge on the structured surface 843 of the film 840 along a direction aligned most closely with the negative x-direction. This is analogous to FIG. 4A or 4B. The incident light rays 832-2 are fairly representative of the oblique light beam 132-2 (see FIGS. 4A, 4B). The light rays 832-2 were modeled as light rays propagating in the x-z plane that make an angle of 18±10 degrees relative to the (negative) x-axis. The light rays 832-2 enter the second inclined side surface 841b of the prism 841. Optical modeling was used to determine how the light rays would thereafter propagate through the film. The modeling assumed the same design features as in FIG. 8A. Using these assumptions, the optical modeling computed the trajectories of the light rays 832-2 through the film 840, and the results are shown as the light rays 810B. Inspection of FIG. 8B reveals that the light rays 810B provide a narrow output beam similar to the narrow output beam 410a (FIG. 4A) or 410b (FIG. 4B), or any of their individual beamlets. Inspection of FIG. 8B further reveals that the film 840 directs the obliquely incident light rays 832-2 primarily to the low spreading portion 842b of the split spreading structure 842. This is so even though some of the incident rays are directed to the high spreading portion 842a, and even though some of the incident light rays are directed to portions of the structured surface 844 that lie outside the bounds of the particular prism/split spreading structure pair 848.

An exemplary dual-sided optical film of an alternative design is shown in FIGS. 9, 10, 10A, and 10B. This film may be composed of the same or similar materials as those discussed above, and can be made with manufacturing techniques and design features that are the same as or similar to those discussed above.

Figure 9:
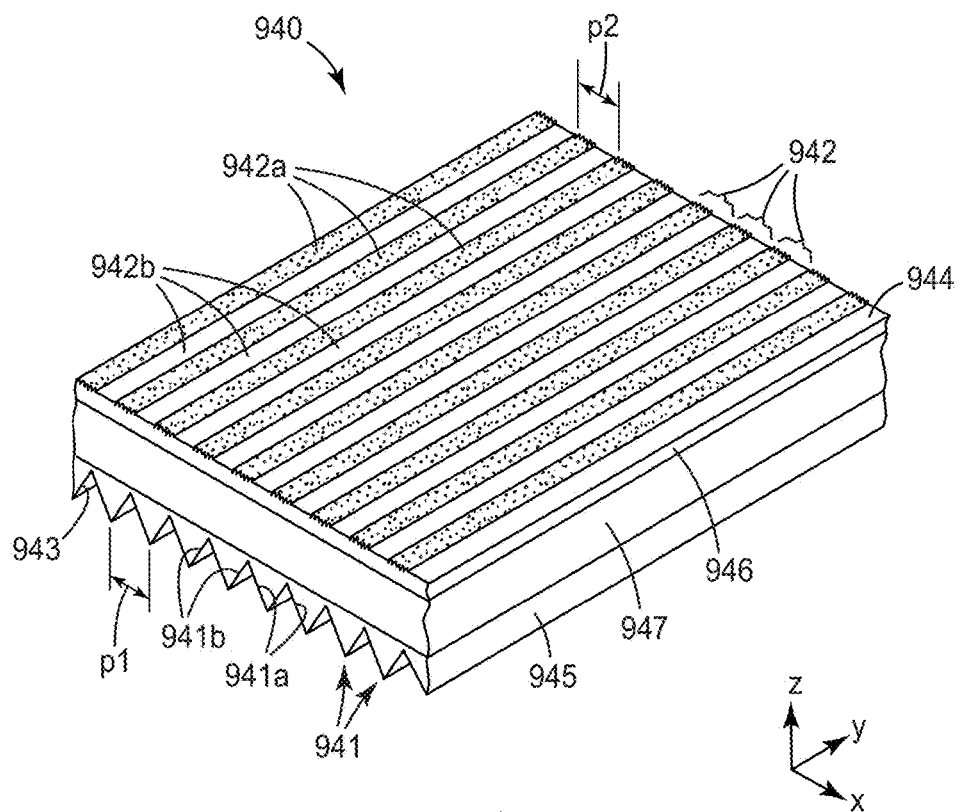
FIG. 9 is a schematic perspective view of a portion of another exemplary dual-sided optical film.

FIG. 9 shows a dual-sided optical film 940. This film has opposed first and second structured surfaces 943, 944, and is shown in relation to a Cartesian x-y-z coordinate system consistent with the previous figures. The first structured surface 943 has a plurality of prisms 941 formed therein. The prisms 941 each extend along an elongation axis parallel to the y-axis. The second structured surface 944 has a plurality of split spreading structures 942 formed therein. These too extend along elongation axes that are parallel to the y-axis. The film 940 has three constituent layers or elements 945, 946, 947, but more or fewer layers are contemplated.

Each prism 941 on the structured surface 943 generally has two inclined side surfaces or facets 941a, 941b. Some adjacent pairs of these inclined surfaces intersect to form prism vertices, while others intersect to form edges or boundaries for each prism 941. Both the vertices and the edges/boundaries are shown in FIG. 9 as being pointed or v-shaped; however, non-pointed and non-v-shaped profiles, e.g., truncated profiles, can also be used. Both the first inclined surfaces 941a and the second inclined surfaces 942b are substantially flat. In alternative embodiments, one or both surfaces may be gently curved in the x-z plane. The prisms 941 are characterized by a pitch p1, which may be the same as or different from the pitch p1 from previously described embodiments.

Each split spreading structure 942 on the structured surface 944 has a high spreading portion 942a and a low spreading portion 942b disposed alongside each other. In the figure, the high spreading portions 942a are shown shaded to indicate a roughened surface in comparison to the smoother surface of the low spreading portion 942b. In the embodiment of FIG. 9, both the high spreading portion 942a and the low spreading portion 942b may be substantially flat and parallel to the x-y plane, but the low spreading portion 942b is characterized by a smooth surface (which provides little or no light scattering) in comparison to the high spreading portion 942a, which is characterized by a roughened surface to provide significant light scattering. For each split spreading structure, the high spreading portion 942a and the low spreading portion 942b meet along a boundary that is parallel to the axis of elongation of the split spreading structure, i.e., parallel to the y-axis. The boundary may be abrupt or gradual. The split spreading structures 942 are characterized by a pitch p2, which may be the same as or different from the pitch p2 from previously described embodiments.

Figure 10:
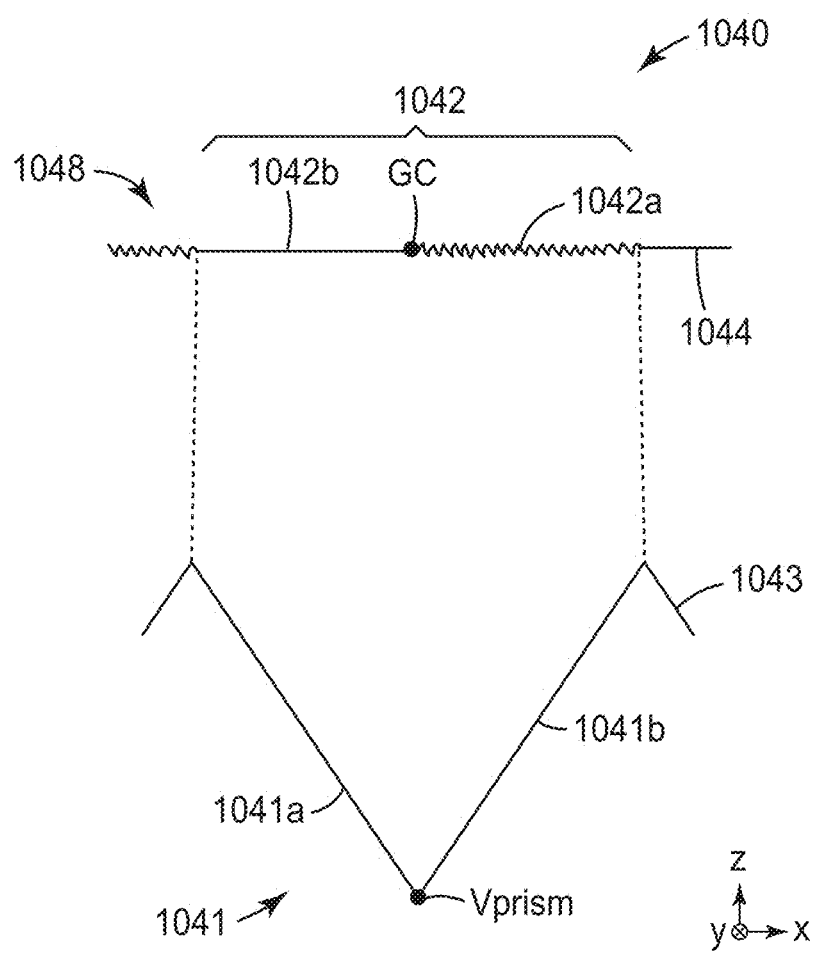
FIG. 10 is a schematic side view of a portion of a dual-sided optical film having the same or similar design as that of FIG. 9, this view showing one prism/split spreading structure pair.

In FIG. 10 we show a schematic view of a portion of a dual-sided optical film 1040 which may be the same as, or similar to, the film 940 of FIG. 9. The view of FIG. 10 is enlarged compared to that of FIG. 9 to allow closer inspection of a single prism/split spreading structure pair, labeled 1048, which is assumed to be immersed in air. The Cartesian coordinate system of FIG. 10 is consistent with the coordinates in FIG. 9 and the previous figures. The film 1040 is shown to be unitary, but it may alternatively have the layered construction of FIG. 9, or a different layered construction. The film 1040 has a first structured surface 1043 with a plurality of prisms 1041 formed therein. The surface 1043 and prism 1041 may be the same as the respective structured surface 943 and prism 941 discussed above. In that regard, the prism 1041 has two inclined side surfaces or facets 1041a, 1041b, which may be the same as respective inclined surfaces 941a, 941b discussed above. The surfaces 1041a, 1041b intersect to form a prism vertex Vprism, which vertex may be a line or ridge extending parallel to the y-axis.

The film 1040 also has a second structured surface 1044 with a plurality of split spreading structures 1042 formed therein. The surface 1044 and split spreading structure 1042 may be the same as the respective structured surface 944 and split spreading structure 942 discussed above. The split spreading structure 1042 thus has a high spreading portion 1042a, which may be the same as portion 942a discussed above, disposed alongside a low spreading portion 1042b, which may be the same as portion 942b discussed above. The high spreading portion 1042a has a roughened surface characteristic in the x-z plane relative to low spreading portion 1042b, which is smooth in comparison. The outer edges of the split spreading structure 1042 and the outer edges of the prism 1041 are shown connected by dashed vertical line segments, which may be considered to mark the boundaries of the prism/split spreading structure pair 1048. A geometrical center (from the standpoint of the x-z plane)

of the split spreading structure 1042 is labeled GC. The geometrical center GC and the prism vertex Vprism may be used as reference points with which to characterize the degree of alignment (or misalignment) of the prism 1041 relative to the split spreading structure 1042.

Figure 10A:
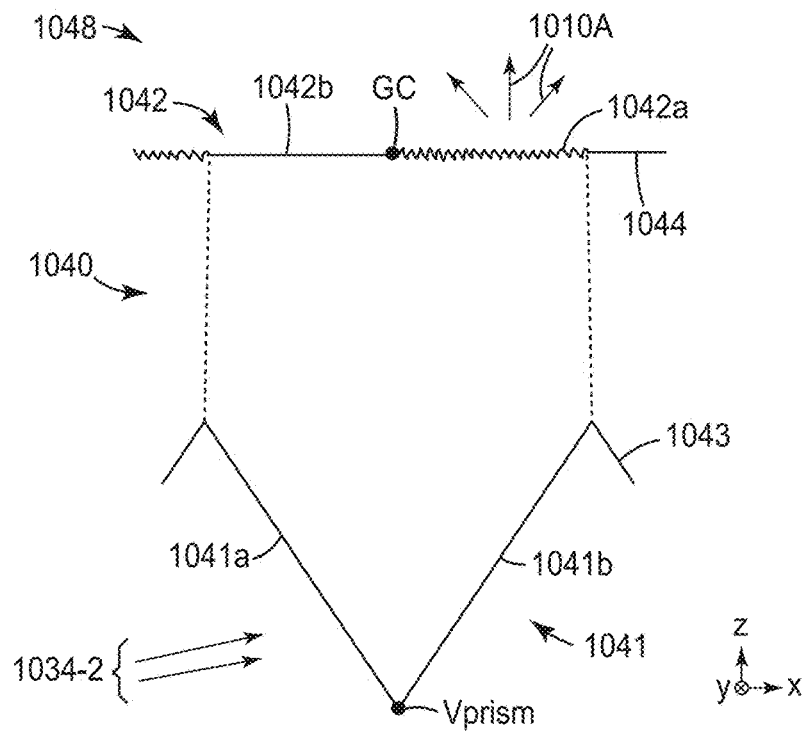
FIG. 10A is a schematic side view of the film portion of FIG. 10, with light rays added to show how oblique light entering a first inclined surface of the prism are primarily directed to a high spreading portion of the split spreading structure.
Figure 10B:
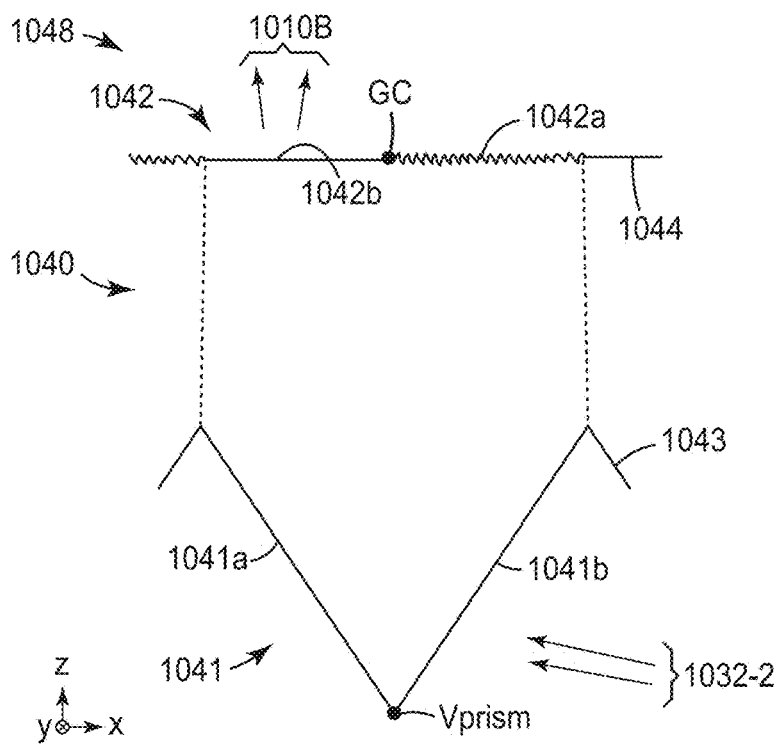
FIG. 10B is a schematic side view of the film portion of FIG. 10, with light rays added to show how oblique light entering a second inclined surface of the prism are primarily directed to a low spreading portion of the split spreading structure.

FIGS. 10A and 10B reproduce the prism/split spreading structure pair 1048 of FIG. 10, but superimpose on it light rays that are indicative of its operation in a mode that produces a wide angle output beam (see e.g. FIG. 3) and a mode that produces a narrow angle output beam (see e.g. FIG. 4A or 4B). Items having the same reference number as in FIG. 10 refer to the same respective elements, and need no further discussion.

In FIG. 10A, incident light rays 1034-2 impinge on the structured surface 1043 of the film 1040 along a direction aligned most closely with the positive x-direction. This is analogous to FIG. 3. The incident light rays 1034-2 are fairly representative of the oblique light beam 134-2 (see FIG. 3). The light rays 1034-2 may for example represent light rays propagating in the x-z plane and making an angle of about 20±10 degrees relative to the x-axis. The light rays 1034-2 enter the first inclined side surface 1041*a* of the prism 1041. The light rays thereafter propagate through the film as generally depicted in the figure. In an exemplary embodiment, the refractive index of the film 1040 may be 1.67 (for a central carrier film portion) and 1.51 (for the prism and split spreading structure portions); the prism apex angle may be about 60 degrees; the roughness (Ra) of the high spreading portion 1042*a* may be a value substantially greater than that of the low spreading portion 1042*b*; and the distance between the geometrical center GC and the prism vertex Vprism may be 113 microns. The foregoing values are merely representative of a particular embodiment and should not be interpreted in an unduly limiting way. Using these assumptions, the oblique light rays 1034-2 will tend to propagate through the film 1040 as depicted generally in the figure, and emerge from the film 1040 as an output beam represented by the light rays 1010A. The light rays 1010A provide a wide output beam similar to the wide output beam 310 (FIG. 3), or any of its individual beamlets. The film 1040 directs the obliquely incident light rays 1034-2 primarily to the high spreading portion 1042*a* of the split spreading structure 1042. This is so even though some of the incident rays may be directed to the low spreading portion 1042*b*, and even though some of the incident light rays may be directed to portions of the structured surface 1044 that lie outside the bounds of the particular prism/split spreading structure pair 1048.

FIG. 10B is for the opposite case, i.e., for the mode that produces a narrow angle output beam. Thus, incident light rays 1032-2 impinge on the structured surface 1043 of the film 1040 along a direction aligned most closely with the negative x-direction. This is analogous to FIG. 4A or 4B. The incident light rays 1032-2 are fairly representative of the oblique light beam 132-2 (see FIGS. 4A, 4B). The light rays 1032-2 may for example represent light rays propagating in the x-z plane that make an angle of about 20±10 degrees relative to the (negative) x-axis. The light rays 1032-2 enter the second inclined side surface 1041*b* of the prism 1041. The light rays thereafter propagate through the film as generally depicted in FIG. 10B, assuming the same design features as in FIG. 10A. The light rays 1032-2 thus emerge from the film 1040 as an output beam represented by the light rays 1010B. The light rays 1010B provide a narrow output beam similar to the narrow output beam 410*a* (FIG. 4A) or 410*b* (FIG. 4B), or any of their individual beamlets. The film 1040 directs the obliquely incident light rays 1032-2 primarily to the low spreading portion 1042*b* of the split spreading structure 1042. This is so even though some of the incident rays may be directed to the high spreading portion 1042*a*, and even though some of the incident light rays may be directed to portions of the structured surface 1044 that lie outside the bounds of the particular prism/split spreading structure pair 1048.

An exemplary dual-sided optical film of an alternative design is shown in FIGS. 11, 12, 12A, and 12B. This film may be composed of the same or similar materials as those discussed above, and can be made with manufacturing techniques and design features that are the same as or similar to those discussed above.

Figure 11:
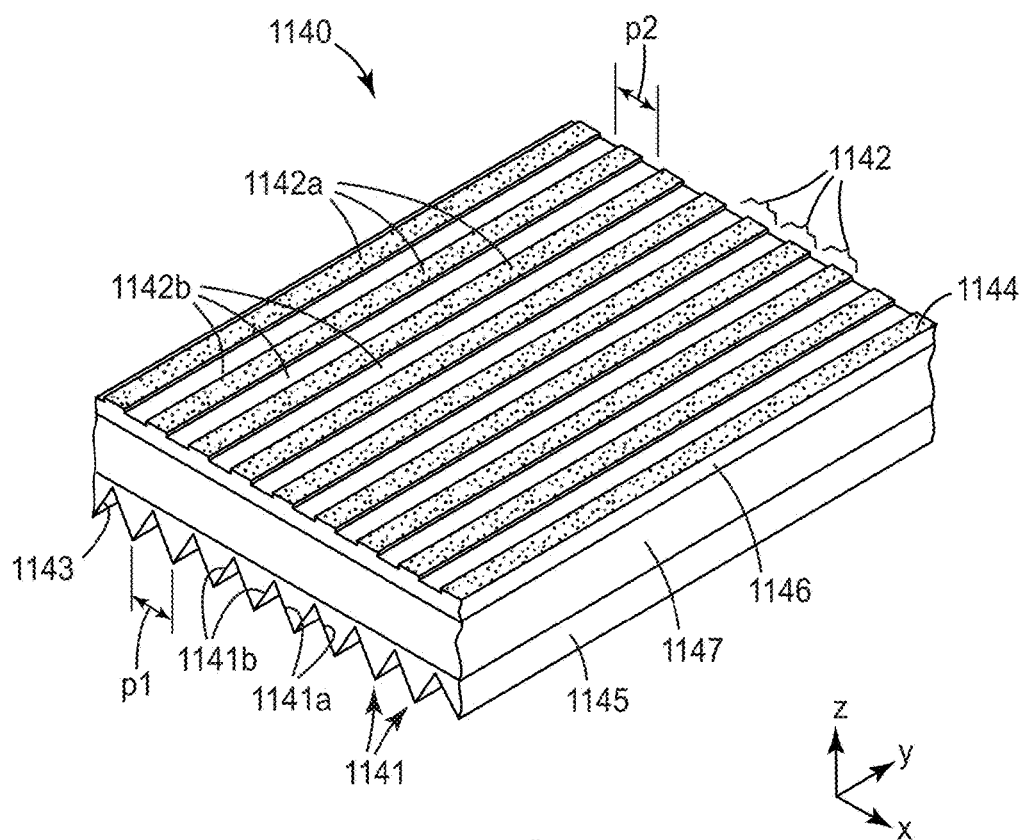
FIG. 11 is a schematic perspective view of a portion of another exemplary dual-sided optical film.

FIG. 11 shows a dual-sided optical film 1140. This film has opposed first and second structured surfaces 1143, 1144, and is shown in relation to a Cartesian x-y-z coordinate system consistent with the previous figures. The first structured surface 1143 has a plurality of prisms 1141 formed therein. The prisms 1141 each extend along an elongation axis parallel to the y-axis. The second structured surface 1144 has a plurality of split spreading structures 1142 formed therein. These too extend along elongation axes that are parallel to the y-axis. The film 1140 has three constituent layers or elements 1145, 1146, 1147, but more or fewer layers are contemplated.

Each prism 1141 on the structured surface 1143 generally has two inclined side surfaces or facets 1141*a*, 1141*b*. Some adjacent pairs of these inclined surfaces intersect to form prism vertices, while others intersect to form edges or boundaries for each prism 1141. Both the vertices and the edges/boundaries are shown in FIG. 11 as being pointed or v-shaped; however, non-pointed and non-v-shaped profiles, e.g., truncated profiles, can also be used. Both the first inclined surfaces 1141*a* and the second inclined surfaces 1142*b* are substantially flat. In alternative embodiments, one or both surfaces may be gently curved in the x-z plane. The prisms 1141 are characterized by a pitch p1, which may be the same as or different from the pitch p1 from previously described embodiments.

Each split spreading structure 1142 on the structured surface 1144 has a high spreading portion 1142*a* and a low spreading portion 1142*b* disposed alongside each other. In the figure, the high spreading portions 1142*a* are shown shaded to indicate a roughened surface in comparison to the smoother surface of the low spreading portion 1142*b*. In the embodiment of FIG. 11, both the high spreading portion 1142*a* and the low spreading portion 1142*b* may be substantially flat and parallel to the x-y plane, but the low spreading portion 1142*b* is characterized by a smooth surface (which provides little or no light scattering) in comparison to the high spreading portion 1142*a*, which is characterized by a roughened surface to provide significant light scattering. Furthermore, the high spreading portions 1142*a* are raised relative to the low spreading portions 1142*b*, which may be used to facilitate the selective roughening. For example, the structured surface 1144 may initially be formed such that the portions 1142*a* are raised but smooth, and then a roughening operation may be performed on the structured surface, but, due to the recessed nature of the portions 1142*b*, only the portions 1142*a* are roughened, while the portions 1142*b* remain smooth. (In an alternative embodiment in which the roles of the portions 1142*a*, 1142*b* are reversed, the raised portions may remain smooth, and a diffusive or scattering material may be printed or otherwise deposited in the recesses but not on the raised portions. In such a case, the portions 1142*a* would then be low spreading portions, and the portions 1142*b* would be high spreading portions.) For each split spreading structure, the high spreading portion 1142a and the low spreading portion 1142b meet along a boundary that is parallel to the axis of elongation of the split spreading structure, i.e., parallel to the y-axis. The boundary may be abrupt or gradual. The split spreading structures 1142 are characterized by a pitch p2, which may be the same as or different from the pitch p2 from previously described embodiments.

Figure 12:
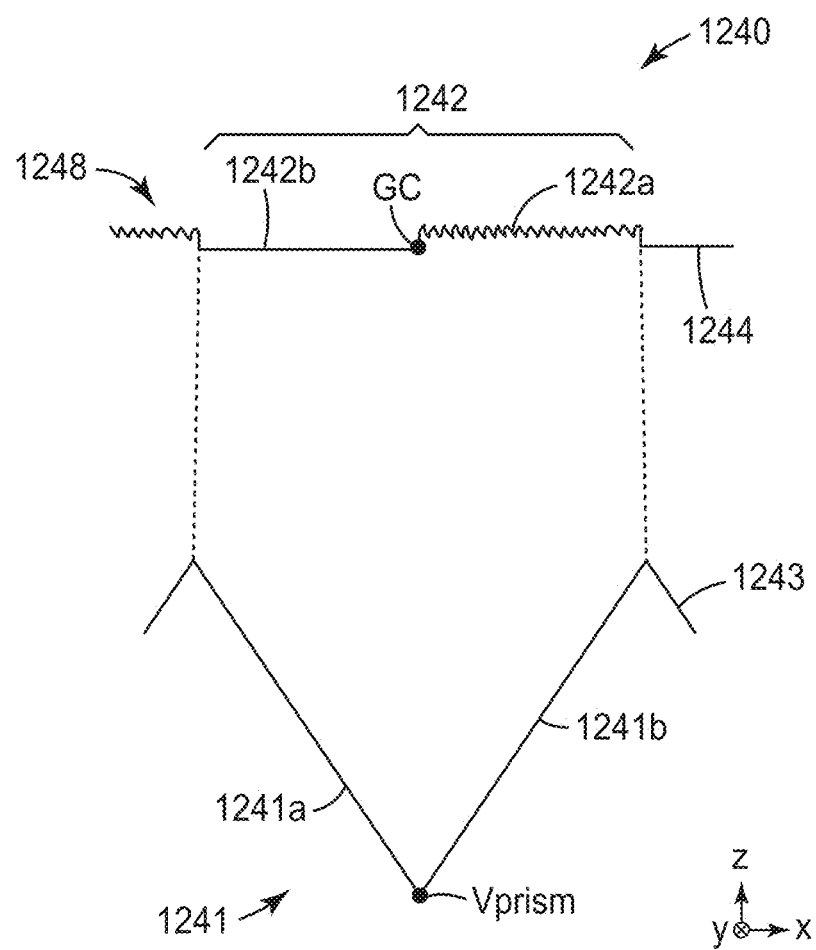
FIG. 12 is a schematic side view of a portion of a dual-sided optical film having the same or similar design as that of FIG. 11, this view showing one prism/split spreading structure pair.

In FIG. 12 we show a schematic view of a portion of a dual-sided optical film 1240 which may be the same as, or similar to, the film 1140 of FIG. 11. The view of FIG. 12 is enlarged compared to that of FIG. 11 to allow closer inspection of a single prism/split spreading structure pair, labeled 1248, which is assumed to be immersed in air. The Cartesian coordinate system of FIG. 12 is consistent with the coordinates in FIG. 11 and the previous figures. The film 1240 is shown to be unitary, but it may alternatively have the layered construction of FIG. 11, or a different layered construction. The film 1240 has a first structured surface 1243 with a plurality of prisms 1241 formed therein. The surface 1243 and prism 1241 may be the same as the respective structured surface 1143 and prism 1141 discussed above. In that regard, the prism 1241 has two inclined side surfaces or facets 1241a, 1241b, which may be the same as respective inclined surfaces 1141a, 1141b discussed above. The surfaces 1241a, 1241b intersect to form a prism vertex Vprism, which vertex may be a line or ridge extending parallel to the y-axis.

The film 1240 also has a second structured surface 1244 with a plurality of split spreading structures 1242 formed therein. The surface 1244 and split spreading structure 1242 may be the same as the respective structured surface 1144 and split spreading structure 1142 discussed above. The split spreading structure 1242 thus has a high spreading portion 1242a, which may be the same as portion 1142a discussed above, disposed alongside a low spreading portion 1242b, which may be the same as portion 1142b discussed above. The high spreading portion 1242a has a roughened surface characteristic in the x-z plane relative to low spreading portion 1242b, which is smooth in comparison, and the portion 1242a is raised relative to the portion 1242b. The outer edges of the split spreading structure 1242 and the outer edges of the prism 1241 are shown connected by dashed vertical line segments, which may be considered to mark the boundaries of the prism/split spreading structure pair 1248. A geometrical center (from the standpoint of the x-z plane) of the split spreading structure 1242 is labeled GC. The geometrical center GC and the prism vertex Vprism may be used as reference points with which to characterize the degree of alignment (or misalignment) of the prism 1241 relative to the split spreading structure 1242.

Figure 12A:
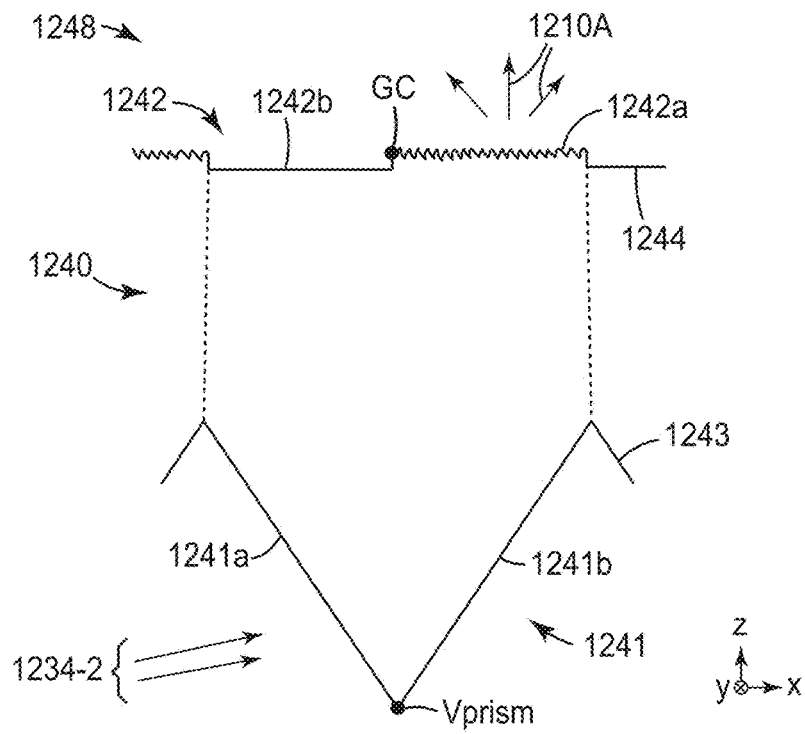
FIG. 12A is a schematic side view of the film portion of FIG. 12, with light rays added to show how oblique light entering a first inclined surface of the prism are primarily directed to a high spreading portion of the split spreading structure.
Figure 12B:
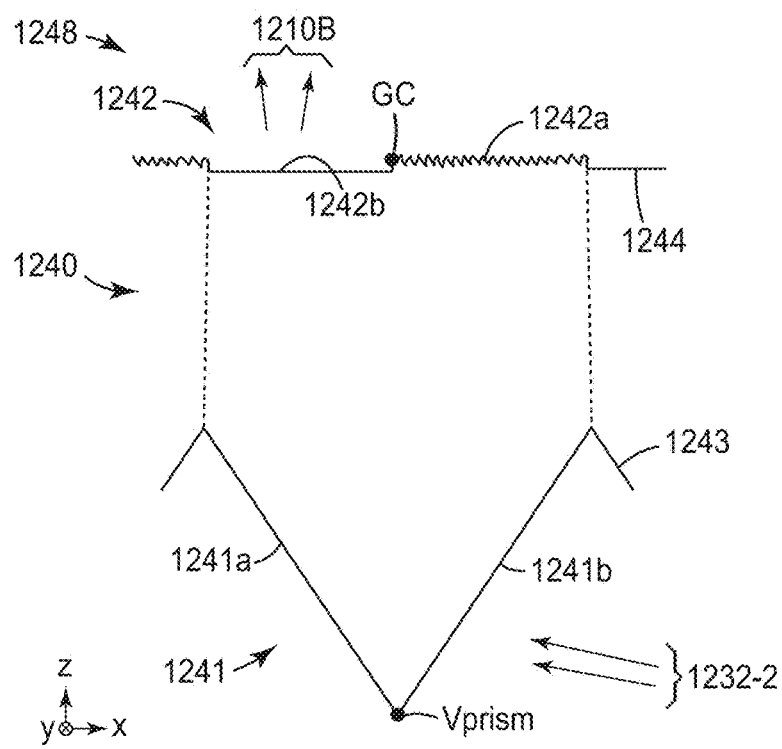
FIG. 12B is a schematic side view of the film portion of FIG. 12, with light rays added to show how oblique light entering a second inclined surface of the prism are primarily directed to a low spreading portion of the split spreading structure.

FIGS. 12A and 12B reproduce the prism/split spreading structure pair 1248 of FIG. 12, but superimpose on it light rays that are indicative of its operation in a mode that produces a wide angle output beam (see e.g. FIG. 3) and a mode that produces a narrow angle output beam (see e.g. FIG. 4A or 4B). Items having the same reference number as in FIG. 12 refer to the same respective elements, and need no further discussion.

In FIG. 12A, incident light rays 1234-2 impinge on the structured surface 1243 of the film 1240 along a direction aligned most closely with the positive x-direction. This is analogous to FIG. 3. The incident light rays 1234-2 are fairly representative of the oblique light beam 134-2 (see FIG. 3). The light rays 1234-2 may for example represent light rays propagating in the x-z plane and making an angle of about 20±10 degrees relative to the x-axis. The light rays 1234-2 enter the first inclined side surface 1241a of the prism 1241. The light rays thereafter propagate through the film as generally depicted in the figure. In an exemplary embodiment, the refractive index of the film 1240 may be 1.67 (for a central carrier film portion) and 1.51 (for the prism and split spreading structure portions); the prism apex angle may be about 60 degrees; the roughness (Ra) of the high spreading portion 1242a may be a value substantially greater than that of the low spreading portion 1242b; the vertical separation between the high spreading portion 1242a and the low spreading portion 1242b may be 25 microns; and the distance between the geometrical center GC and the prism vertex Vprism may be 113 microns. The foregoing values are merely representative of a particular embodiment and should not be interpreted in an unduly limiting way. Using these assumptions, the oblique light rays 1234-2 will tend to propagate through the film 1240 as generally depicted in the figure, and emerge from the film 1240 as an output beam represented by the light rays 1210A. The light rays 1210A provide a wide output beam similar to the wide output beam 310 (FIG. 3), or any of its individual beamlets. The film 1240 directs the obliquely incident light rays 1234-2 primarily to the high spreading portion 1242a of the split spreading structure 1242. This is so even though some of the incident rays may be directed to the low spreading portion 1242b, and even though some of the incident light rays may be directed to portions of the structured surface 1244 that lie outside the bounds of the particular prism/split spreading structure pair 1248.

FIG. 12B is for the opposite case, i.e., for the mode that produces a narrow angle output beam. Thus, incident light rays 1232-2 impinge on the structured surface 1243 of the film 1240 along a direction aligned most closely with the negative x-direction. This is analogous to FIG. 4A or 4B. The incident light rays 1232-2 are fairly representative of the oblique light beam 132-2 (see FIGS. 4A, 4B). The light rays 1232-2 may for example represent light rays propagating in the x-z plane that make an angle of about 20±10 degrees relative to the (negative) x-axis. The light rays 1232-2 enter the second inclined side surface 1241b of the prism 1241. The light rays thereafter propagate through the film as generally depicted in FIG. 12B, assuming the same design features as in FIG. 12A. The light rays 1232-2 thus emerge from the film 1240 as an output beam represented by the light rays 1210B. The light rays 1210B provide a narrow output beam similar to the narrow output beam 410a (FIG. 4A) or 410b (FIG. 4B), or any of their individual beamlets. The film 1240 directs the obliquely incident light rays 1232-2 primarily to the low spreading portion 1242b of the split spreading structure 1242. This is so even though some of the incident rays may be directed to the high spreading portion 1242a, and even though some of the incident light rays may be directed to portions of the structured surface 1244 that lie outside the bounds of the particular prism/split spreading structure pair 1248.

An exemplary dual-sided optical film of an alternative design is shown in FIGS. 13, 14, 14A, and 14B. This film may be composed of the same or similar materials as those discussed above, and can be made with manufacturing techniques and design features that are the same as or similar to those discussed above.

Figure 13:
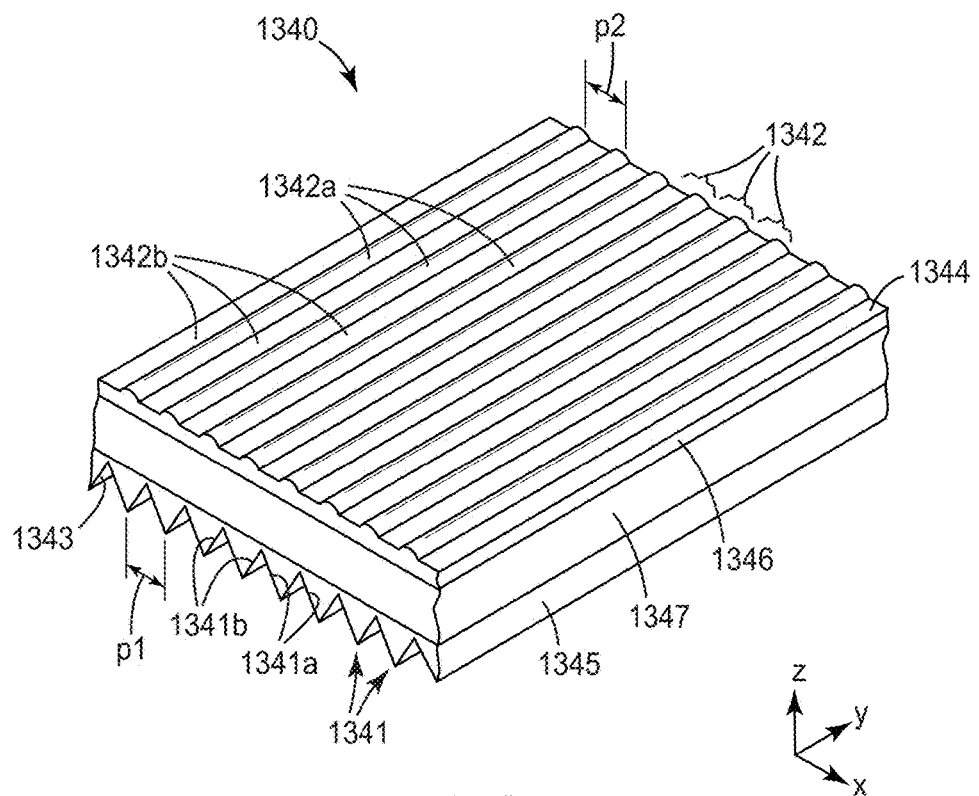
FIG. 13 is a schematic perspective view of a portion of another exemplary dual-sided optical film.

FIG. 13 shows a dual-sided optical film 1340. This film has opposed first and second structured surfaces 1343, 1344, and is shown in relation to a Cartesian x-y-z coordinate system consistent with the previous figures. The first structured surface 1343 has a plurality of prisms 1341 formed therein. The prisms 1341 each extend along an elongation axis parallel to the y-axis. The second structured surface 1344 has a plurality of split spreading structures 1342 formed therein. These too extend along elongation axes that are parallel to the y-axis. The film 1340 has three constituent layers or elements 1345, 1346, 1347, but more or fewer layers are contemplated.

Each prism 1341 on the structured surface 1343 generally has two inclined side surfaces or facets 1341*a*, 1341*b*. Some adjacent pairs of these inclined surfaces intersect to form prism vertices, while others intersect to form edges or boundaries for each prism 1341. Both the vertices and the edges/boundaries are shown in FIG. 13 as being pointed or v-shaped; however, non-pointed and non-v-shaped profiles, e.g., truncated profiles, can also be used. Both the first inclined surfaces 1341*a* and the second inclined surfaces 1342*b* are substantially flat. In alternative embodiments, one or both surfaces may be gently curved in the x-z plane. The prisms 1341 are characterized by a pitch p1, which may be the same as or different from the pitch p1 from previously described embodiments.

Each split spreading structure 1342 on the structured surface 1344 has a high spreading portion 1342*a* and a low spreading portion 1342*b* disposed alongside each other. In the figure, both the high spreading portion 1342*a* and the low spreading portion 1342*b* may be characterized by smooth surfaces. However, the high spreading portion 1342*a* is highly curved in the x-z plane relative to the low spreading portion 1342*b*, which may be substantially flat and parallel to the x-y plane as shown. (Note that the curvature of the high spreading portions 1342*a* is opposite that of the high spreading portions 742*a* in FIG. 7—the spreading portions 1342*a* being positive or focusing lenslets and the spreading portions 742*a* being negative or defocusing lenslets.) The high spreading portion 1342*a* is a lenslet which is converging or convex. For each split spreading structure, the high spreading portion 1342*a* and the low spreading portion 1342*b* meet along a boundary that is parallel to the axis of elongation of the split spreading structure, i.e., parallel to the y-axis. The boundary may be abrupt or gradual. The split spreading structures 1342 are characterized by a pitch p2, which may be the same as or different from the pitch p2 from previously described embodiments.

Figure 14:
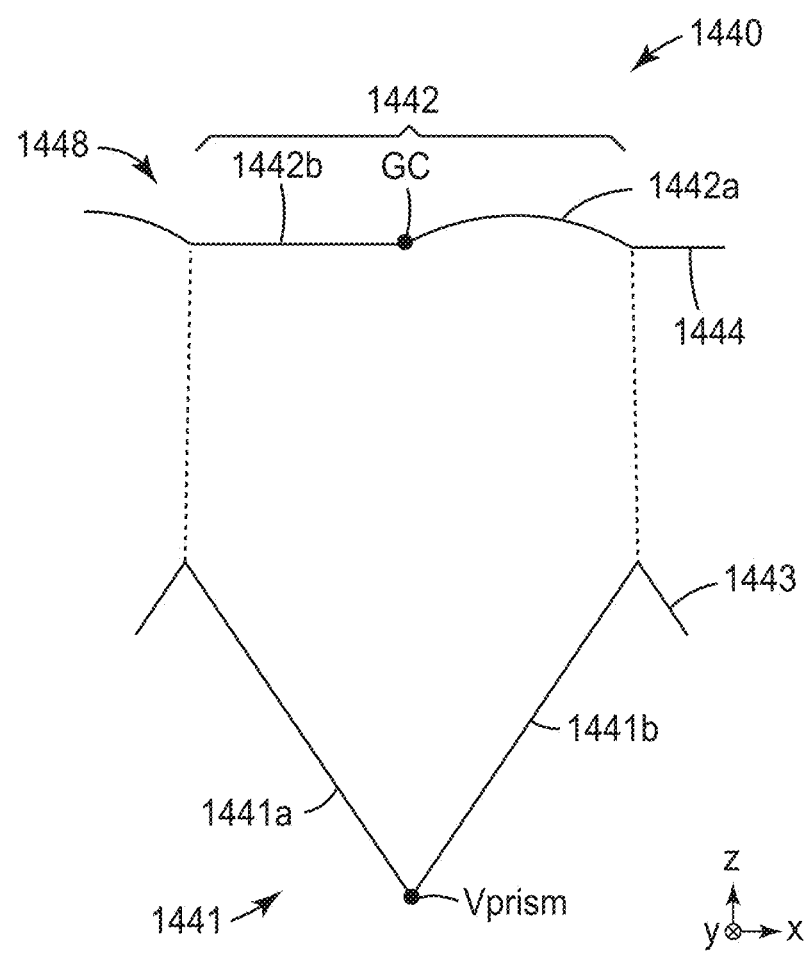
FIG. 14 is a schematic side view of a portion of a dual-sided optical film having the same or similar design as that of FIG. 13, this view showing one prism/split spreading structure pair.

In FIG. 14 we show a schematic view of a portion of a dual-sided optical film 1440 which may be the same as, or similar to, the film 1340 of FIG. 13. The view of FIG. 14 is enlarged compared to that of FIG. 13 to allow closer inspection of a single prism/split spreading structure pair, labeled 1448, which is assumed to be immersed in air. The Cartesian coordinate system of FIG. 14 is consistent with the coordinates in FIG. 13 and the previous figures. The film 1440 is shown to be unitary, but it may alternatively have the layered construction of FIG. 13, or a different layered construction. The film 1440 has a first structured surface 1443 with a plurality of prisms 1441 formed therein. The surface 1443 and prism 1441 may be the same as the respective structured surface 1343 and prism 1341 discussed above. In that regard, the prism 1441 has two inclined side surfaces or facets 1441*a*, 1441*b*, which may be the same as respective inclined surfaces 1341*a*, 1341*b* discussed above. The surfaces 1441*a*, 1441*b* intersect to form a prism vertex Vprism, which vertex may be a line or ridge extending parallel to the y-axis.

The film 1440 also has a second structured surface 1444 with a plurality of split spreading structures 1442 formed therein. The surface 1444 and split spreading structure 1442 may be the same as the respective structured surface 1344 and split spreading structure 1342 discussed above. The split spreading structure 1442 thus has a high spreading portion 1442*a*, which may be the same as portion 1342*a* discussed above, disposed alongside a low spreading portion 1442*b*, which may be the same as portion 1342*b* discussed above. The high spreading portion 1442*a* has a highly curved surface in the x-z plane relative to low spreading portion 1442*b*. The outer edges of the split spreading structure 1442 and the outer edges of the prism 1441 are shown connected by dashed vertical line segments, which may be considered to mark the boundaries of the prism/split spreading structure pair 1448. A geometrical center (from the standpoint of the x-z plane) of the split spreading structure 1442 is labeled GC. The geometrical center GC and the prism vertex Vprism may be used as reference points with which to characterize the degree of alignment (or misalignment) of the prism 1441 relative to the split spreading structure 1442.

Figure 14A:
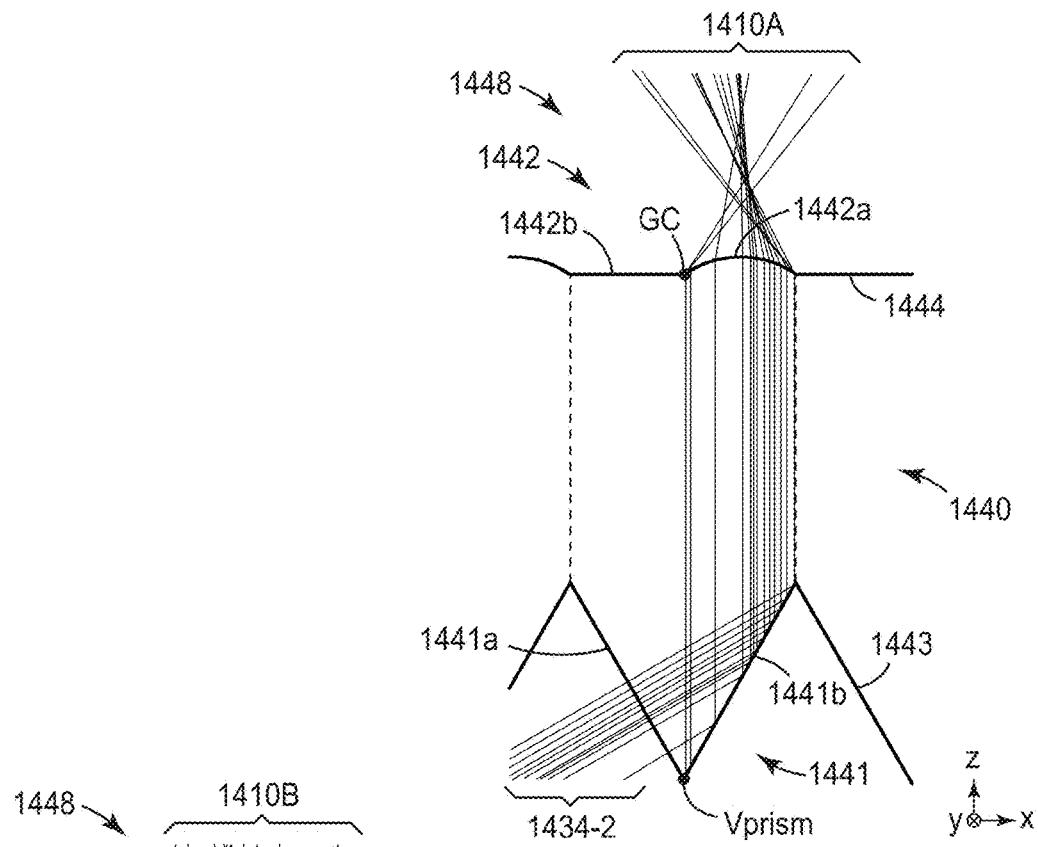
FIG. 14A is a schematic side view of the film portion of FIG. 14, with light rays added to show how oblique light entering a first inclined surface of the prism are primarily directed to a high spreading portion of the split spreading structure.
Figure 14B:
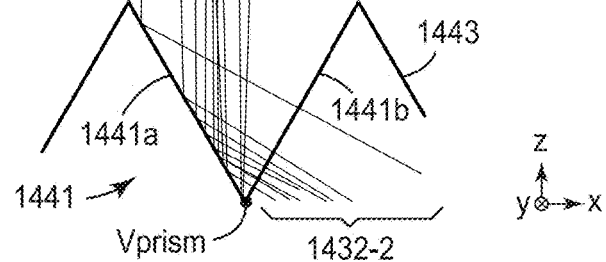
FIG. 14B is a schematic side view of the film portion of FIG. 14, with light rays added to show how oblique light entering a second inclined surface of the prism are primarily directed to a low spreading portion of the split spreading structure.

FIGS. 14A and 14B reproduce the prism/split spreading structure pair 1448 of FIG. 14, but superimpose on it light rays that are indicative of its operation in a mode that produces a wide angle output beam (see e.g. FIG. 3) and a mode that produces a narrow angle output beam (see e.g. FIG. 4A or 4B). Items having the same reference number as in FIG. 14 refer to the same respective elements, and need no further discussion.

In FIG. 14A, incident light rays 1434-2 impinge on the structured surface 1443 of the film 1440 along a direction aligned most closely with the positive x-direction. This is analogous to FIG. 3. The incident light rays 1434-2 are fairly representative of the oblique light beam 134-2 (see FIG. 3). The light rays 1434-2 were modeled as light rays propagating in the x-z plane and making an angle of 18 degrees relative to the x-axis. The light rays 1434-2 enter the first inclined side surface 1441*a* of the prism 1441. Optical modeling was used to determine how the light rays would thereafter propagate through the film. The modeling assumed: the refractive index of the film 1440 was 1.67 (for a central carrier film portion) and 1.51 (for the prism and split spreading structure portions); the prism apex angle was 60 degrees; the radius of curvature of the high spreading portion 1442*a* was 22.3 microns; and the distance between the geometrical center GC and the prism vertex Vprism was 113 microns. Using these assumptions, the optical modeling computed the trajectories of the light rays 1434-2 through the film 1440, and the results are shown as the light rays 1410A. Inspection of FIG. 14A reveals that the light rays 1410A provide a wide output beam similar to the wide output beam 310 (FIG. 3), or any of its individual beamlets. Inspection of FIG. 14A further reveals that the film 1440 directs the obliquely incident light rays 1434-2 primarily to the high spreading portion 1442*a* of the split spreading structure 1442. This is so even though some of the incident rays are directed to the low spreading portion 1442*b*, and even though some of the incident light rays are directed to portions of the structured surface 1444 that lie outside the bounds of the particular prism/split spreading structure pair 1448.

FIG. 14B is for the opposite case, i.e., for the mode that produces a narrow angle output beam. Thus, incident light rays 1432-2 impinge on the structured surface 1443 of the film 1440 along a direction aligned most closely with the negative x-direction. This is analogous to FIG. 4A or 4B. The incident light rays 1432-2 are fairly representative of the oblique light beam 132-2 (see FIGS. 4A, 4B). The light rays 1432-2 were modeled as light rays propagating in the x-z plane that make an angle of 18±5 degrees relative to the (negative) x-axis. The light rays 1432-2 enter the second inclined side surface 1441*b* of the prism 1441. Optical modeling was used to determine how the light rays would thereafter propagate through the film. The modeling assumed the same design features as in FIG. 14A. Using these assumptions, the optical modeling computed the trajectories of the light rays 1432-2 through the film 1440, and the results are shown as the light rays 1410B. Inspection of FIG. 14B reveals that the light rays 1410B provide a narrow output beam similar to the narrow output beam 410*a* (FIG. 4A) or 410*b* (FIG. 4B), or any of their individual beamlets. Inspection of FIG. 14B further reveals that the film 1440 directs the obliquely incident light rays 1432-2 primarily to the low spreading portion 1442*b* of the split spreading structure 1442. This is so even though some of the incident rays are directed to the high spreading portion 1442*a*, and even though some of the incident light rays are directed to portions of the structured surface 1444 that lie outside the bounds of the particular prism/split spreading structure pair 1448.

Having now described several dual-sided optical films that incorporate split spreading structures and prisms, we now discuss in more detail various ways in which these elements can be combined in a film to produce a desired output beam in a lighting system. Particular attention is given to the mode of operation in which a narrow angle output beam is produced, but the wide angle output beam is also affected. Design details of each prism/split spreading structure pair in the film, including the vertical separation of the prism and split spreading structure, the relative transverse position of these elements (whether they are in transverse alignment or not), the amount of tilt (if any) of the prism, and the amount of tilt (if any) of the split spreading structure, determine the shape and other properties of the output beam or beamlet produced by the given prism/split spreading structure pair, for a given input light beam. In some cases, a design parameter such as relative transverse position and/or amount of tilt changes over the face of the film, having one value in the center of the film and monotonically increasing or decreasing towards the outer edges or extremities of the film. Such spatial variation can be used to produce output beams such as output beam 410*b* of FIG. 4B. In other cases, the relevant design parameters may all be substantially the same over the face of the film, such that the beams or beamlets produced by all of the prism/split spreading structure pairs are substantially the same. Such spatial uniformity can be used to produce output beams such as output beam 410*a* in FIG. 4A.

Figure 15:
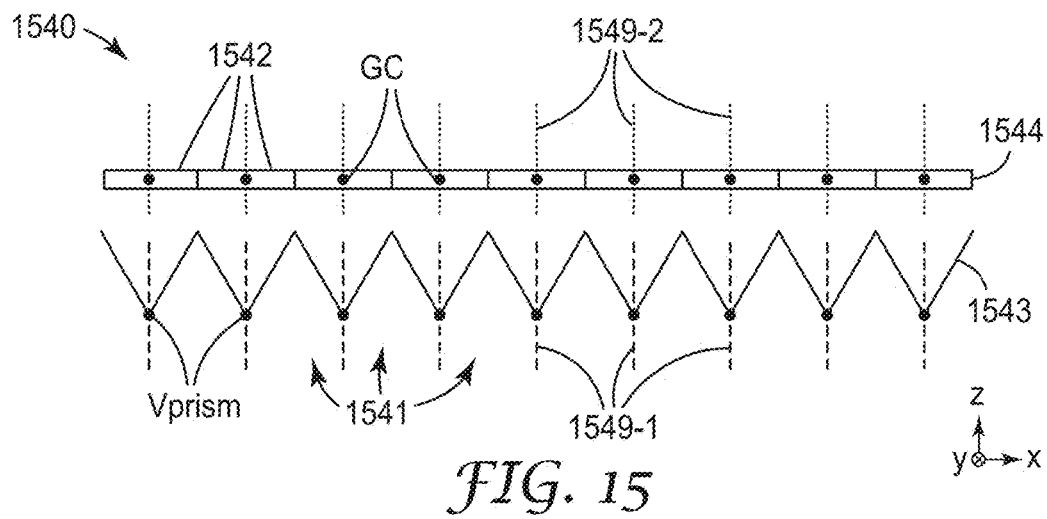
FIG. 15 is a schematic side view of an exemplary dual-sided optical film or portion thereof in which the split spreading structures are aligned with their respective prisms, and a pitch of the split spreading structures is the same as the pitch of the prisms.

A dual-sided optical film 1540 is shown schematically in FIG. 15. The film 1540 has a first structured surface 1543 and a second structured surface 1544, the first structured surface 1543 having formed therein a plurality of prisms 1541, and the second structured surface 1544 having formed therein a plurality of split spreading structures 1542. For generality, the split spreading structures 1542 are shown very schematically as thin boxes or rectangles, which together form a structured surface. The reader will understand that these thin boxes may represent any of the split spreading structured disclosed herein. The film 1540 is shown in relation to a Cartesian x-y-z coordinate system consistent with the previous figures.

Each prism 1541 includes two inclined side surfaces or facets that intersect at a vertex Vprism. Each prism 1541 also has a prism optical axis 1549-1. The prism optical axis 1549-1 lies in the x-z plane, passes through the prism vertex, and bisects the prism vertex angle such that it is equidistant from both inclined side surfaces. The prisms 1541 are characterized by a prism pitch p1 from center-to-center (e.g. prism vertex to prism vertex) along the x-axis, the pitch p1 not labeled in FIG. 15 for reduced clutter.

Each split spreading structure 1542 has a high spreading portion and a low spreading portion, not shown in FIG. 15. Each split spreading structure 1542 is characterized by a geometrical center GC as discussed above, and a spreading structure optical axis 1549-2. The spreading structure optical axis 1549-2 passes through the geometrical center GC, and: if the split spreading structure is substantially symmetrical (see e.g. split spreading structures 642 and 1042 in FIGS. 6 and 10, respectively), then the spreading structure optical axis 1549-2 is the axis of symmetry of the split spreading structure 1542; otherwise, if no substantial symmetry is present in the split spreading structure, but if one or both of the high spreading portion or the low spreading portion is flat (see e.g. split spreading structures 842, 1242, 1442 in FIGS. 8, 12, and 14 respectively) then the spreading structure optical axis 1549-2 is perpendicular to such flat surface(s); otherwise, if no substantial symmetry is present in the split spreading structure and neither the high spreading portion nor the low spreading portion is flat, then the spreading structure optical axis 1549-2 is perpendicular to a plane that is a best fit to the topography of the split spreading structure 1542. The split spreading structures 1542 are characterized by a spreading structure pitch p2 from center-to-center (e.g. GC to GC) along the x-axis, the pitch p2 not labeled in FIG. 15 for reduced clutter.

In the film 1540, the structured surfaces 1543, 1544 are configured such that p1=p2, and each of the prism vertices Vprism is vertically aligned with the GC of its respective split spreading structure, and the prism optical axes 1549-1 are parallel to each other and to the z-axis, and the spreading structure optical axes 1549-2 are also parallel to each other and to the z-axis. All of the prism optical axes 1549-1 and all of the spreading structure optical axes 1549-2 in the film 1540 thus have zero tilt. In alternative embodiments, p1 may again equal p2, but the prism vertices Vprism may be misaligned from their respective split spreading structure GC points by a desired amount in order to steer the output beam in a particular direction.

Figure 16:
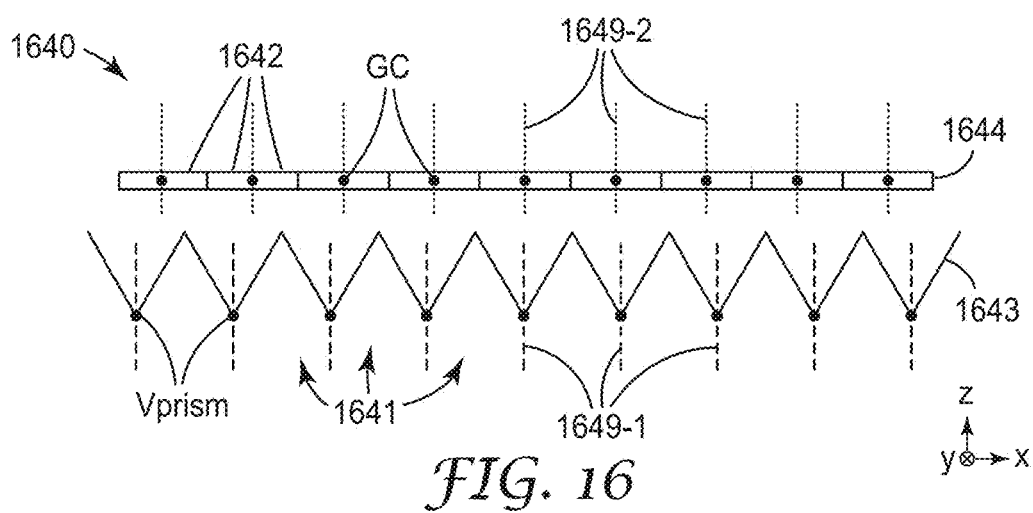
FIG. 16 is a schematic side view of an exemplary dual-sided optical film or portion thereof in which the pitch of the split spreading structures is different from the prism pitch.

Another dual-sided optical film 1640 is shown in FIG. 16, in the same schematic fashion as the film of FIG. 15. The film 1640 has a first structured surface 1644 and a second structured surface 1644, the first structured surface 1643 having formed therein a plurality of prisms 1641, and the second structured surface 1644 having formed therein a plurality of split spreading structures 1642. The film 1640 is shown in relation to a Cartesian x-y-z coordinate system consistent with the previous figures.

Each prism 1641 includes two inclined side surfaces or facets that intersect at a vertex Vprism, and a prism optical axis 1649-1 as discussed above. The prisms 1641 are characterized by a prism pitch p1, which is not labeled in FIG. 16 for reduced clutter.

Each split spreading structure 1642 has a high spreading portion and a low spreading portion, not shown in FIG. 16. Each split spreading structure 1642 is characterized by a geometrical center GC and a spreading structure optical axis 1649-2 as discussed above. The split spreading structures 1642 are characterized by a spreading structure pitch p2, which is not labeled in FIG. 16 for reduced clutter.

In the film 1640, the structured surfaces 1643, 1644 are configured such that p1>p2, and the prism optical axes 1649-1 are parallel to each other and to the z-axis, and the spreading structure optical axes 1649-2 are also parallel to each other and to the z-axis. All of the prism optical axes 1649-1 and all of the spreading structure optical axes 1649-2 in the film 1640 thus have zero tilt. For the prism/split spreading structure pair located in the center of the film (fifth vertex from the left extremity of the film and fifth vertex from the right extremity of the film), the prism vertex Vprism is vertically aligned with the GC of its respective split spreading structure. However, for the remaining prism/split spreading structure pairs on the film, no such vertical alignment occurs, and the amount of misalignment increases monotonically with increasing distance from the center of the film 1640. Films made using the technique shown in FIG. 16, or more generally where p1≠p2, can produce an effect where the central distribution of the output light can be pointed or aimed inward to produce a converging effect e.g. as shown in FIG. 4B. Greater degrees of misalignment produce greater levels of crosstalk, and the maximum acceptable degree of misalignment may be limited by the maximum acceptable crosstalk level for a particular application. Crosstalk is brought on when nominally aligned feature pairs (prism/split spreading structure pairs) begin to overlap with their nearest neighbors. In some cases, this approach of aiming light may be limited to an angle between the normal direction of the film (z-axis) and the central output angle of the various prism/split spreading structure pairs of about 10 degrees or less. Limits on this angle of deviation may depend on geometrical aspects of the film, such as thickness (see Dz in FIG. 18), pitch, substrate, included angle of the prism, etc., and is affected by the output distribution of the light guide.

Figure 17:
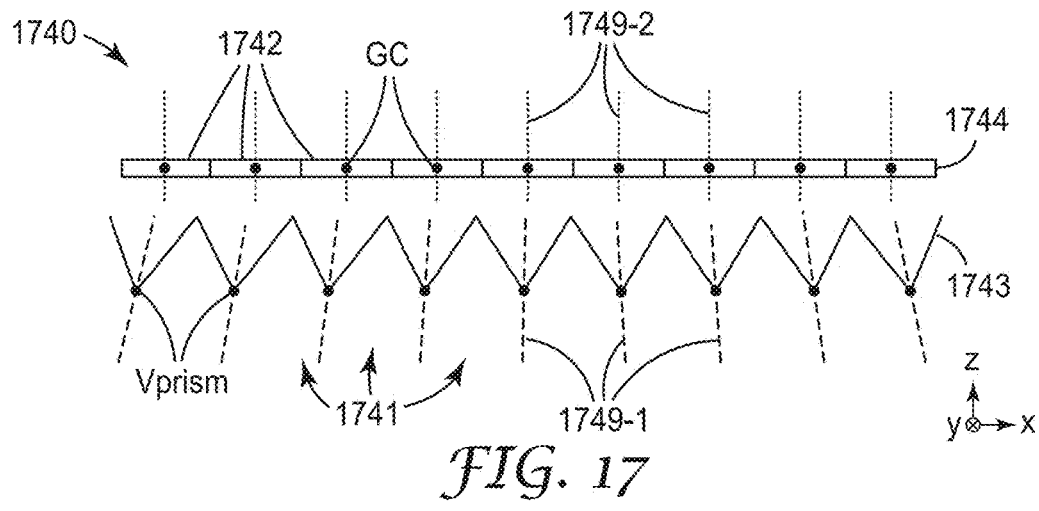
FIG. 17 is a schematic side view of an exemplary dual-sided optical film or portion thereof in which the split spreading structure pitch is different from the prism pitch and the prisms have optical axes that are tilted as a function of position on the film.

Still another dual-sided optical film 1740 is shown in FIG. 17, in the same schematic fashion as the films of FIGS. 15 and 16. The film 1740 has a first structured surface 1744 and a second structured surface 1744, the first structured surface 1743 having formed therein a plurality of prisms 1741, and the second structured surface 1744 having formed therein a plurality of split spreading structures 1742. The film 1740 is shown in relation to a Cartesian x-y-z coordinate system consistent with the previous figures.

Each prism 1741 includes two inclined side surfaces or facets that intersect at a vertex Vprism, and a prism optical axis 1749-1 as discussed above. The prisms 1741 are characterized by a prism pitch p1, which is not labeled in FIG. 17 for reduced clutter.

Each split spreading structure 1742 has a high spreading portion and a low spreading portion, not shown in FIG. 17. Each split spreading structure 1742 is characterized by a geometrical center GC and a spreading structure optical axis 1749-2 as discussed above. The split spreading structures 1742 are characterized by a spreading structure pitch p2, which is not labeled in FIG. 17 for reduced clutter.

In the film 1740, the structured surfaces 1743, 1744 are configured such that p1>p2, and the spreading structure optical axes 1749-2 are parallel to each other and to the z-axis. All of the spreading structure optical axes 1749-2 in the film 1740 thus have zero tilt (but in alternative embodiments they may have nonzero tilts, see e.g. FIG. 19). However, the prism optical axes 1749-1 are tilted as a function of position on the film, with the center prism (fifth vertex from the left or right extremity of the film) having zero tilt (parallel to the z-axis), prisms to the left of the center prism having positive tilts which monotonically increase with increasing distance from the center prism, and prisms to the right of the center prism having negative tilts which also monotonically increase (in magnitude) with increasing distance from the center prism. In this regard, positive tilts refer to clockwise tilts, and negative tilts refer to counterclockwise tilts. The prism vertex Vprism for the center prism is vertically aligned with the CG of its respective split spreading structure, but for the remaining prism/split spreading structure pairs on the film, no such vertical alignment occurs, and the amount of misalignment increases monotonically with increasing distance from the center of the film 1740. Film made using the technique shown in FIG. 17, or more generally where the prisms and/or split spreading structures are tilted) can produce an effect where the central distribution of the output light can be pointed or aimed inward to produce a converging effect e.g. as shown in FIG. 4B. Greater degrees of misalignment produce greater levels of crosstalk, and the maximum acceptable degree of misalignment may be limited by the maximum acceptable crosstalk level for a particular application, as discussed above. In some cases, this approach of aiming light may be limited to an angle between the normal direction of the film (z-axis) and the central output angle of the various prism/split spreading structure pairs of about 35 degrees or less. Limits on this angle of deviation may depend on geometrical aspects of the film, such as thickness (see Dz in FIG. 18), pitch, substrate, included angle of the prism, etc., and is affected by the output distribution of the light guide. Reference is also made to patent application publication US 2012/0236403 (Sykora et al.) for further details of this alignment technique.

In still other alternative designs, the split spreading structures in any of FIGS. 15, 16, and 17 may be tilted in any desired fashion, for example, in a manner that changes as a function of position on the film, e.g., having zero tilt in the center of the film, increasingly positive tilts from the center to the left edge of the film, and increasingly negative tilts from the center to the right edge of the film.

Figure 18:
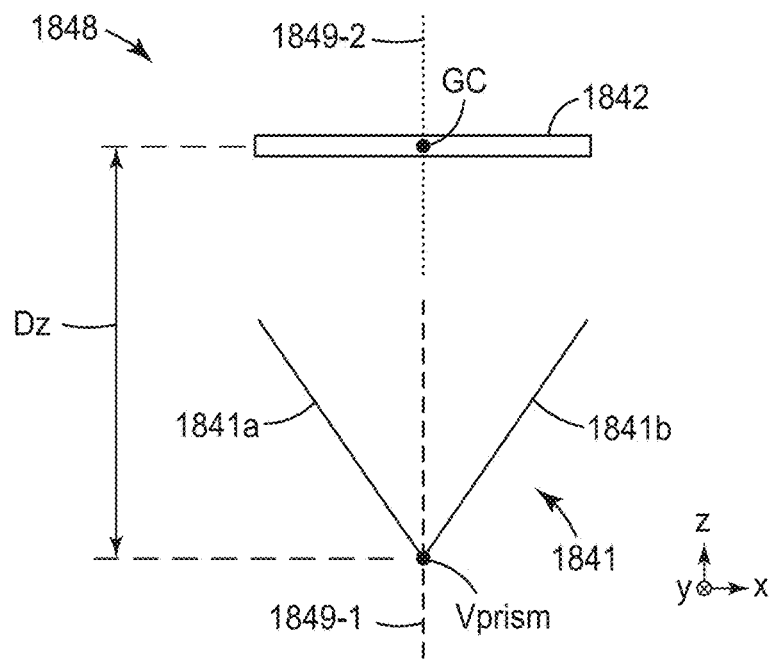
FIG. 18 is a schematic side view of a prism/split spreading structure pair, in which the elements are translationally and rotationally aligned with each other.
Figure 19:
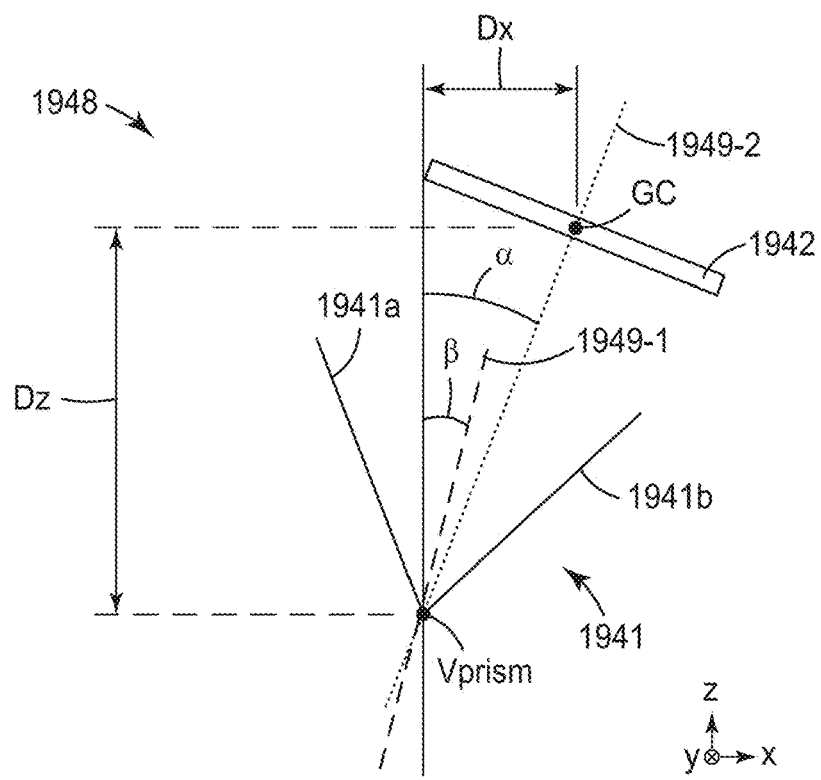
FIG. 19 is a schematic side view of a prism/split spreading structure pair in which the elements are translationally and rotationally misaligned with each other, and are tilted by different amounts.

FIGS. 18 and 19 show enlarged depictions of different prism/split spreading structure pairs that may be present in a dual-sided optical film. In FIG. 18, the elements of the pair are translationally and rotationally aligned with each other. In FIG. 19, the elements are translationally and rotationally misaligned with each other, and tilted by different amounts. In both of these figures, for generality, the split spreading structures are represented schematically by a thin box or rectangle, just as in FIGS. 15 through 17.

In FIG. 18, a prism/split spreading structure pair 1848 has one prism 1841 and one split spreading structure 1842. The prism 1841 has inclined side surfaces or facets 1841a, 1841b which meet at a vertex Vprism. The prism 1841 also has a prism optical axis 1849-1, as discussed above. The split spreading structure 1842 has a geometrical center GC and a spreading structure optical axis 1849-2, as discussed above. By appropriate selection of film thicknesses and/or coating thicknesses, the vertical distance Dz between the prism vertex and the GC of the structure 1842 can be controlled to provide desired optical performance of the output beams. Determining an optimal value for Dz also typically takes into consideration the refractive index of the optical film. The optical axes 1849-1, 1849-2 are parallel to each other and to the z-axis, and in alignment with each other.

In FIG. 19, a prism/split spreading structure pair 1948 has one prism 1941 and one split spreading structure 1942. The prism 1941 has inclined side surfaces or facets 1941a, 1941b which meet at a vertex Vprism. The prism 1941 also has a prism optical axis 1949-1, as discussed above. The split spreading structure 1942 has a geometrical center GC and a spreading structure optical axis 1949-2, as discussed above. By appropriate selection of film thicknesses and/or coating thicknesses, the vertical distance Dz between the prism vertex and the GC of the structure 1942 can be controlled to provide desired optical performance of the output beams, also taking into consideration the refractive index of the optical film. The split spreading structure 1942 is translationally misaligned with the prism 1941 by a displacement amount Dx along the x-axis. The split spreading structure 1942 is also rotationally misaligned with the prism 1941: the spreading structure optical axis 1949-2 is tilted in the x-z plane with respect to the prism optical axis 1949-1, and furthermore, both the spreading structure optical axis 1949-2 and the prism optical axis 1949-1 are tilted with respect to the z-axis. The angles α and β can be used to refer to the tilt angles of the spreading structure optical axis and the prism optical axis, as shown in the figure. The dual-sided optical films disclosed herein can make appropriate use of the design parameters Dz, Dx, α, and β, which may be uniform over the area of the film (for all prism/split spreading structure pairs) or which may be non-uniform over such area, to provide a wide angle output beam when one light source is ON, and to provide a narrow angle output beam when a different light source is ON.

Figure 20A:
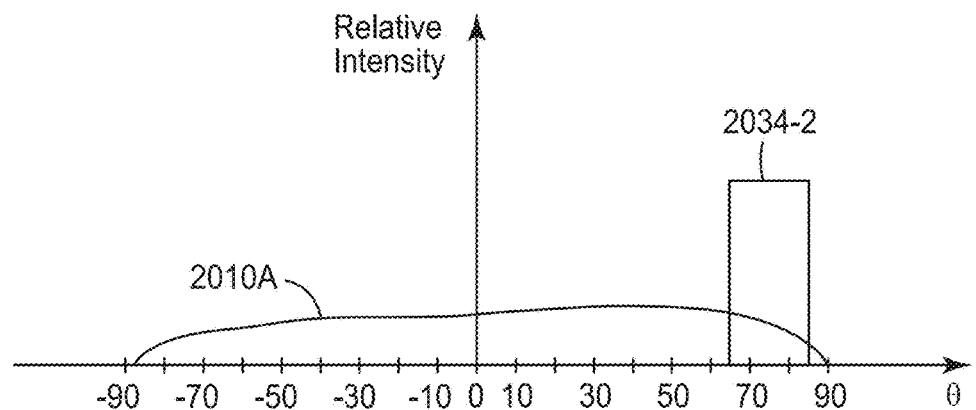
FIG. 20A is a simplified representation of possible angular distributions of an input beam of oblique light incident on a given dual-sided optical film and a wide angle output light beam produced by the film.
Figure 20B:
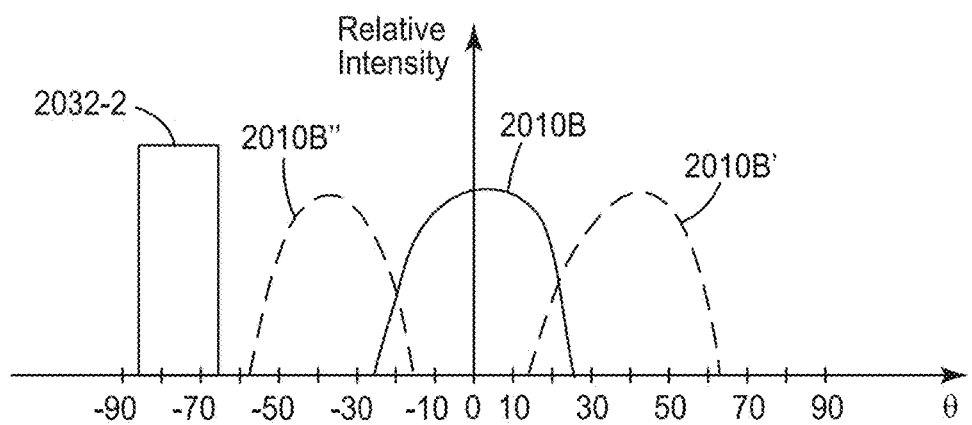
FIG. 20B is a simplified representation of possible angular distributions of a different input beam of oblique light incident on a the dual-sided optical film of FIG. 20A and a narrow angle output light beam produced by the film.

FIGS. 20A and 20B are graphs that show idealized angular distributions associated with the disclosed dual-sided optical films. The curves in these figures are not real data, but rather illustrate in an idealized fashion the possible operation of an optical system containing a suitably tailored dual-sided optical film. These figures graph relative light intensity in the x-z plane as a function of polar angle θ, where θ is the angle between the propagation direction of light in air and the z-axis. In FIG. 20A, one light source of the optical system, such as light source 134 in FIG. 3, is ON, and the other light source is OFF. Light from the light source is provided to the optical film as an input beam 2034-2 of highly oblique light. See e.g. oblique light beam 134-2 of FIG. 3. This input beam enters the dual-sided optical film through first inclined surfaces of the prisms, which first inclined surfaces are associated primarily with the high spreading portions of the split spreading structures. Consequently, the beam emerges from the film as a wide angle output beam 2010A. The curve 2010A represents the light output over the entire area of the dual-sided optical film, but may also represent each of the individual beams or beamlets that emerge from each prism/split spreading structure pair of the film.

In FIG. 20B, the opposite light source, such as light source 132 in FIG. 4A or 4B, is ON. Light from this light source is provided to the optical film as an input beam 2032-2 of highly oblique light. See e.g. oblique light beam 132-2 of FIG. 4A or 4B. This input beam enters the dual-sided optical film through second inclined surfaces of the prisms, which second inclined surfaces are associated primarily with the low spreading portions of the split spreading structures. Consequently, the beam emerges from the film as a narrow angle output beam 2010B. The curve 2010B represents the light output over the entire area of the dual-sided optical film, but may also represent each of the individual beams or beamlets that emerge from each prism/split spreading structure pair of the film. By tilting the optical axes of the prisms and/or the split spreading structures, and/or by misaligning the prisms with their associated split spreading structures, the narrow output beam can be tailored to emerge from the film along a primary direction that is not orthogonal to the film, see e.g. alternative narrow angle output beams 2010B' and 2010B".

Figure 21:
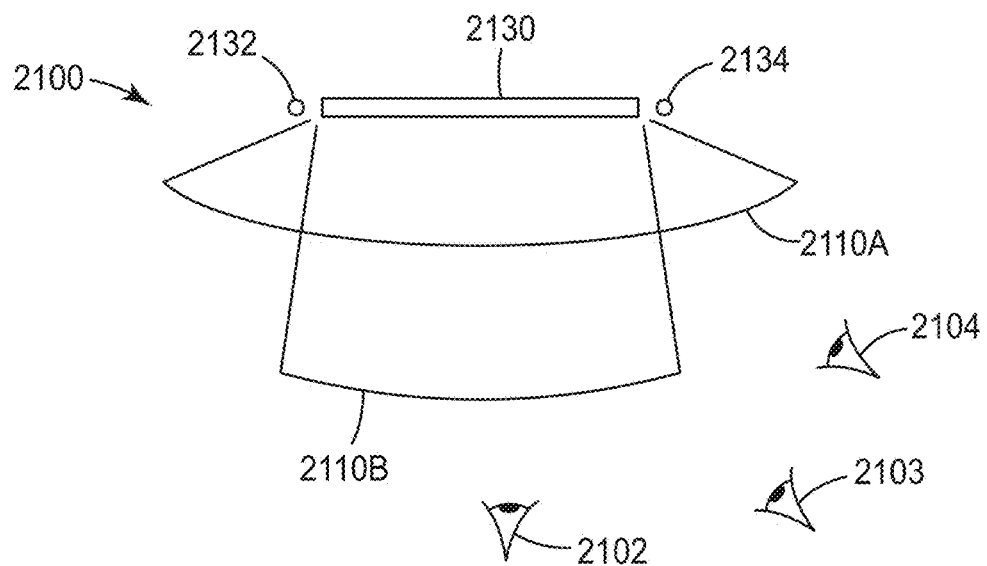
FIG. 21 is a schematic top or side view of a display system utilizing an exemplary dual-sided optical film.

FIG. 21 is a schematic view of a display system 2100 that utilizes an exemplary dual-sided optical film. The system includes one or more first light sources 2134, one or more second light sources 2132, a backlight package 2130, and a display panel (not shown). The light sources 2134, 2132 may be the same as or similar to light sources 134, 132 discussed above. The backlight package 2130 contains at least a light guide and a dual-sided optical film, in an arrangement such as that of FIGS. 1A and 1B. The dual-sided optical film may have any of the design characteristics discussed herein, suitably tailored for this application. In accordance with the foregoing discussion of those design characteristics, the dual-sided optical film is designed to provide, in a first mode of operation, a wide angle output beam 2110A when the first light source 2134 is ON and the second light source 2132 is OFF, and to provide in a second mode of operation a narrow angle output beam 2110B when the second light source 2132 is ON and the first light source 2134 is OFF. The system 2100 desirably includes a switch that the user can activate to change from the first mode of operation to the second, or vice versa. In the first mode of operation, the wide angle output beam 2110A is provided, which allows not only a centrally located observer 2102 to view the display but also peripherally located observers 2103, 2104. This may be considered to be a public viewing mode of operation of the system 2130. In the second mode of operation, the narrow angle output beam 2110B is provided, which allows only the centrally located observer 2102, not the peripherally located observers 2103, 2104, to view the display. This may be considered to be a private viewing mode of operation of the system 2130. The system 2100 can thus have an electronically switchable privacy capability.

Figure 22:
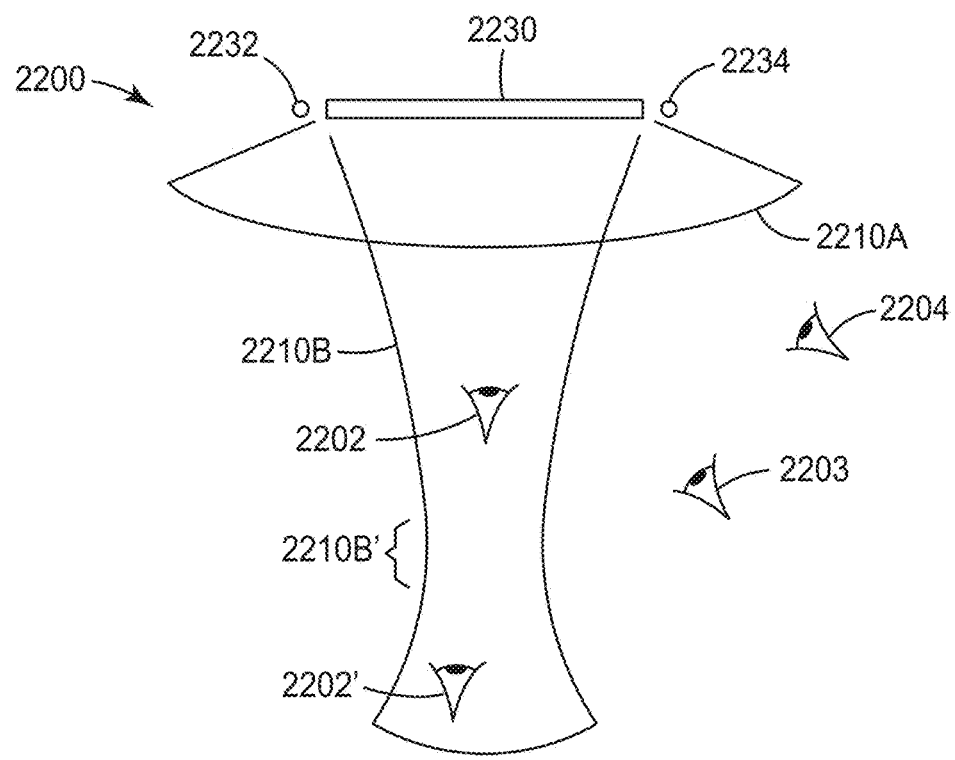
FIG. 22 is a schematic top or side view of another display system utilizing another exemplary dual-sided optical film.

The display system 2200 of FIG. 22 is similar to that of FIG. 21, but the dual-sided optical film is tailored so that the narrow angle output beam converges as it emerges from the optical film. The system 2200 thus utilizes an exemplary dual-sided optical film, and includes one or more first light sources 2234, one or more second light sources 2232, a backlight package 2230, and a display panel (not shown). The light sources 2234, 2232 may be the same as or similar to light sources 2134, 2132 of FIG. 21. The backlight package 2230 may be similar to the backlight package 2130 of FIG. 21, except that the dual-sided optical film is configured so that individual prism/split spreading structure pairs produce beams or beamlets oriented in different directions across the output area of the optical film, see e.g. FIG. 4B. In a first mode of operation, the dual-sided optical film provides a wide angle output beam 2210A when the first light source 2234 is ON and the second light source 2232 is OFF. In a second mode of operation, the dual-sided optical film provides a narrow angle output beam 2210B when the second light source 2232 is ON and the first light source 2234 is OFF. As shown, the narrow angle output beam initially converges as it exits the optical film, achieving a minimum beam width at a beam waist 2210B', beyond which the beam 2210B diverges. Similar to system 2100, the system 2200 desirably includes a switch that the user can activate to change from the first mode of operation to the second, or vice versa. The wide angle output beam 2210A of the first mode of operation allows not only a centrally located observer 2202 to view the display, but also peripherally located observers 2203, 2204. The narrow angle output beam 2210B of the second mode of operation allows only the centrally located observer 2202, not the peripherally located observers 2203, 2204, to view the display. The system 2200 can thus also have an electronically switchable privacy capability. Note that the centrally located observer 2202 may continue to view the display at other viewing locations (see e.g. observer 2202'), so long as such observer does not deviate too much from a central viewing axis of the system 2200, which can be defined by the output beam 2210B.

Figure 23:
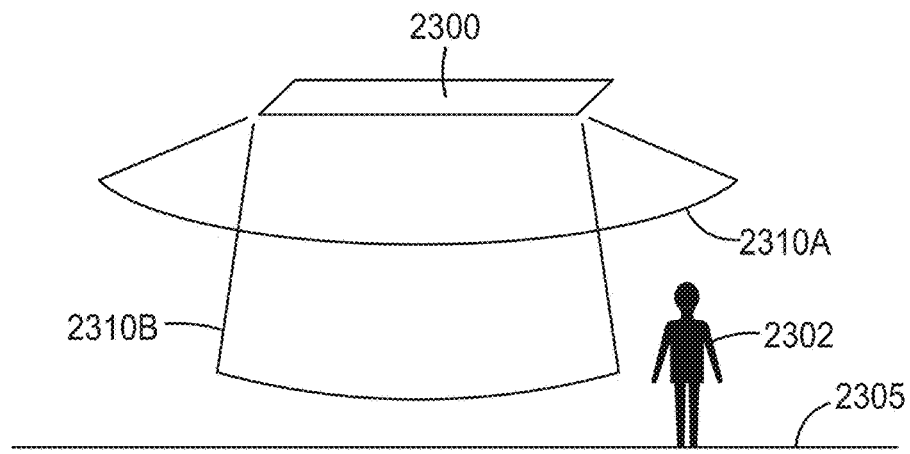
FIG. 23 is a schematic side view of a luminaire utilizing an exemplary dual-sided optical film.
Figure 24:
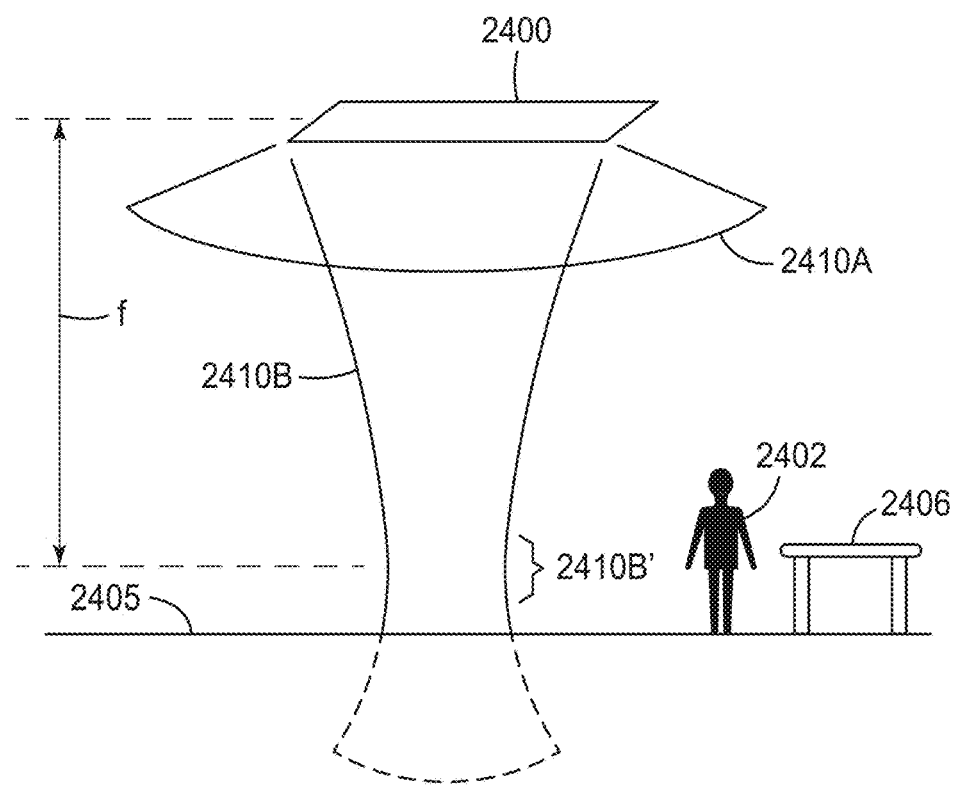
FIG. 24 is a schematic side view of another luminaire utilizing another exemplary dual-sided optical film.
Figure 25A:
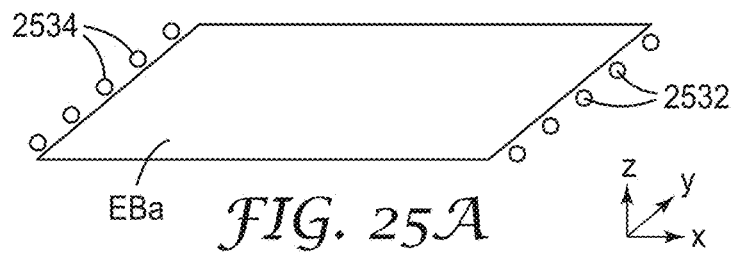
FIGS. 25A through 25E are schematic perspective views of optical systems which demonstrate some planar and non-planar shapes that the dual-sided optical film and/or the light guide may have.
Figure 25B:
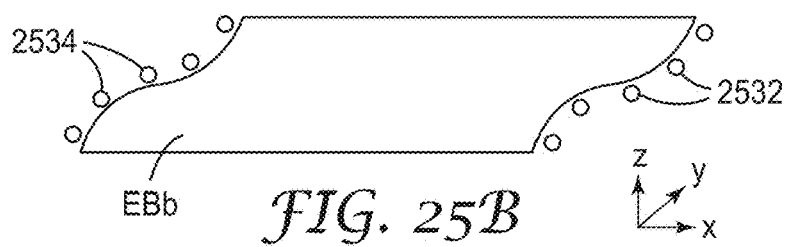
Figure 25C:
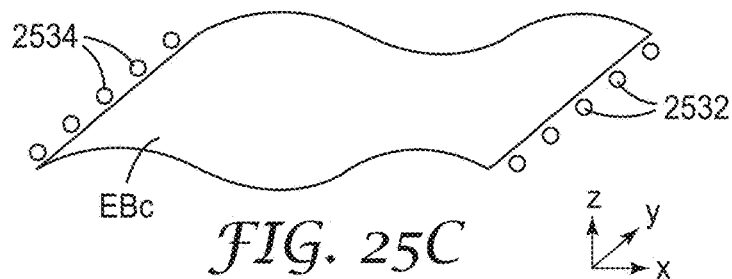
Figure 25D:
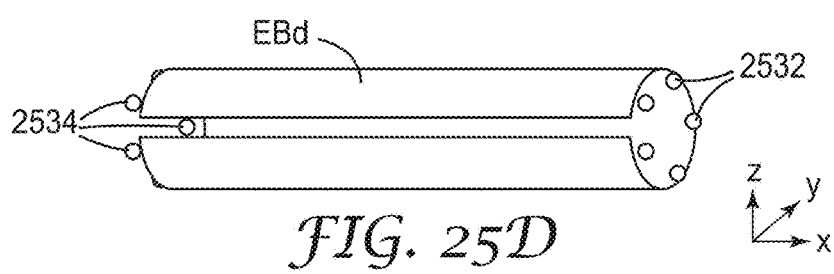
Figure 25E:
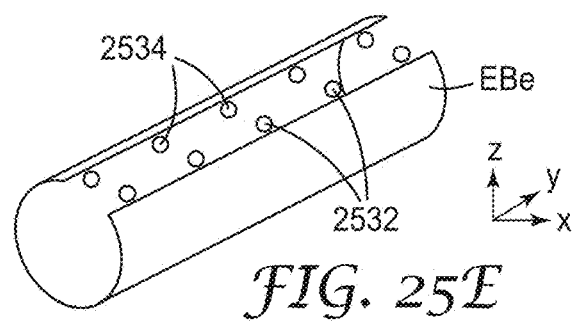

The features and principles of FIGS. 21 and 22 can also be applied to lighting systems other than display systems. In FIGS. 23 and 24, these principles are applied to lighting systems whose function is to illuminate a room, office, or other living space. The luminaire system 2300 of FIG. 23 may be similar to the display system 2100 of FIG. 21, except that the display panel is removed. Thus, the system 2300 includes one or more first light sources, one or more second light sources, a light guide, and a dual-sided optical film. The light sources may be the same as or similar to other light sources discussed above. The dual-sided optical film may have any of the design characteristics discussed herein, suitably tailored for this application. The dual-sided optical film is designed to provide, in a first mode of operation, a wide angle output beam 2310A when the first light source is ON and the second light source is OFF, and to provide in a second mode of operation a narrow angle output beam 2310B when the second light source is ON and the first light source is OFF. The system 2300 desirably includes a switch that the user can activate to change from the first mode of operation to the second, or vice versa. In the first mode of operation, the wide angle output beam 2310A is provided, which broadly illuminates wide areas of the room or living space. The system 2300 is shown to be ceiling-mounted in a room having a floor 2305 and an occupant 2302. In the second mode of operation, the narrow angle output beam 2310B is provided, which illuminates a substantially smaller portion of the room. In comparison to the broader illumination of the first mode, the narrower illumination can be considered to provide a spotlight output. The system 2300 can thus have an electronically switchable spotlight capability.

The luminaire system 2400 of FIG. 24 is similar to that of FIG. 23, but the dual-sided optical film is tailored so that the narrow angle output beam converges as it emerges from the optical film. This can provide even more of a spotlight effect for the second mode of operation. The system 2400 thus utilizes one or more first light sources, one or more second light sources, a light guide, and a dual-sided optical film. These items may be the same as or similar to corresponding items in the system 2300, except that the dual-sided optical film is configured so that individual prism/split spreading structure pairs produce beams or beamlets oriented in different directions across the output area of the optical film, see e.g. FIG. 4B. In a first mode of operation, the dual-sided optical film provides a wide angle output beam 2410A when the first light source is ON and the second light source is OFF. In a second mode of operation, the dual-sided optical film provides a narrow angle output beam 2410B when the second light source is ON and the first light source is OFF. As shown, the narrow angle output beam initially converges as it exits the optical film, achieving a minimum beam width at a beam waist 2410B', beyond which the beam 2410B diverges. Similar to system 2300, the system 2400 desirably includes a switch that the user can activate to change from the first mode of operation to the second, or vice versa. In the first mode of operation, the wide angle output beam 2310A broadly illuminates wide areas of the room or living space. The system 2400 is shown to be ceiling-mounted in a room having a floor 2405, a table or other elevated surface 2406, and an occupant 2402. In the second mode of operation, the narrow angle output beam 2410B illuminates a substantially smaller portion of the room. In comparison to the broader illumination of the first mode, the narrower illumination can be considered to provide a spotlight output. The beam waist 2410B' is located an axial distance f from the system 2400, and the dual-sided optical film can be tailored so that the beam waist 2410B' is positioned at a desired axial location, e.g. on the floor 2405, or at the level of the table 2406. The system 2400 can thus have an electronically switchable spotlight capability.

Numerous modifications can be made to, and numerous features incorporated into, the disclosed dual-sided optical films, light guides, and related components. For example, any given structured surface of the dual-sided optical film or of the light guide may be spatially uniform, i.e., the individual elements or structures of the structured surface may form a repeating pattern that occupies the entire major surface of the component. See e.g. FIGS. 1B and 2. Alternatively, any such structured surface may be patterned in such a way that portion(s) of the structured surface do not contain such individual elements or structures, or that the portion(s) contain such individual elements or structures, but such elements or structures have been rendered completely or partially inoperative. The absence of such individual elements or structures over portion(s) of the structured surface may be achieved by forming the elements or structures over the entire major surface, and then destroying or otherwise removing them by any suitable technique, e.g., applying sufficient heat and/or pressure to flatten the elements or structures, but selectively (pattern-wise) in the desired portion(s). Alternatively, the absence of the individual elements or structures may be achieved by not forming them in the desired portion(s) of the structured surface at the time when elements or structures are being formed in other regions of the structured surface, e.g. using a suitably patterned tool. In cases where individual elements or structures are rendered completely or partially inoperative in desired portion(s) of the structured surface, the structured surface may initially be spatially uniform, but individual elements or structures may then be coated or otherwise covered in a pattern-wise fashion with an adhesive, printing medium, or other suitable material whose refractive index matches (including substantially matches) the refractive index of the elements or structures, or that at least has a refractive index different from than air or vacuum. Such a pattern-wise applied material, which may be cured or cross-linked after application to the structured surface, may planarize the desired portion(s) of the structured surface. Whether the individual elements or structures are omitted or rendered inoperative, the optical system may be designed such that only one structured surface (e.g. a structured surface of the light guide, or a structured surface of the dual-sided film) is patterned, or only two structured surfaces are patterned, or only three structured surfaces are patterned, or four structured surfaces are patterned. If more than two structured surfaces are patterned, the same pattern may be used for any two patterned surfaces, or different patterns may be used.

In other alternatives, with a suitably designed light guide, two dual-sided optical films can be used on opposite sides of the light guide. The light guide may be configured to provide oblique light beams from each of its two opposed major surfaces, and one dual-sided film can be provided at each major surface of the light guide to convert the oblique light beam to a wide angle output beam or a narrow angle output beam as discussed above, depending on which light source(s) are ON. For example, in FIG. 1B, a dual-sided film which is a mirror image (relative to the x-y plane) of the film 140 may be placed on the opposite side of the light guide 150 such that the light guide is disposed between the two mirror-image dual-sided optical films.

In other alternatives, the optical system may also include secondary structures to limit or reduce the degree of light spreading of the output beam(s) produced by the dual-sided optical film. For example, a conventional louvered privacy film and/or a shroud (e.g. including one or more light blocking members) may be provided at the output of the dual-sided film. These secondary structures may operate by occluding a portion of a given initial output beam in the x-z plane and/or in the y-z plane (refer e.g. to the x-y-z coordinate orientation of FIGS. 3, 4A, 4B) to produce a modified output beam, the modified output beam being narrower than the initial output beam in the plane(s) of occlusion.

The light guide and the dual-sided optical film may both be substantially planar in overall shape, or one or both may be non-planar. Exemplary lighting system embodiments are schematically depicted in FIGS. 25A through 25E. In each of these figures, first light sources 2534 and second light sources 2532 are provided along opposed edges of an extended body. The light sources 2534, 2532 may be the same as or similar to light sources 134, 132 discussed above. The extended body, which is labeled EBa in FIG. 25A, EBb in FIG. 25B, EBc in FIG. 25C, EBd in FIG. 25D, and EBe in FIG. 25E, may represent the light guide, the dual-sided optical film, or both. The extended bodies of these figures are shown in relation to Cartesian x-y-z coordinate systems consistent with the previous figures. Deviations from planarity may be indicative of a flexible extended body, or a physically rigid extended body that was formed in a non-planar fashion. The extended body EBa is substantially planar, extending parallel to the x-y plane. The extended body EBb is non-planar, with curvature in the y-z plane but not in the x-z plane. The extended body EBc is also non-planar, but with curvature in the x-z plane and not in the y-z plane. Alternative embodiments may have curvature in both the x-z plane and the y-z plane. The extended body EBd is non-planar, with curvature in the y-z plane but not in the x-z plane, and the curvature in the y-z plane is such that the body closes in upon itself to form a tubular structure. The tubular structure may include a lengthwise slot or gap as shown. The tubular structure may have a substantially circular shape in transverse cross section (e.g., a cross section in the y-z plane), or alternatively an elliptical or other non-circular shape. The extended body EBd is non-planar, but with curvature in the x-z plane and not in the y-z plane, and the curvature in the x-z plane is such that the body closes in upon itself to form a tubular structure. The tubular structure may include a lengthwise slot or gap as shown. The tubular structure may have a substantially circular shape in transverse cross section (e.g., a cross section in the x-z plane), or alternatively an elliptical or other non-circular shape. Lighting systems having any of the shapes of FIGS. 25A through 25E may be constructed in any desired form factor, including a form factor similar to a conventional light bulb, and may be used in place of conventional light bulbs, with the added capability of switchable wide/narrow output beam distributions.

EXAMPLES

Figure 26:
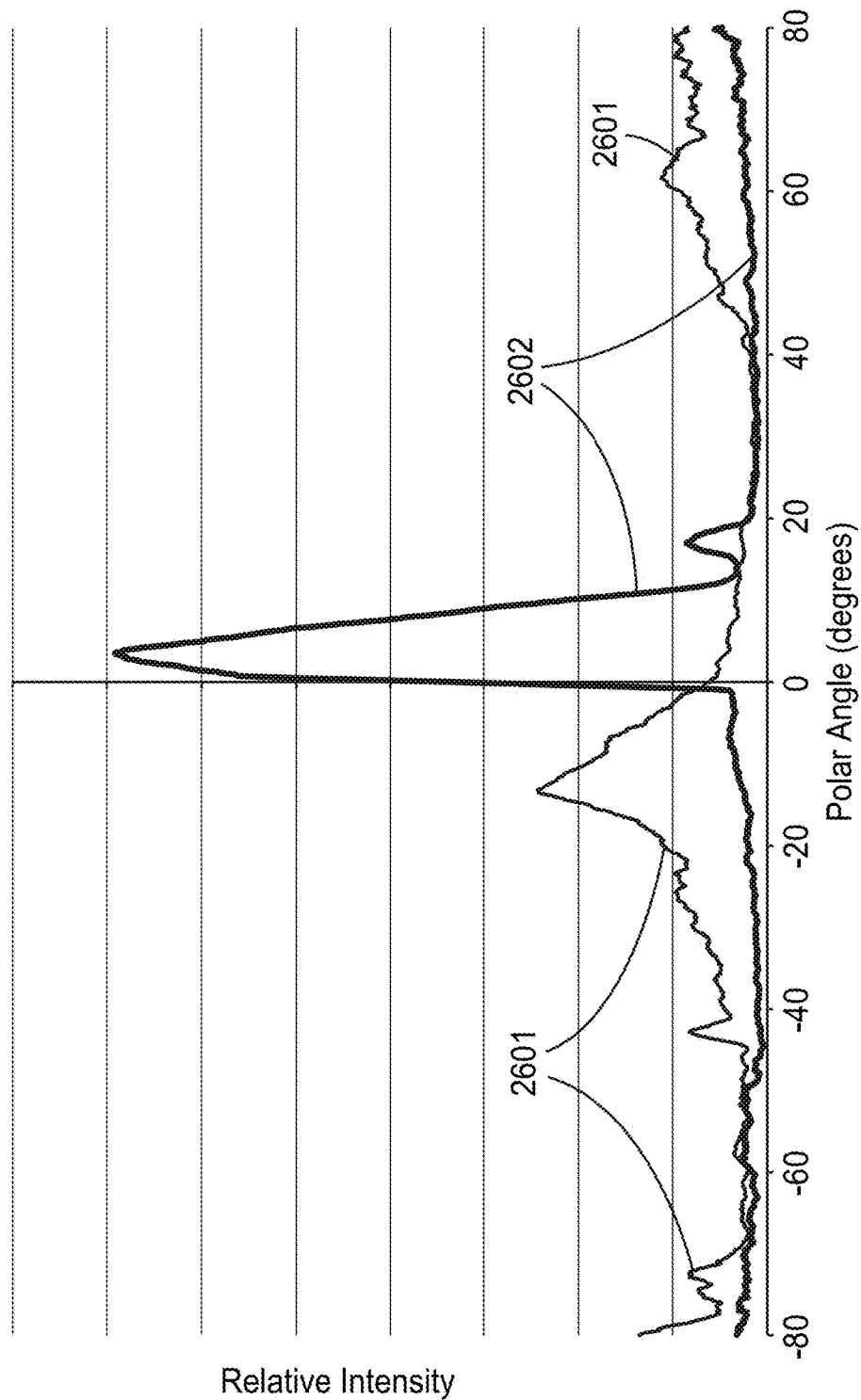
FIG. 26 is a graph of the modeled brightness as a function of polar angle for output beams produced by a dual-sided optical film similar to that of FIGS. 5 and 6, the graph showing a wide angle output beam and a narrow angle output beam.

A dual-sided optical film similar to that shown in FIGS. 5 and 6 was modeled with optical design software. The film was assumed to have the design characteristics described above in connection with FIGS. 6A and 6B, that is: the refractive index of the film was 1.67 for a central carrier film portion, and 1.51 for the prism and split spreading structure portions; the prism apex angle was about 60 degrees; the nominal radius of curvature of the curved segment (half of which was roughened) was about 41 microns; the distance between the geometrical center GC of the split spreading structure and the prism vertex Vprism was 111 microns; and the surface roughness (Ra) of the high spreading portion was 0.588 microns. A light guide adjacent this dual-sided film was modeled as a first input beam associated with energizing only a first light source and a second input beam associated with energizing only a second light source, these input beams impinging upon the prism side of the dual-sided film. One of these input beams was modeled as light rays propagating in the x-z plane (see FIGS. 5 and 6 for coordinate system orientation) and making an angle of 20±10 degrees relative to the (positive) x-axis, and the other input beam was modeled as light rays propagating in the x-z plane and making an angle of 20±10 degrees relative to the (negative) x-axis. With the first light source turned ON and the second light source turned OFF, the system produced an output beam whose distribution in the x-z plane, as a function of polar angle (i.e. the angle relative to the z-axis), is shown as curve 2601 in FIG. 26. With the first light source turned OFF and the second light source turned ON, the system produced an output beam whose distribution in the x-z plane is shown as curve 2602. The output beam of curve 2601 is wider than that of curve 2602. We expect that the shape of curve 2601 can be further modified to provide a distribution having a single wide bell-shaped profile by appropriate optimization of the design details of the dual-sided film.

Figure 27:
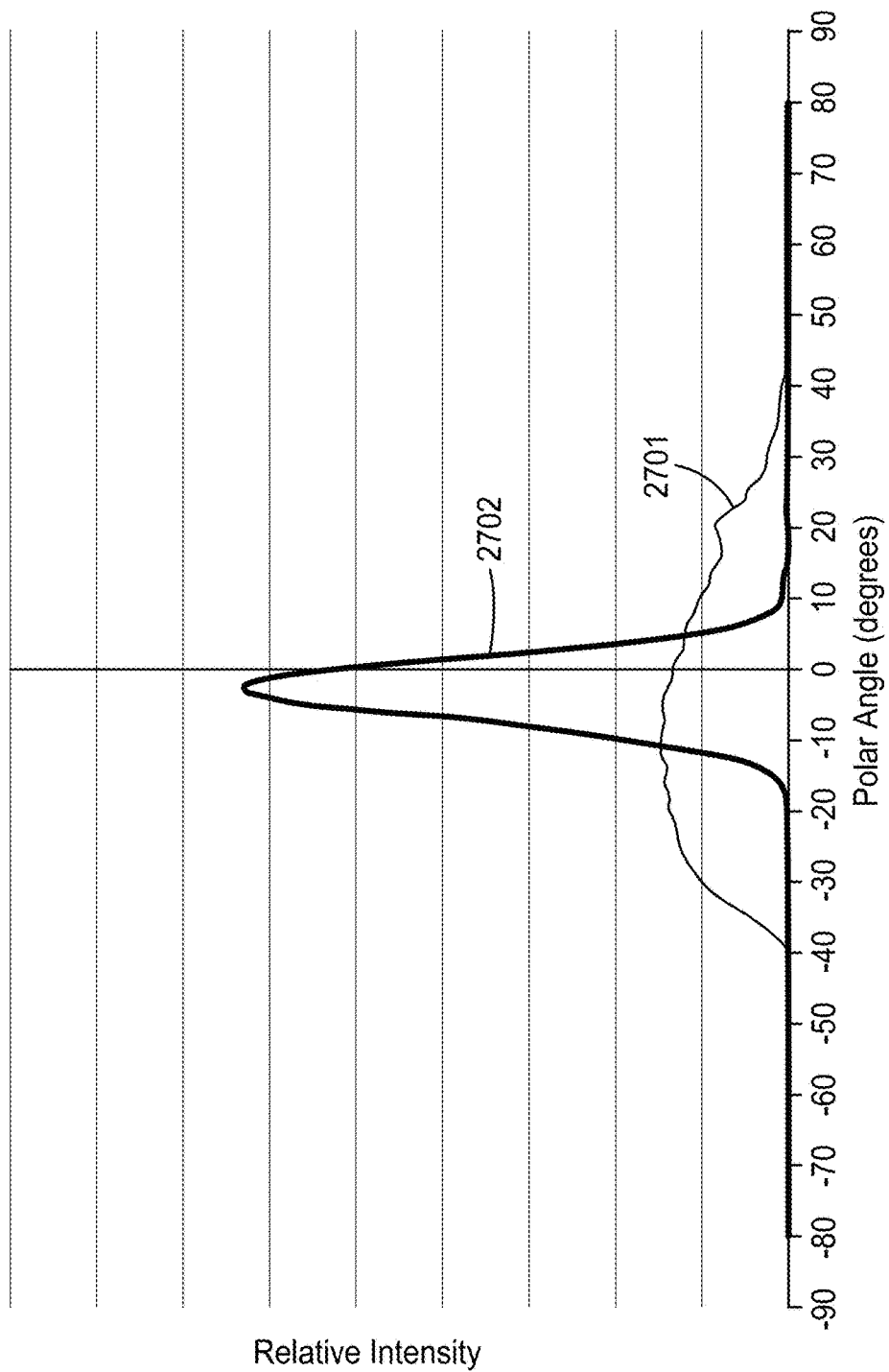
FIG. 27 is a graph of the modeled brightness as a function of polar angle for output beams produced by a dual-sided optical film similar to that of FIGS. 7 and 8, the graph showing a wide angle output beam and a narrow angle output beam.

Another dual-sided optical film was modeled with the optical design software. The film was similar in design to that shown in FIGS. 7 and 8. The film was assumed to have the design characteristics described above in connection with FIGS. 8A and 8B, that is: the refractive index of the film was 1.67 for a central carrier film portion, and 1.51 for the prism and split spreading structure portions; the prism apex angle was about 63.5 degrees; the radius of curvature of the prism surface was 160 microns; the radius of curvature of the high spreading portion was 30 microns; and the distance between the geometrical center GC and the prism vertex Vprism was 113 microns. A first oblique input light beam (analogous to a first light source ON and a second light source OFF) was simulated by injecting light rays into one of the inclined side surfaces of the prism. The injected rays were spread over a range of angles as follows: the projections of the rays in the x-z plane (see FIGS. 7 and 8 for coordinate orientation) had positive x-components and made angles with respect to the z-axis of 62 to 82 degrees (72±10 degrees); the projections of the rays in the y-z plane had positive z-components and made angles with respect to the z-axis of −40 to +40 degrees (0±40 degrees). The dual-sided optical film converted this first oblique input beam to a first output beam whose distribution in the x-z plane, as a function of polar angle, is shown as curve 2701 in the relative intensity plot of FIG. 27. A second oblique input light beam (analogous to the first light source OFF and the second light source ON) was then simulated by injecting light rays into the other inclined surface of the prism. The injected rays were spread over a range of angles as follows: the projections of the rays in the x-z plane had negative x-components and made angles with respect to the z-axis of 62 to 82 degrees (72±10 degrees); the projections of the rays in the y-z plane again had positive z-components and again made angles with respect to the z-axis of −40 to +40 degrees (0±40 degrees). The dual-sided optical film converted this second oblique input beam to a second output beam whose distribution in the x-z plane as a function of polar angle is shown as cure 2702 in FIG. 27. Note the wider spreading of light for the first output beam (curve 2701) in comparison to the second output beam (curve 2702). The first output beam has an angular spread, measured as the full-width-at-halfmaximum (FWHM) in the x-z plane, of 55 degrees, and the second output beam has an angular spread (measured in the same way) of 11 degrees.

Figure 28A:
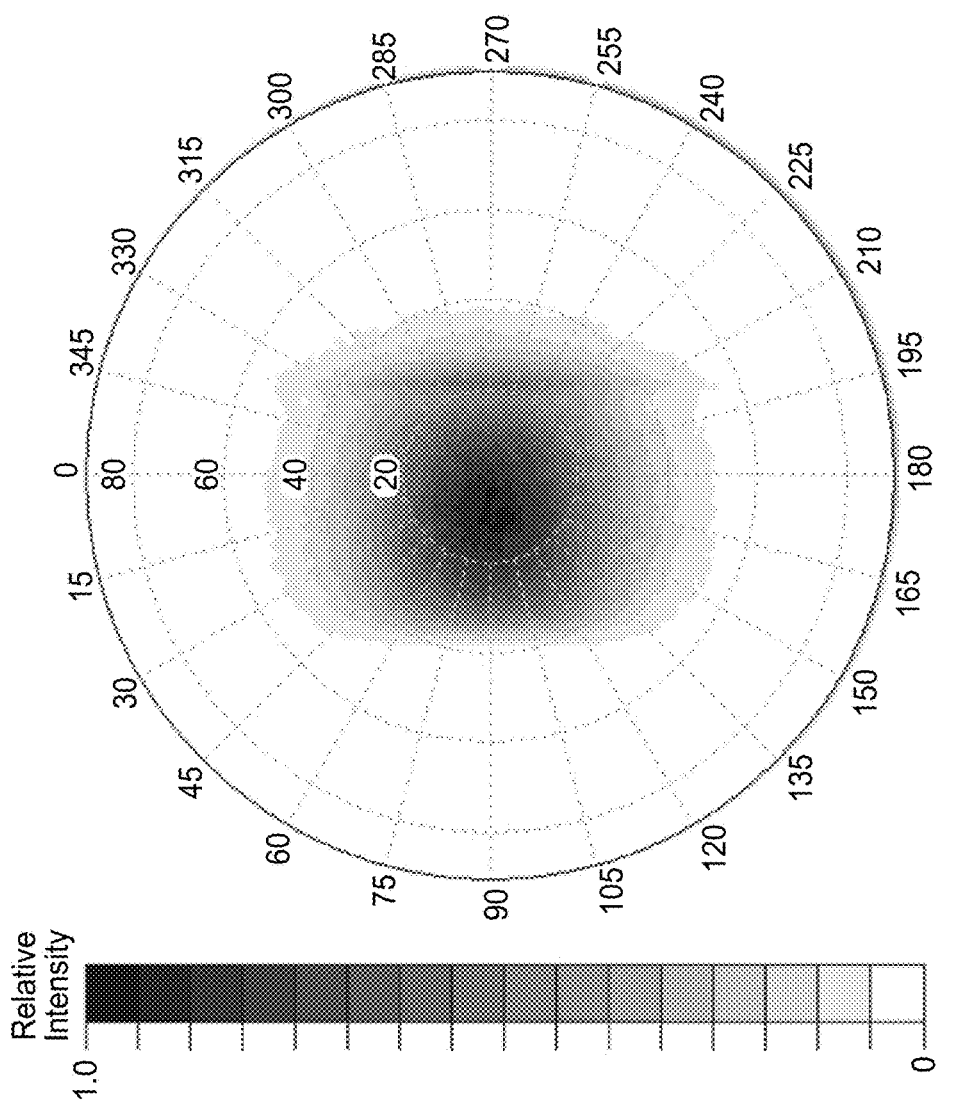

Conoscopic plots are convenient for showing how light is emitted by the dual-sided film both as a function of polar angle and as a function of azimuthal angle. Closely related to conoscopic plots are polar iso-candela plots, which provide similar convenient angular information, except that the intensity values are not cosine corrected in a polar iso-candela plot; however, by dividing the intensity values by the cosine of the polar angle, relative luminance data can be obtained. A polar iso-candela plot of the first output beam of this modeled dual-sided optical film is provided in FIG. 28A, and a polar iso-candela plot of the second output beam is provided in 28B. In these plots, the z-axis corresponds to a point at the center of the circular scale, polar angle (relative to the z-axis) corresponds to the radial distance from the center, and azimuthal angle (relative to the y-axis) is indicated by the numbers 0, 15, 30, 45, . . . 345 at the periphery of the circular scale. The calculated relative light intensity is shown at each point by shading in grayscale, with darker points on the graph indicating brighter light, as provided by the linear scale at the left side representing relative intensity. Note the wider light spreading in the x-z plane (azimuthal angles of 90 and 270 degrees) provided by the first output beam (FIG. 28A) in comparison to the second output beam (FIG. 28B).

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

This document discloses numerous embodiments, including but not limited to the following:

Item 1 is an optical film having opposed first and second structured surfaces, the optical film comprising:
    a plurality of extended prisms formed on the first structured surface; and
    a plurality of extended split spreading structures formed on the second structured surface, each split spreading structure having a high spreading portion disposed alongside a low spreading portion;
    wherein the prisms and the split spreading structures are arranged in a one-to-one correspondence of prisms to split spreading structures.

Item 2 is the film of item 1, wherein each prism has on one side thereof a first inclined surface and on another side thereof a second inclined surface, and wherein the low spreading portion of a given split spreading structure is associated primarily with light transmitted through the first inclined surface of its associated prism.

Item 3 is the film of item 2, wherein the low spreading portion of the given split spreading structure is associated primarily with light transmitted through the second inclined surface of the associated prism.

Item 4 is the film of item 1, wherein, for each of the split spreading structures, the low spreading portion has a smooth surface characteristic and the high spreading portion has a roughened surface characteristic.

Item 5 is the film of item 1, wherein each of the split spreading structures comprises a curved segment of the second structured surface, and wherein the low and high spreading portions of each split spreading structure comprise smooth and roughened portions respectively of the curved segment.

Item 6 is the film of item 1, wherein for each split spreading structure, the high spreading portion is a roughened portion and the low spreading portion is a lenslet.

Item 7 is the film of item 1, wherein for each split spreading structure, the high spreading portion is a lenslet and the low spreading portion is a flat.

Item 8 is the film of item 7, wherein the lenslet of each split spreading structure is a diverging lenslet.

Item 9 is the film of item 7, wherein the lenslet of each split spreading structure is a converging lenslet.

Item 10 is the film of item 1, wherein the split spreading structures extend along respective elongation axes that are parallel to each other, and wherein, for each of the split spreading structures, the low and high spreading portions meet along a boundary that is parallel to the elongation axis in plan view.

Item 11 is the film of item 1, wherein the prisms extend along respective first elongation axes that are parallel to each other, and the split spreading structures extend along respective second elongation axes that are parallel to each other.

Item 12 is the film of item 11, wherein the first elongation axes are parallel to the second elongation axes.

Item 13 is the film of item 1, wherein the optical film defines a reference plane, wherein the prisms have respective prism optical axes, and wherein each prism optical axis is perpendicular to the reference plane.

Item 14 is the film of item 1, wherein the optical film defines a reference plane, wherein the prisms have respective prism optical axes, and wherein a plurality of the prism optical axes are tilted with respect to a normal axis perpendicular to the reference plane.

Item 15 is the film of item 1, wherein the optical film defines a reference plane, wherein each split spreading structure has a spreading structure optical axis, and wherein each spreading structure optical axis is perpendicular to the reference plane.

Item 16 is the film of item 1, wherein the optical film defines a reference plane, wherein each split spreading structure has a spreading structure optical axis, and wherein a plurality of the spreading structure optical axes are tilted with respect to a normal axis perpendicular to the reference plane.

Item 17 is an optical system, comprising:
the optical film of item 1; and
a light guide having a major surface adapted to emit light preferentially at oblique angles;
wherein the optical film is disposed proximate the light guide and oriented so that light emitted from the major surface of the light guide enters the optical film through the first structured surface.

Item 18 is an optical system, comprising:
a light guide having a major surface adapted to emit light;
a first and second light source configured to inject light into the light guide along different first and second respective directions; and
an optical film having opposed first and second structured surfaces, the optical film being disposed proximate the light guide and oriented so that light emitted from the major surface of the light guide is deviated by and passes through the optical film to provide an output beam as a function of which of the first and second light sources are energized;
wherein the output beam is a wide output beam when the first light source is energized and the second light source is not energized, and wherein the output beam is a narrow output beam when the second light source is energized and the first light source is not energized.

Item 19 is the system of item 18, wherein the wide output beam has a beam width (FWHM) of at least 40 degrees in a given plane of observation, and the narrow output beam has a beam width (FWHM) of no more than 30 degrees in the given plane of observation.

Item 20 is the system of item 18, wherein the narrow output beam is subsumed by the wide output beam in the given plane of observation.

Item 21 is the system of item 18, wherein the optical film has a first structured surface facing the light guide and a second structured surface opposed to the first structured surface.

Item 22 is the system of item 21, wherein a plurality of extended prisms are formed on the first structured surface, and a plurality of extended split spreading structures are formed on the second structured surface, each split spreading structure having a high spreading portion disposed alongside a low spreading portion, and wherein the prisms and the split spreading structures are arranged in a one-to-one correspondence of prisms to split spreading structures.

Item 23 is the system of item 18, further comprising:
a switch coupled to the first and second light sources.

Item 24 is the system of item 23, wherein the system comprises a display, and the switch provides the display with a switchable privacy/sharing function.

Item 25 is the system of item 23, wherein the system comprises a luminaire, and the switch provides the luminaire with a switchable spotlight function.

Item 26 is a display system, comprising:
a display panel;
a backlight disposed behind the display panel, the backlight including one or more first light sources and one or more second light sources; and
a switch coupled to the one or more first light sources and to the one or more second light sources to selectively energize such light sources;
wherein the backlight is configured to provide a first output light beam when the one or more first light sources are ON and the one or more second light sources are OFF, and is further configured to provide a second output light beam when the one or more first light sources are OFF and the one or more second light sources are ON; and
wherein the first output light beam has a wider angular spread than the second output light beam, such that the switch provides the display system with a switchable privacy/sharing function.

Item 27 is the system of item 26, wherein the backlight includes a dual-sided optical film having opposed first and second structured surfaces, the optical film comprising:
a plurality of extended prisms formed on the first structured surface; and
a plurality of extended split spreading structures formed on the second structured surface, each split spreading structure having a high spreading portion disposed alongside a low spreading portion;
wherein the prisms and the split spreading structures are arranged in a one-to-one correspondence of prisms to split spreading structures.

Item 28 is the system of item 26, wherein the backlight includes a light guide.

The invention claimed is:

1. An optical film extending parallel to a reference plane and having opposed first and second structured surfaces, the optical film comprising:
a plurality of extended prisms formed on the first structured surface; and
a plurality of extended split spreading structures formed on the second structured surface, each split spreading structure having a high spreading portion disposed alongside a low spreading portion;
wherein, for each of the split spreading structures, the low spreading portion has a smooth surface characteristic and the high spreading portion has a roughened surface characteristic;
wherein, for each of the split spreading structures, at least one of the low spreading portion and the high spreading portion is substantially flat and parallel to the reference plane; and
wherein the prisms and the split spreading structures are arranged in a one-to-one correspondence of prisms to split spreading structures.

2. The optical film of claim 1, wherein both the low spreading portion and the high spreading portion are substantially flat and parallel to the reference plane.

3. The optical film of claim 1, wherein the split spreading structures extend along respective elongation axes that are parallel to each other, and wherein, for each of the split spreading structures, the low and high spreading portions meet along a boundary that is parallel to the elongation axis in plan view.

4. The optical film of claim 1, wherein the prisms extend along respective first elongation axes that are parallel to each other, and the split spreading structures extend along respective second elongation axes that are parallel to each other.

5. The optical film of claim 4, wherein the first elongation axes are parallel to the second elongation axes.

6. An optical system, comprising:
the optical film of claim 1; and
a light guide having a major surface adapted to emit light preferentially at oblique angles;
wherein the optical film is disposed proximate the light guide and oriented so that light emitted from the major surface of the light guide enters the optical film through the first structured surface.

7. The optical film of claim 1, wherein the prisms have respective prism optical axes, and wherein each prism optical axis is perpendicular to the reference plane.

8. The optical film of claim 1, wherein the prisms have respective prism optical axes, and wherein a plurality of the prism optical axes are tilted with respect to a normal axis perpendicular to the reference plane.

\* \* \* \* \*